United States Patent
Mizutani et al.

(10) Patent No.: US 11,056,979 B2
(45) Date of Patent: Jul. 6, 2021

(54) POWER CONVERSION APPARATUS

(71) Applicant: Mitsubishi Electric Corporation, Chiyoda-ku (JP)

(72) Inventors: Hiroto Mizutani, Chiyoda-ku (JP); Takaaki Takahara, Chiyoda-ku (JP); Hiroyasu Iwabuki, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/763,833

(22) PCT Filed: Dec. 25, 2017

(86) PCT No.: PCT/JP2017/046449
§ 371 (c)(1),
(2) Date: May 13, 2020

(87) PCT Pub. No.: WO2019/130395
PCT Pub. Date: Jul. 4, 2019

(65) Prior Publication Data
US 2020/0287468 A1    Sep. 10, 2020

(51) Int. Cl.
*H02M 3/335*    (2006.01)
*H02M 7/06*    (2006.01)
*H02M 7/5387*    (2007.01)

(52) U.S. Cl.
CPC ......... *H02M 3/33569* (2013.01); *H02M 7/06* (2013.01); *H02M 7/53871* (2013.01)

(58) Field of Classification Search
CPC .... H02M 3/335; H02M 3/33569; H02M 7/06; H02M 7/53871; H02M 3/33507; H02M 3/33538; H02M 3/33546

USPC .......................................... 363/21.02, 21.03
See application file for complete search history.

(56) References Cited

U.S. PATENT DOCUMENTS

| | | | |
|---|---|---|---|
| 2013/0194838 A1 | 8/2013 | Jang et al. | |
| 2014/0355313 A1 | 12/2014 | Nishikawa | |
| 2015/0103562 A1* | 4/2015 | Yeh | H02M 3/3353 363/17 |
| 2016/0126847 A1* | 5/2016 | Pahlevaninezhad | H02J 3/381 363/21.02 |

(Continued)

FOREIGN PATENT DOCUMENTS

| JP | 7-263175 A | 10/1995 |
|---|---|---|
| JP | 2012-249415 A | 12/2012 |

(Continued)

OTHER PUBLICATIONS

International Search Report dated Mar. 13, 2018 in PCT/JP2017/046449 filed Dec. 25, 2017, 1 page.

*Primary Examiner* — Gary L Laxton
(74) *Attorney, Agent, or Firm* — Xsensus LLP

(57) ABSTRACT

A control circuit performs at least pulse width modulation control on a first leg and selects to perform pulse width modulation control and pulse frequency modulation control, to perform pulse width modulation control and phase shift modulation control, or to perform pulse width modulation control, pulse frequency modulation control, and phase shift modulation control on a second leg, based on comparison of a voltage conversion ratio between DC voltage of a DC capacitor and output voltage to a load with at least one threshold.

10 Claims, 46 Drawing Sheets

(56) References Cited

U.S. PATENT DOCUMENTS

2017/0310143 A1* 10/2017 Mazzola ................. H02J 7/045
2019/0348833 A1* 11/2019 Sun ..................... H02M 1/4258

FOREIGN PATENT DOCUMENTS

JP       2013-158239 A   8/2013
WO   WO 2013/114758 A1   8/2013

* cited by examiner

FIG.4

| | CONTROL METHOD | FIRST LEG | SECOND LEG | THIRD LEG |
|---|---|---|---|---|
| TH1 < M* | THIRD CONTROL METHOD | PULSE WIDTH MODULATION CONTROL + PULSE FREQUENCY MODULATION CONTROL | PULSE WIDTH MODULATION CONTROL + PULSE FREQUENCY MODULATION CONTROL | RECTIFICATION |
| TH2 < M* ≤ TH1 | SECOND CONTROL METHOD | PULSE WIDTH MODULATION CONTROL + PULSE FREQUENCY MODULATION CONTROL | PULSE WIDTH MODULATION CONTROL + PULSE FREQUENCY MODULATION CONTROL + PHASE SHIFT MODULATION CONTROL | RECTIFICATION |
| M* ≤ TH2 | FIRST CONTROL METHOD | PULSE WIDTH MODULATION CONTROL | PULSE WIDTH MODULATION CONTROL + PHASE SHIFT MODULATION CONTROL | RECTIFICATION |

FIG.35

| CONTROL METHOD | | FIRST LEG | SECOND LEG | THIRD LEG |
|---|---|---|---|---|
| TH1<M* | THIRD CONTROL METHOD | PULSE WIDTH MODULATION CONTROL | PULSE WIDTH MODULATION CONTROL + PHASE SHIFT MODULATION CONTROL | RECTIFICATION |
| TH2<M*≤TH1 | SECOND CONTROL METHOD | PULSE WIDTH MODULATION CONTROL + PULSE FREQUENCY MODULATION CONTROL | PULSE WIDTH MODULATION CONTROL + PULSE FREQUENCY MODULATION CONTROL + PHASE SHIFT MODULATION CONTROL | RECTIFICATION |
| M*≤TH2 | FIRST CONTROL METHOD | PULSE WIDTH MODULATION CONTROL + PULSE FREQUENCY MODULATION CONTROL | PULSE WIDTH MODULATION CONTROL + PULSE FREQUENCY MODULATION CONTROL | RECTIFICATION |

FIG.36

| CONTROL METHOD | | FIRST LEG | SECOND LEG | THIRD LEG |
|---|---|---|---|---|
| TH<M* | FIRST CONTROL METHOD | PULSE WIDTH MODULATION CONTROL + PULSE FREQUENCY MODULATION CONTROL | PULSE WIDTH MODULATION CONTROL + PULSE FREQUENCY MODULATION CONTROL | RECTIFICATION |
| M*≤TH | SECOND CONTROL METHOD | PULSE WIDTH MODULATION CONTROL + PULSE FREQUENCY MODULATION CONTROL | PULSE WIDTH MODULATION CONTROL + PULSE FREQUENCY MODULATION CONTROL + PHASE SHIFT MODULATION CONTROL | RECTIFICATION |

FIG.37

| | CONTROL METHOD | FIRST LEG | SECOND LEG | THIRD LEG |
|---|---|---|---|---|
| TH<M* | SECOND CONTROL METHOD | PULSE WIDTH MODULATION CONTROL + PULSE FREQUENCY MODULATION CONTROL | PULSE WIDTH MODULATION CONTROL + PULSE FREQUENCY MODULATION CONTROL + PHASE SHIFT MODULATION CONTROL | RECTIFICATION |
| M*≤TH | THIRD CONTROL METHOD | PULSE WIDTH MODULATION CONTROL | PULSE WIDTH MODULATION CONTROL + PHASE SHIFT MODULATION CONTROL | RECTIFICATION |

FIG.38

| CONTROL METHOD | | FIRST LEG | SECOND LEG | THIRD LEG |
|---|---|---|---|---|
| TH1 < M* | FOURTH CONTROL METHOD | PULSE WIDTH MODULATION CONTROL + PULSE FREQUENCY MODULATION CONTROL | PULSE WIDTH MODULATION CONTROL + PULSE FREQUENCY MODULATION CONTROL | PULSE WIDTH MODULATION CONTROL + PULSE FREQUENCY MODULATION CONTROL |
| TH2 < M* ≤ TH1 | FIFTH CONTROL METHOD | PULSE WIDTH MODULATION CONTROL + PULSE FREQUENCY MODULATION CONTROL | PULSE WIDTH MODULATION CONTROL + PULSE FREQUENCY MODULATION CONTROL + PHASE SHIFT MODULATION CONTROL | PULSE WIDTH MODULATION CONTROL + PULSE FREQUENCY MODULATION CONTROL |
| M* ≤ TH2 | SIXTH CONTROL METHOD | PULSE WIDTH MODULATION CONTROL | PULSE WIDTH MODULATION CONTROL + PHASE SHIFT MODULATION CONTROL | PULSE WIDTH MODULATION CONTROL |

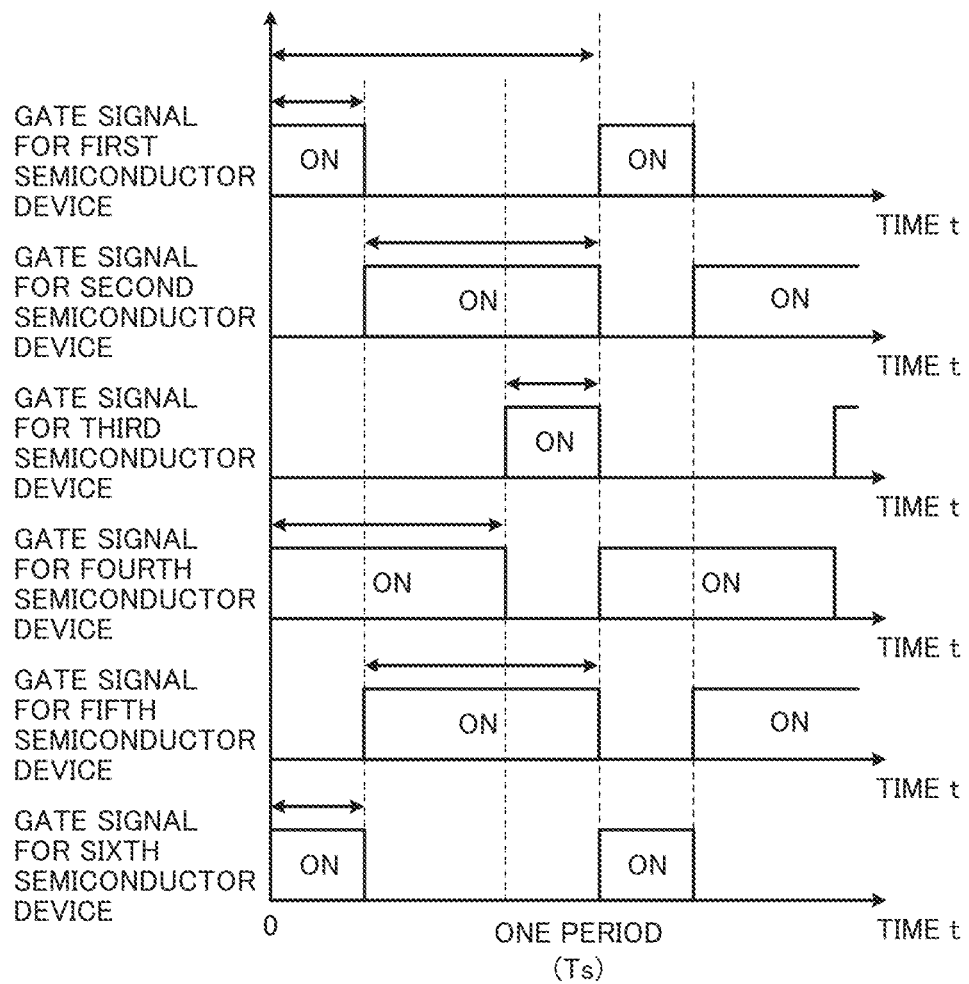

FIG.49

| CONTROL METHOD | | FIRST LEG | SECOND LEG | THIRD LEG |
|---|---|---|---|---|
| TH1 < M* | SIXTH CONTROL METHOD | PULSE WIDTH MODULATION CONTROL | PULSE WIDTH MODULATION CONTROL + PHASE SHIFT MODULATION CONTROL | PULSE WIDTH MODULATION CONTROL |
| TH2 < M* ≤ TH1 | FIFTH CONTROL METHOD | PULSE WIDTH MODULATION CONTROL + PULSE FREQUENCY MODULATION CONTROL | PULSE WIDTH MODULATION CONTROL + PULSE FREQUENCY MODULATION CONTROL + PHASE SHIFT MODULATION CONTROL | PULSE WIDTH MODULATION CONTROL + PULSE FREQUENCY MODULATION CONTROL |
| M* ≤ TH2 | FOURTH CONTROL METHOD | PULSE WIDTH MODULATION CONTROL + PULSE FREQUENCY MODULATION CONTROL | PULSE WIDTH MODULATION CONTROL + PULSE FREQUENCY MODULATION CONTROL | PULSE WIDTH MODULATION CONTROL + PULSE FREQUENCY MODULATION CONTROL |

FIG.50

| CONTROL METHOD | | FIRST LEG | SECOND LEG | THIRD LEG |
|---|---|---|---|---|
| TH<M* | FOURTH CONTROL METHOD | PULSE WIDTH MODULATION CONTROL + PULSE FREQUENCY MODULATION CONTROL | PULSE WIDTH MODULATION CONTROL + PULSE FREQUENCY MODULATION CONTROL | PULSE WIDTH MODULATION CONTROL + PULSE FREQUENCY MODULATION CONTROL |
| M*≤TH | FIFTH CONTROL METHOD | PULSE WIDTH MODULATION CONTROL + PULSE FREQUENCY MODULATION CONTROL | PULSE WIDTH MODULATION CONTROL + PULSE FREQUENCY MODULATION CONTROL + PHASE SHIFT MODULATION CONTROL | PULSE WIDTH MODULATION CONTROL + PULSE FREQUENCY MODULATION CONTROL |

FIG.51

| CONTROL METHOD | | FIRST LEG | SECOND LEG | THIRD LEG |
|---|---|---|---|---|
| TH<M* | FIFTH CONTROL METHOD | PULSE WIDTH MODULATION CONTROL + PULSE FREQUENCY MODULATION CONTROL | PULSE WIDTH MODULATION CONTROL + PULSE FREQUENCY MODULATION CONTROL + PHASE SHIFT MODULATION CONTROL | PULSE WIDTH MODULATION CONTROL + PULSE FREQUENCY MODULATION CONTROL |
| M*≦TH | SIXTH CONTROL METHOD | PULSE WIDTH MODULATION CONTROL | PULSE WIDTH MODULATION CONTROL + PHASE SHIFT MODULATION CONTROL | PULSE WIDTH MODULATION CONTROL |

POWER CONVERSION APPARATUS

TECHNICAL FIELD

The present invention relates to a power conversion apparatus and more particularly to a power conversion apparatus that converts input power from an AC power supply to desired DC power.

BACKGROUND ART

A power conversion apparatus that converts AC power supplied from an AC power supply to DC power while isolating the same and supplies the DC power to a DC load is typically configured with two converters: a power converter converting AC power to DC power; and an isolated power converter outputting desired DC power using an isolation transformer. A power conversion apparatus that integrates two converters into one converter to achieve higher efficiency is proposed (for example, see Japanese Patent Laying-Open No. 2012-249415 (PTL 1)). The power conversion apparatus disclosed in Japanese Patent Laying-Open No. 2012-249415 (PTL 1) includes an AC/DC converter circuit including a power factor improvement unit and a current resonant converter unit, in which a first switch element Q1 and a second switch element Q2 of the current resonant converter unit are common to the switch elements of the power factor improvement unit. The output voltage of the power factor improvement unit is controlled by changing the ON duty of switch elements Q1 to Q4 and the output voltage of the AC/DC converter circuit is controlled by changing the switching frequency of switch elements Q1 to Q4, and in addition, the dead time control of switch elements Q1 to Q2 and Q3 to Q4 is performed in accordance with the ON duty of switch elements Q1 to Q4, whereby the power factor is improved.

CITATION LIST

Patent Literature

PTL 1: Japanese Patent Laying-Open No. 2012-249415

SUMMARY OF INVENTION

Technical Problem

In the power conversion apparatus described in Japanese Patent Laying-Open No. 2012-249415 (PTL 1), when step-down control of output voltage is performed only by frequency control, the frequency variation range has to be significantly increased because voltage variation sensitivity to frequency variation is deteriorated in a region equal to or higher than a certain frequency. Power loss of semiconductor devices and magnetic components is thus increased. Consequently, this leads to reduction in power conversion efficiency and possibly causes destruction of the semiconductor devices and the magnetic components.

Solution to Problem

A power conversion apparatus according to the present invention performs power conversion between an AC power supply and a load and includes an inverter circuit including a first leg, a second leg, a third leg, and a DC capacitor connected in parallel. The first leg has a first semiconductor device and a second semiconductor device connected in series, and a first AC end that is a connection point between the first semiconductor device and the second semiconductor device is connected to one end of the AC power supply. The second leg has a third semiconductor device and a fourth semiconductor device connected in series. The third leg has a fifth semiconductor device and a sixth semiconductor device connected in series. A connection point between the fifth semiconductor device and the sixth semiconductor device is connected to another end of the AC power supply. The first semiconductor device, the third semiconductor device, and the fifth semiconductor device are connected. The second semiconductor device, the fourth semiconductor device, and the sixth semiconductor device are connected. The power conversion apparatus according to the present invention further includes: a transformer having a primary-side winding and a secondary-side winding, the primary-side winding having one end connected to the first AC end and another end connected to a second AC end that is a connection point between the third semiconductor device and the fourth semiconductor device, the secondary-side winding being magnetically coupled to the primary-side winding; a parallel resonance reactor connected in parallel with the primary-side winding of the transformer; a secondary-side rectifying circuit to rectify AC output from the secondary-side winding of the transformer; an output smoothing circuit disposed between the secondary-side rectifying circuit and the load and including at least one smoothing capacitor; and a control circuit to control the inverter circuit. The control circuit performs at least pulse width modulation control on the first leg and selects to perform pulse width modulation control and pulse frequency modulation control, to perform pulse width modulation control and phase shift modulation control, or to perform pulse width modulation control, pulse frequency modulation control, and phase shift modulation control on the second leg, based on comparison of a voltage conversion ratio between DC voltage of the DC capacitor and output voltage to the load with at least one threshold.

Advantageous Effects of Invention

According to the present invention, the control circuit performs at least pulse width modulation control on the first leg and selects to perform pulse width modulation control and pulse frequency modulation control, to perform pulse width modulation control and phase shift modulation control, or to perform pulse width modulation control, pulse frequency modulation control, and phase shift modulation control on the second leg, based on comparison of a voltage conversion ratio between DC voltage of the DC capacitor and output voltage to the load with at least one threshold. This configuration can reduce power loss of the semiconductor devices and the magnetic components.

BRIEF DESCRIPTION OF DRAWINGS

FIG. 4 is a diagram illustrating control methods in the first embodiment.

FIG. 35 is a diagram illustrating a control method in a first modification to the first embodiment.

FIG. 36 is a diagram illustrating a control method in a second modification to the first embodiment.

FIG. 37 is a diagram illustrating a control method in a third modification to the first embodiment.

FIG. 38 is a diagram illustrating a control method in a second embodiment.

FIG. 39 is a diagram illustrating an example of gate pulses for first semiconductor device 501, second semiconductor device 502, third semiconductor device 601, fourth semiconductor device 602, fifth semiconductor device 301, and sixth semiconductor device 302 in a fourth control method.

FIG. 49 is a diagram illustrating a control method in a first modification to the second embodiment.

FIG. 50 is a diagram illustrating a control method in a second modification to the second embodiment.

FIG. 51 is a diagram illustrating a control method in a third modification to the second embodiment.

DESCRIPTION OF EMBODIMENTS

Embodiments will be described below with reference to the drawings.

First Embodiment

A power conversion apparatus in a first embodiment is applied to a power supply system centering on a charger of an electric vehicle.

(Configuration of Power Conversion Apparatus)

Figure 1:
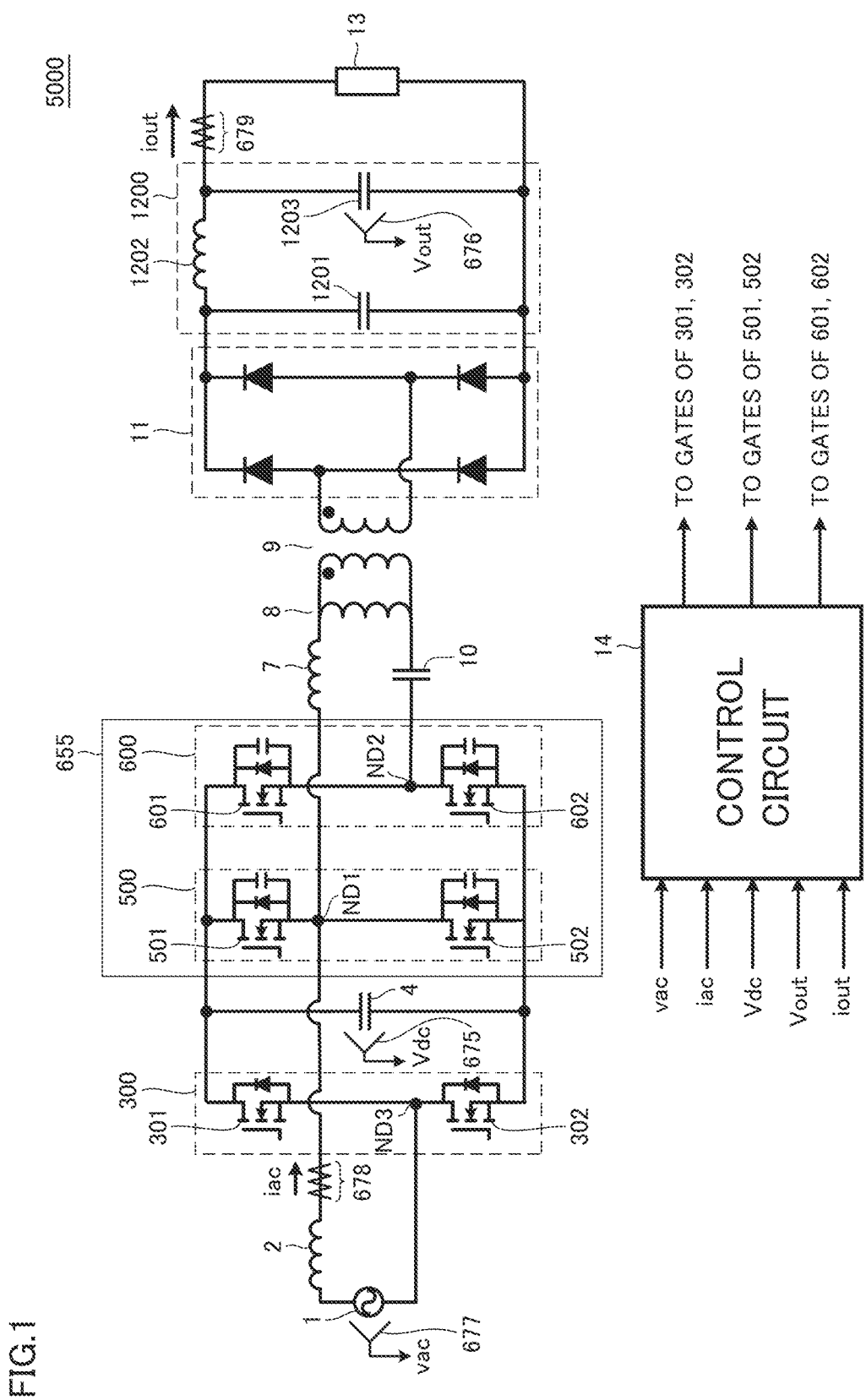
FIG. 1 is a diagram illustrating a configuration of a power conversion apparatus 5000 according to a first embodiment.

FIG. 1 is a diagram illustrating a configuration of a power conversion apparatus 5000 according to the first embodiment.

Power conversion apparatus 5000 converts AC power supplied from a commercial AC power supply 1 to DC power and supplies the DC power to a DC load 13.

Power conversion apparatus 5000 includes a power factor-improving reactor 2, a DC capacitor 4, a third leg 300, an inverter circuit 655, a series resonance reactor 7, a parallel resonance reactor 8, a transformer 9, a series resonance capacitor 10, a secondary-side rectifying circuit 11, and an output smoothing circuit 1200. Inverter circuit 655 includes a first leg 500 and a second leg 600.

AC power supply 1 is, for example, a commercial AC system or a self-generator.

DC load 13 is, for example, a high voltage battery for vehicle driving or a lead-acid battery that is a power supply for vehicle electric components. DC load 13 may be a DC load that requires isolation from other AC inputs and may be configured with, for example, an electric double layer capacitor (EDLC).

First leg 500, second leg 600, third leg 300, and DC capacitor 4 are connected in parallel.

First leg 500 includes a first semiconductor device 501 and a second semiconductor device 502 connected in series. Second leg 600 includes a third semiconductor device 601 and a fourth semiconductor device 602 connected in series. Third leg 300 includes a fifth semiconductor device 301 and a sixth semiconductor device 302 connected in series.

First semiconductor device 501, third semiconductor device 601, and fifth semiconductor device 301 are connected. Second semiconductor device 502, fourth semiconductor device 602, and sixth semiconductor device 302 are connected.

First semiconductor device 501 is positioned diagonally to fourth semiconductor device 602. Second semiconductor device 502 is positioned diagonally to third semiconductor device 601. Two semiconductor devices positioned diagonally to each other that are included in first leg 500 and second leg 600 are set to the ON state, whereby rectangular wave voltage is applied to the primary-side terminal of transformer 9 and power is transmitted to DC load 13.

As shown in FIG. 1, a diode is connected in anti-parallel with and a capacitor is connected in parallel with each of first semiconductor device 501, second semiconductor device 502, third semiconductor device 601, and fourth semiconductor device 602. The diode connected in anti-parallel with a semiconductor device may be an external diode or may be a body diode of the semiconductor device. The capacitor connected in parallel with a semiconductor device may be an external capacitor or may be a parasitic capacitor of the semiconductor device.

A first AC end ND1 that is a connection point between first semiconductor device 501 and second semiconductor device 502 is connected to one end of AC power supply 1 through power factor-improving reactor 2. Third semiconductor device 601 and fourth semiconductor device 602 are connected at a second AC end ND2. A third AC end ND3 that is a connection point between fifth semiconductor device 301 and sixth semiconductor device 302 is connected to the other end of AC power supply 1.

Power factor-improving reactor 2 is a current decreasing reactor having one end connected to AC power supply 1 and the other end connected to inverter circuit 655. Power factor-improving reactor 2 may be connected to another terminal side of AC power supply 1 or may be connected in a distributed manner to each of both ends of AC power supply 1.

The side connected to AC power supply 1 with respect to transformer 9 is referred to as the primary side, and the side connected to DC load 13 with respect to transformer 9 is referred to as the secondary side.

One end of the primary-side winding of transformer 9 is connected to first AC end ND1 through series resonance reactor 7. The other end of the primary-side winding of transformer 9 is connected to second AC end ND2 through series resonance capacitor 10. The secondary-side winding of transformer 9 is magnetically coupled to the primary winding.

Parallel resonance reactor 8 is connected in parallel with the primary-side winding of transformer 9.

Series resonance reactor 7, parallel resonance reactor 8, and series resonance capacitor 10 constitute a resonance circuit.

Secondary-side rectifying circuit 11 rectifies AC output from the secondary-side winding of transformer 9. Secondary-side rectifying circuit 11 includes a plurality of diodes.

Output smoothing circuit 1200 is disposed between secondary-side rectifying circuit 11 and DC load 13. Output smoothing circuit 1200 includes a first output smoothing capacitor 1201 and a second output smoothing capacitor 1203 connected in parallel. Output smoothing circuit 1200 includes an output smoothing reactor 1202 disposed between first output smoothing capacitor 1201 and second output smoothing capacitor 1203.

Power conversion apparatus 5000 includes a first voltage detector 675, a second voltage detector 676, a third voltage detector 677, a first current detector 678, and a second current detector 679.

First voltage detector 675 detects DC voltage Vdc of DC capacitor 4. Second voltage detector 676 detects output voltage Vout by detecting voltage across both ends of second output smoothing capacitor 1203. Third voltage detector 677 detects voltage vac of AC power supply 1. First current detector 678 detects current iac of AC power supply 1. Second current detector 679 detects output current iout.

The detected values of the voltages and the currents are supplied to a control circuit 14, so that control circuit 14 performs arithmetic operation. Control circuit 14 outputs the arithmetic operation results to the gate terminals of semiconductor devices 301 to 302, 501 to 502, and 601 to 602.

The ON state and the OFF state of fifth semiconductor device 301 and sixth semiconductor device 302 are switched in accordance with the polarity of voltage input from AC power supply 1. Specifically, in a time period in which voltage vac of AC power supply 1 has positive polarity, sixth semiconductor device 302 is in the ON state and fifth semiconductor device 301 is in the OFF state. On the other hand, in a time period in which voltage vac of AC power supply 1 has negative polarity, fifth semiconductor device 301 is in the ON state and sixth semiconductor device 302 is in the OFF state.

Fifth semiconductor device 301 and sixth semiconductor device 302 are active semiconductor. Conduction loss of active semiconductor is reduced by performing synchronous rectification. Fifth semiconductor device 301 and sixth semiconductor device 302 are not limited to insulated gate bipolar transistors (IGBTs) or metal oxide semiconductor field effect transistors (MOSFETs), and active semiconductor such as SiC (silicon carbide)-MOSFETs, gallium nitride (GaN)-FETs, and GaN-HEMTs (high electron mobility transistors) may be used.

In power conversion apparatus 5000, voltage vac and current iac of AC power supply 1 with an input power factor of 1 are represented by Equation (1) and Equation (2). Power pac of AC power supply 1 is represented by Equation (3) and transmitted to DC load 13. Here, assuming that DC load 13 is controlled at a constant output voltage Vout, output current iout supplied to DC load 13 is represented by Equation (4). In Equation (1) to Equation (4), ω is the angular frequency of voltage vac and current iac of AC power supply 1 and represented by Equation (5). The period of voltage vac and current iac of AC power supply 1 is Tac. As is clear from Equation (4), current flowing into DC load 13 by power conversion apparatus 5000 has a pulsating component with an angular frequency twice angular frequency ω of current iac of AC power supply 1.

$$v_{ac} = \sqrt{2}\, V_{ac} \sin\omega t \qquad (1)$$

$$i_{ac} = \sqrt{2}\, I_{ac} \sin\omega t \qquad (2)$$

$$P_{ac} = V_{ac} \cdot I_{ac}(1 - \cos 2\omega t) \qquad (3)$$

$$i_{out} = \frac{V_{ac} \cdot I_{ac}}{V_{out}}(1 - \cos 2\omega t) \qquad (4)$$

$$\omega = \frac{2\pi}{T_{ac}} \qquad (5)$$

The characteristics of the resonance circuit constituted with series resonance reactor 7, parallel resonance reactor 8, and series resonance capacitor 10 are described. Using the resonance circuit, the ratio of output voltage Vout to voltage Vdc of DC capacitor 4, that is, voltage conversion ratio M is represented by Equation (6).

$$M = \frac{nV_{out}}{V_{dc}} \qquad (6)$$

$$= \frac{n}{\sqrt{\left[1 + \frac{1}{k}\left\{1 - \left(\frac{f_r}{f_s}\right)^2\right\}\right]^2 + Q^2\left(\frac{f_s}{f_r} - \frac{f_r}{f_s}\right)}}$$

In Equation (6), n is the ratio of primary turns N1 to secondary turns N2 of transformer 9 and represented by Equation (7). In Equation (6), fr is a resonance frequency calculated from the inductance (Lr) of series resonance reactor 7 and the capacitance (Cr) of series resonance capacitor 10 and represented by Equation (8). In Equation (6), k is the ratio of the inductance (Lm) of parallel resonance reactor 8 to the inductance (Lr) of series resonance reactor 7 and represented by Equation (9). In Equation (6), Q is the resonance sharpness and represented by Equation (10). In Equation (6), fs is the switching frequency of semiconductor devices 501 to 502 and 601 to 602.

$$n = \frac{N_1}{N_2} \qquad (7)$$

$$f_r = \frac{1}{2\pi\sqrt{L_r C_r}} \qquad (8)$$

$$k = \frac{L_m}{L_r} \qquad (9)$$

$$Q = \frac{\pi^2}{8n^2} \frac{J_{out}}{V_{out}} \sqrt{\frac{L_r}{C_r}} \qquad (10)$$

Figure 2:
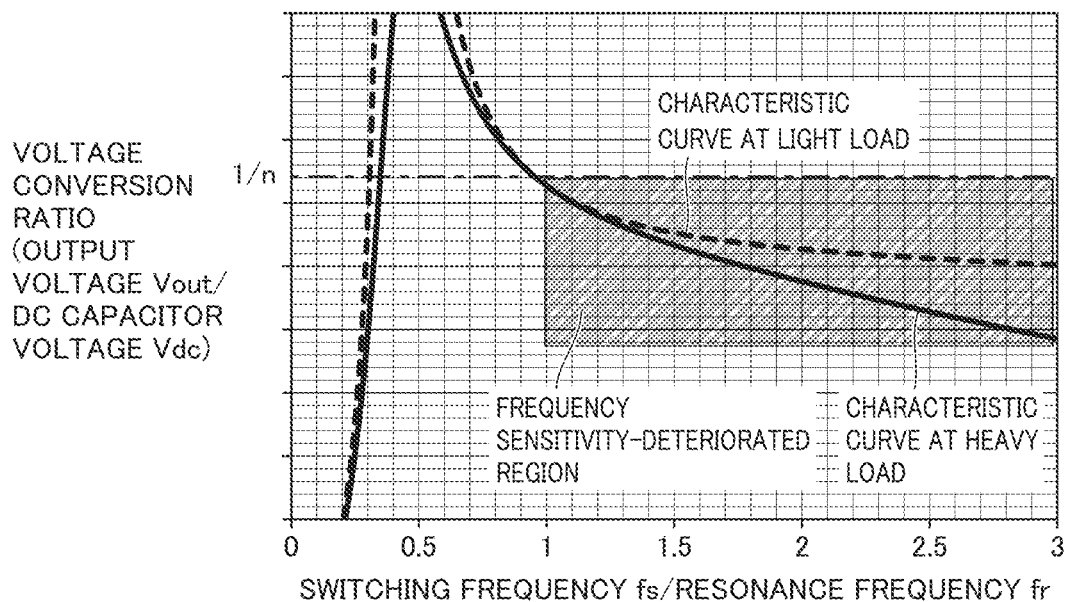
FIG. 2 is a diagram illustrating the characteristics of a voltage conversion ratio in Equation (6).

FIG. 2 is a diagram illustrating the characteristics of the voltage conversion ratio in Equation (6). The horizontal axis in FIG. 2 represents the ratio of switching frequency fs to resonance frequency fr, that is, normalized frequency. The vertical axis represents the voltage conversion ratio. As shown in FIG. 2, in a region in which the normalized frequency is less than 1, a voltage conversion ratio higher than the turn ratio n can be obtained. As shown in FIG. 2, except for the resonance peaks of the load, there are two switching frequencies corresponding to one voltage conversion ratio. In power conversion apparatus 5000 in the present embodiment, of two switching frequencies, the switching frequency having a larger value is selected. Of two switching frequencies, the switching frequency having a smaller value may be selected.

As shown in FIG. 2, in a region in which the normalized frequency is smaller than 1, the sensitivity of the voltage conversion ratio to the normalized frequency is high. On the other hand, in a region in which the normalized frequency is equal to or higher than 1, a voltage conversion ratio equal to or smaller than the reciprocal (1/n) of the turn ratio n is obtained, and the sensitivity of the voltage conversion ratio to the normalized frequency is deteriorated. Therefore, when step-down control of output voltage Vout is performed in a wide range only by frequency modulation control, the frequency variation range has to be significantly increased. Consequently, power loss of the semiconductor devices and the magnetic components increases, leading to reduction in power conversion efficiency and possibly destruction of the semiconductor devices and the magnetic components.

Power conversion apparatus 5000 in the present embodiment therefore simultaneously performs high power factor control and output control by selecting and performing at least one of pulse frequency modulation control and phase shift control, in addition to pulse width modulation control, for second leg 600, based on the comparison of a target value of the voltage conversion ratio set as desired with a threshold. As a result, voltage control in a wide range becomes possible without significantly increasing the frequency variation range.

Figure 3:
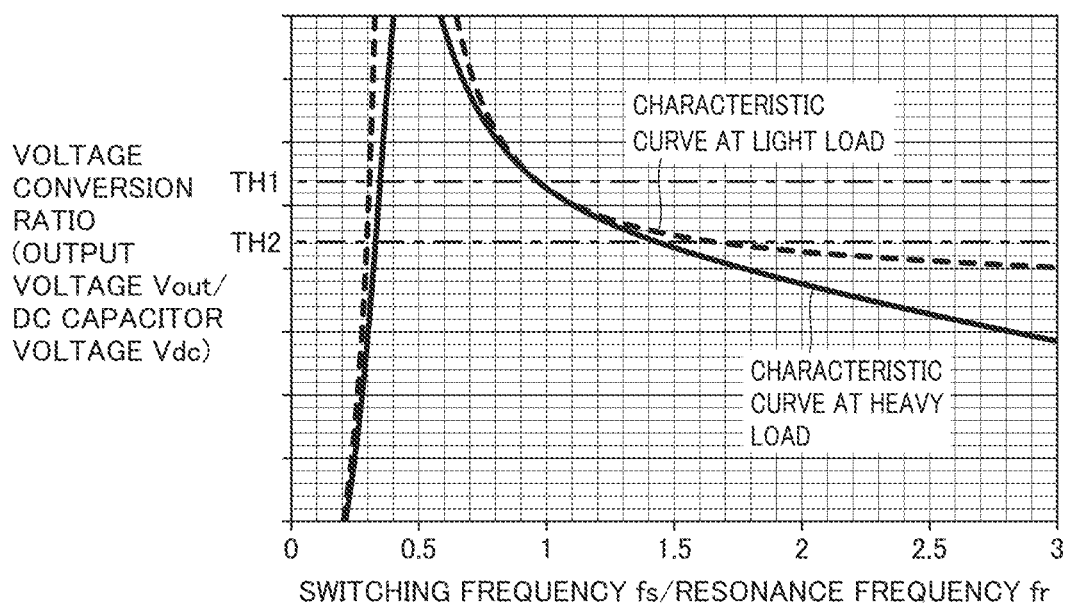
FIG. 3 is a diagram for explaining two thresholds of the power conversion ratio.

FIG. 3 is a diagram for explaining two thresholds of the power conversion ratio.

For example, threshold TH1 and threshold TH2 can be set as follow.

$$TH1=n \quad (11)$$

$$TH2=0.7 \cdot n \quad (12)$$

FIG. 4 is a diagram illustrating a control method in the first embodiment.

In the first embodiment, first semiconductor device 501 and second semiconductor device 502 that constitute first leg 500 perform high power factor control, third semiconductor device 601 and the fourth semiconductor device constitute second leg 600 perform output control, and fifth semiconductor device 301 and sixth semiconductor device 302 that constitute third leg 300 perform rectifying operation in accordance with the polarity of voltage of AC power supply 1.

Control circuit 14 controls first leg 500, second leg 600, and third leg 300 based on a first control method, in a region in which target value M* of voltage conversion ratio M is larger than threshold TH1. Control circuit 14 controls first leg 500 by pulse width modulation control and pulse frequency modulation control. Control circuit 14 controls second leg 600 by pulse width modulation control and pulse frequency modulation control. Control circuit 14 allows third leg 300 to perform rectification control.

Control circuit 14 controls first leg 500, second leg 600, and third leg 300 based on a second control method, in a region in which target value M* of voltage conversion ratio M is equal to or smaller than threshold TH1 and is larger than threshold TH2. Control circuit 14 controls first leg 500 by pulse width modulation control and pulse frequency modulation control. Control circuit 14 controls second leg 600 by pulse width modulation control, pulse frequency modulation control, and phase shift modulation control. Control circuit 14 allows third leg 300 to perform rectification control.

Control circuit 14 controls first leg 500, second leg 600, and third leg 300 based on a third control method, in a region in which target value M* of voltage conversion ratio M is equal to or smaller than threshold TH2. Control circuit 14 controls first leg 500 by pulse width modulation control. Control circuit 14 controls second leg 600 by pulse width modulation control and phase shift modulation control. Control circuit 14 allows third leg 300 to perform rectification control.

In the first embodiment, generation loss can be suppressed by using the second control method. First, pulse width modulation control is essential for inverter circuit 655 to operate. Further, when it is necessary to lower the output voltage relative to the input voltage, only with frequency modulation control, higher frequency is limitlessly needed to cause excessive loss. On the other hand, if the phase shift amount is limitlessly increased in phase shift control, reactive power becomes excessive to cause excessive loss. Based on these, appropriate control can be achieved by combining three kinds of modulation control. In addition, in the first embodiment, voltage control is possible in a narrow frequency band. In the first embodiment, considering that phase shift is to lower the output voltage relative to the input voltage, phase shift is used in a region in which the power conversion ratio is small.

(Rectification Control in Third Leg 300)

Control circuit 14 inverts the timing when fifth semiconductor device 301 is conducting and the timing when sixth semiconductor device 302 is conducting, thereby allowing third leg 300 to perform rectification operation.

Control circuit 14 switches the ON state and the OFF state of fifth semiconductor device 301 and sixth semiconductor device 302 in accordance with the polarity of voltage input from AC power supply 1. Specifically, control circuit 14 sets sixth semiconductor device 302 to the ON state and sets fifth semiconductor device 301 to the OFF state in a time period in which voltage vac of AC power supply 1 has positive polarity. On the other hand, control circuit 14 sets fifth semiconductor device 301 to the ON state and sets sixth semiconductor device 302 to the OFF state in a time period in which voltage vac of AC power supply 1 has negative polarity.

(Control of First Leg 500 and Second Leg 600)

Control circuit 14 regulates current iac of AC power supply 1 to a high power factor by controlling first semiconductor device 501 and second semiconductor device 502 that constitute first leg 500, using pulse width modulation control.

Power conversion apparatus 5000 has the configuration of a bridgeless rectifier and therefore has to switch the duty ratio in accordance with the polarity of voltage vac of AC power supply 1.

Duty ratio D501 and duty ratio D502 of first leg 500 are defined as in the following equations.

$$D_{501} = \frac{v_{ac}}{V_{dc}} \qquad (13)$$

$$D_{502} = \frac{V_{dc} - v_{ac}}{V_{dc}} \qquad (14)$$

Vdc in Equation (13) and Equation (14) is voltage of DC capacitor 4.

Figure 5:
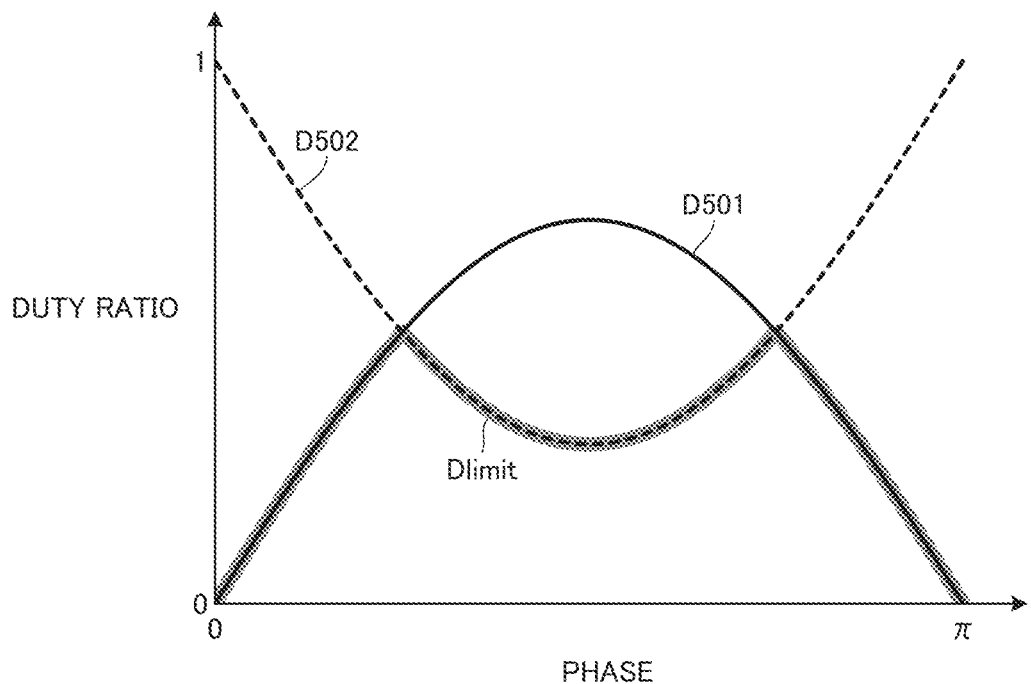
FIG. 5 is a duty ratio trajectory diagram for duty ratio D501 and duty ratio D502 when voltage of an AC power supply 1 has positive polarity.

FIG. 5 is a duty ratio trajectory diagram for duty ratio D501 and duty ratio D502 when voltage of AC power supply 1 has positive polarity. In the zero phase and the half-cycle (π) phase, voltage of AC power supply 1 is zero, and therefore duty ratio D501 is extremely close to zero and duty ratio D502 is extremely close to one.

When voltage vac of AC power supply 1 has positive polarity, control circuit 14 switches first semiconductor device 501 at duty ratio D501 in Equation (13) and controls second semiconductor device 502 at duty ratio D502 in Equation (14).

Figure 6:
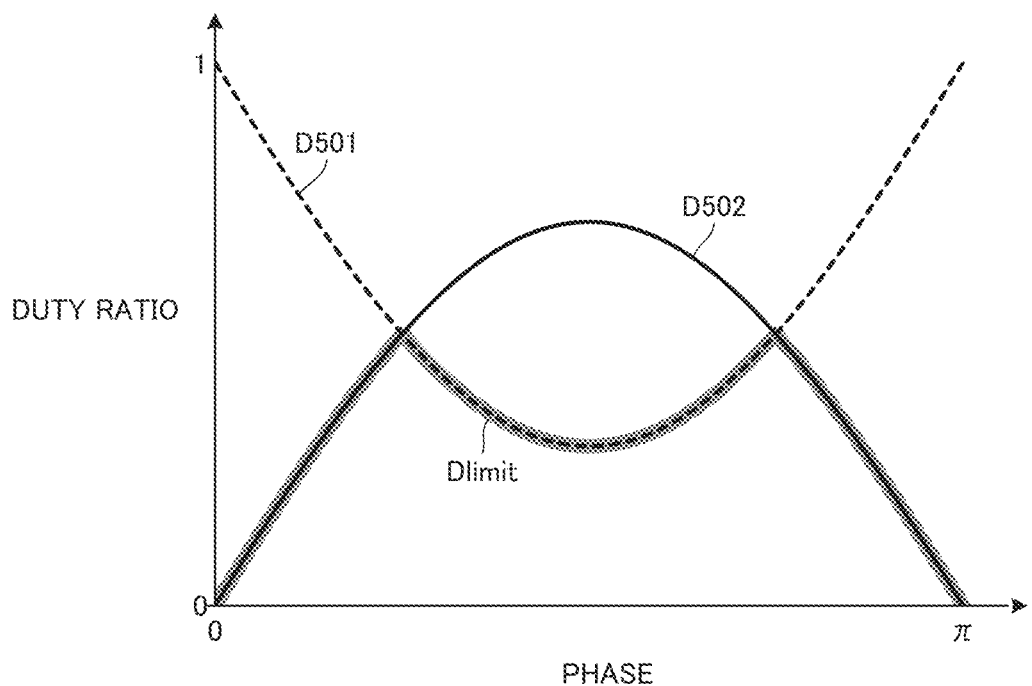
FIG. 6 is a duty ratio trajectory diagram for duty ratio D501 and duty ratio D502 when voltage of AC power supply 1 has negative polarity.

FIG. 6 is a duty ratio trajectory diagram for duty ratio D501 and duty ratio D502 when voltage of AC power supply 1 has negative polarity. In the zero phase and the half-cycle (π) phase, voltage of AC power supply 1 is zero, and therefore duty ratio D501 is extremely close to one and duty ratio D502 is extremely close to zero.

When voltage vac of AC power supply 1 has negative polarity, control circuit 14 switches first semiconductor device 501 at the duty ratio in Equation (14) and switches second semiconductor device 502 at the duty ratio in Equation (13).

Here, as shown in Equation (15), FIG. 5 and FIG. 6, the smaller duty ratio of duty ratio D501 and duty ratio D502 is defined as low duty ratio Dlimit.

$$D_{limit} = \min\{D_{501}, D_{502}\} \qquad (15)$$
$$= \min\left\{\frac{v_{ac}}{V_{dc}}, \frac{V_{dc} - v_{ac}}{V_{dc}}\right\}$$

As for first semiconductor device 501 and second semiconductor device 502, irrespective of the magnitude relation between the threshold of the voltage conversion ratio and the target value of the voltage conversion ratio set as desired, high power factor control is performed using pulse width modulation control by generating a gate signal while switching the duty ratio in accordance with the voltage polarity of AC power supply 1. The semiconductor devices are not limited to insulated gate bipolar transistors (IGBTs) or metal oxide semiconductor field effect transistors (MOSFETs), and SiC (silicon carbide)-MOSFETs, GaN (gallium nitride)-FETs, and GaN-HEMTs (high electron mobility transistors) may be used.

The detail of the control will be described in more detail below for each control method.

(First Control Method)

Figure 7:
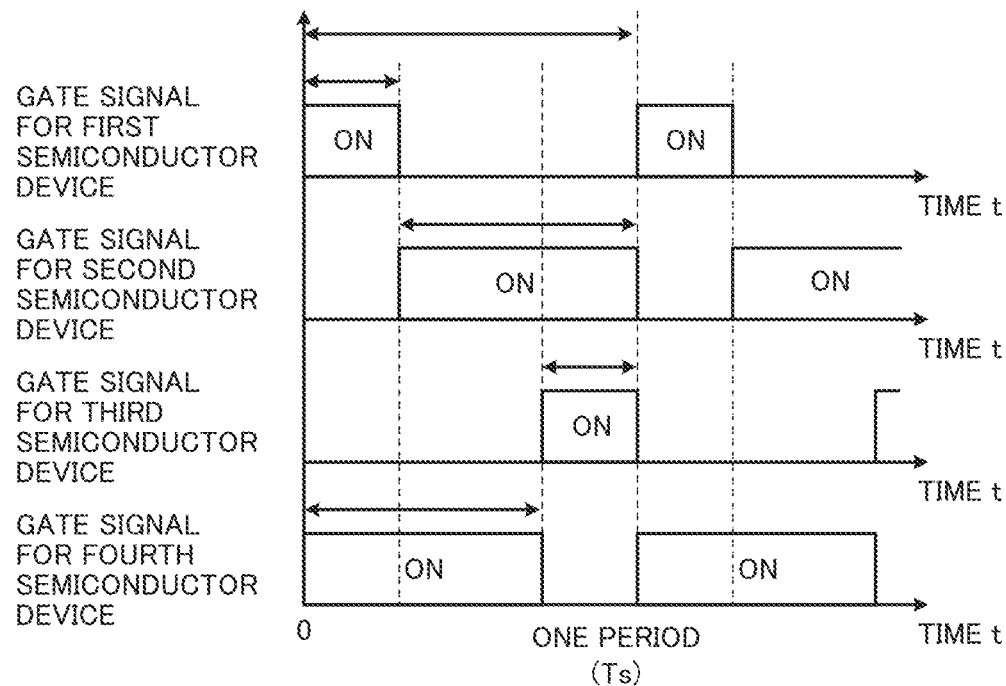
FIG. 7 is a diagram illustrating an example of gate pulses for a first semiconductor device 501, a second semiconductor device 502, a third semiconductor device 601, and a fourth semiconductor device 602 in a first control method.

FIG. 7 is a diagram illustrating an example of gate pulses for first semiconductor device 501, second semiconductor device 502, third semiconductor device 601, and fourth semiconductor device 602 in the first control method.

First semiconductor device 501 and second semiconductor device 502 are subjected to high power factor control using pulse width modulation control and pulse frequency modulation control. Third semiconductor device 601 and fourth semiconductor device 602 are subjected to output control using pulse width modulation control and pulse frequency modulation control.

In the operation shown in FIG. 7, the timing when first semiconductor device 501 turns on and the timing when fourth semiconductor device 602 turns on are synchronized with each other, and the timing when second semiconductor device 502 turns off and the timing when third semiconductor device 601 turns off are synchronized with each other. Further, the pulse width for first semiconductor device 501 and the pulse width for third semiconductor device 601 are equal, and the pulse width for second semiconductor device 502 and the pulse width for fourth semiconductor device 602 are equal. Control circuit 14 controls first semiconductor device 501, second semiconductor device 502, third semiconductor device 601, and fourth semiconductor device 602 such that switching frequency fs common to first semiconductor device 501, second semiconductor device 502, third semiconductor device 601, and fourth semiconductor device 602 changes while those conditions are satisfied.

Figure 8:
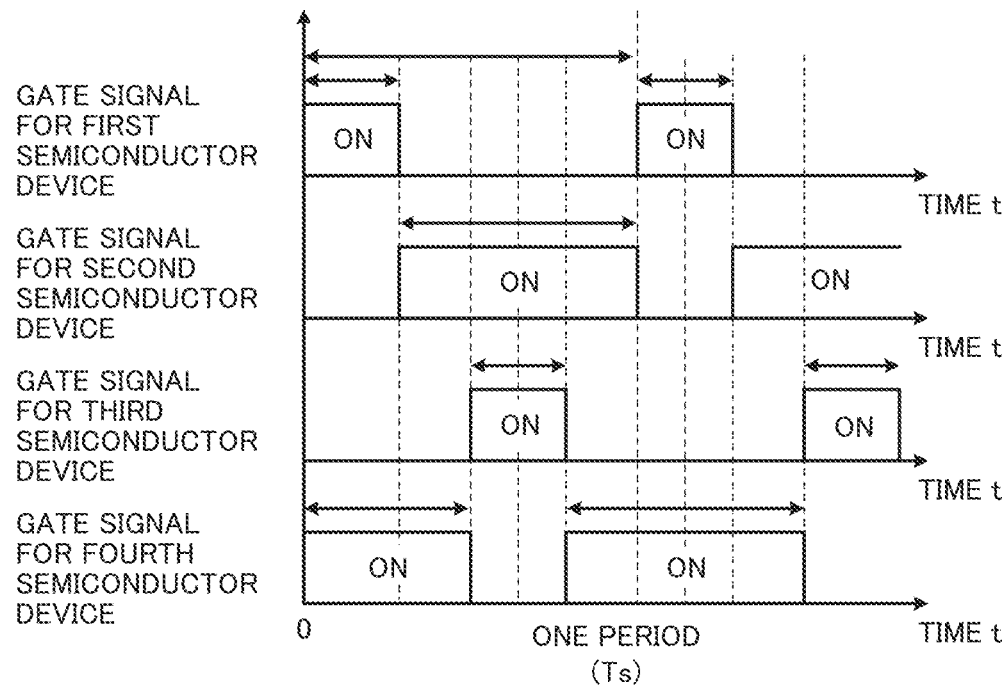
FIG. 8 is a diagram illustrating another example of gate pulses for first semiconductor device 501, second semiconductor device 502, third semiconductor device 601, and fourth semiconductor device 602 in the first control method.

FIG. 8 is a diagram illustrating another example of gate pulses for first semiconductor device 501, second semiconductor device 502, third semiconductor device 601, and fourth semiconductor device 602 in the first control method.

In the operation shown in FIG. 8, the center phase of the gate pulse for first semiconductor device 501 and the center phase of the gate pulse for fourth semiconductor device 602 are synchronized with each other, and the center phase of the gate pulse for second semiconductor device 502 and the center phase of the gate pulse for third semiconductor device 601 are synchronized with each other. Further, the pulse width for first semiconductor device 501 and the pulse width for third semiconductor device 601 are equal, and the pulse width for second semiconductor device 502 and the pulse width for fourth semiconductor device 602 are equal. Control circuit 14 controls first semiconductor device 501, second semiconductor device 502, third semiconductor device 601, and fourth semiconductor device 602 such that switching frequency fs common to first semiconductor device 501, second semiconductor device 502, third semiconductor device 601, and fourth semiconductor device 602 changes while those conditions are satisfied.

With the control as shown in FIG. 7 and FIG. 8, the duration in which the diagonally-positioned first semiconductor device 501 and fourth semiconductor device 602 turn on simultaneously can be identical to the duration in which the diagonally-positioned second semiconductor device 502 and third semiconductor device 601 turn on simultaneously, thereby enabling stable power supply.

(Third Control Method)

In phase shift control, the pulse phase for second leg 600 is shifted from the pulse phase for first leg 500 by phase shift amount Dps. Here, the phase shift amount is expressed as the duty ratio in accordance with duty ratio D501 and duty ratio D502 of first leg 500.

In power conversion apparatus 5000, phase shift amount Dps need to be always below duty ratio D501 and duty ratio D502. That is, as shown in Equation (15), phase shift amount Dps has to be always below the smaller duty ratio Dlimit of duty ratio D501 and duty ratio D502. This relation can be represented by Equation (16).

$$D_{ps} < \min\left\{\frac{v_{ac}}{V_{dc}}, \frac{V_{dc} - v_{ac}}{V_{dc}}\right\} \qquad (16)$$

Figure 9:
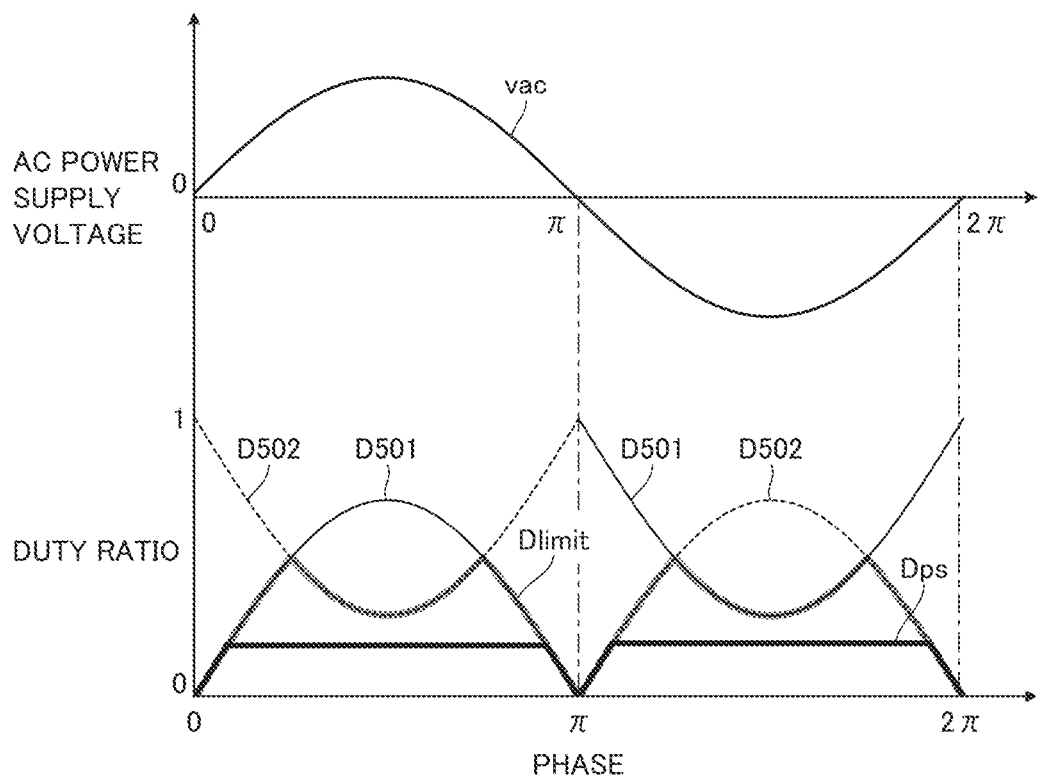
FIG. 9 is a diagram illustrating the trajectory of duty ratio D501 and duty ratio D502 and the phase shift amount Dps that satisfy the relation in Equation (16).

FIG. 9 is a diagram illustrating the trajectory of duty ratio D501 and duty ratio D502 and the phase shift amount Dps that satisfy the relation in Equation (16). In FIG. 9, the horizontal axis shows the phase of voltage vac of AC power supply 1. In the vicinity of the zero phase, low duty ratio Dlimit is extremely close to zero in principle and fails to satisfy the relation in Equation (16).

Then, control phase shift amount Dps_limit represented by Equation (17) is used for control so that the phase shift amount is always equal to or smaller than duty ratio Dlimit.

$$D_{ps\_limit} = \min\{D_{ps}, D_{limit}\} \qquad (17)$$

When phase shift amount Dps obtained by control circuit 14 is equal to or smaller than Dlimit, phase shift amount Dps is used for control. When phase shift amount Dps obtained by control circuit 14 exceeds Dlimit, Dlimit is used for control.

With the control as described above, control phase shift amount Dps_limit can be always equal to or smaller than the variable upper limit duty ratio Dlimit, irrespective of the phase of voltage vac of AC power supply 1.

Figure 10:
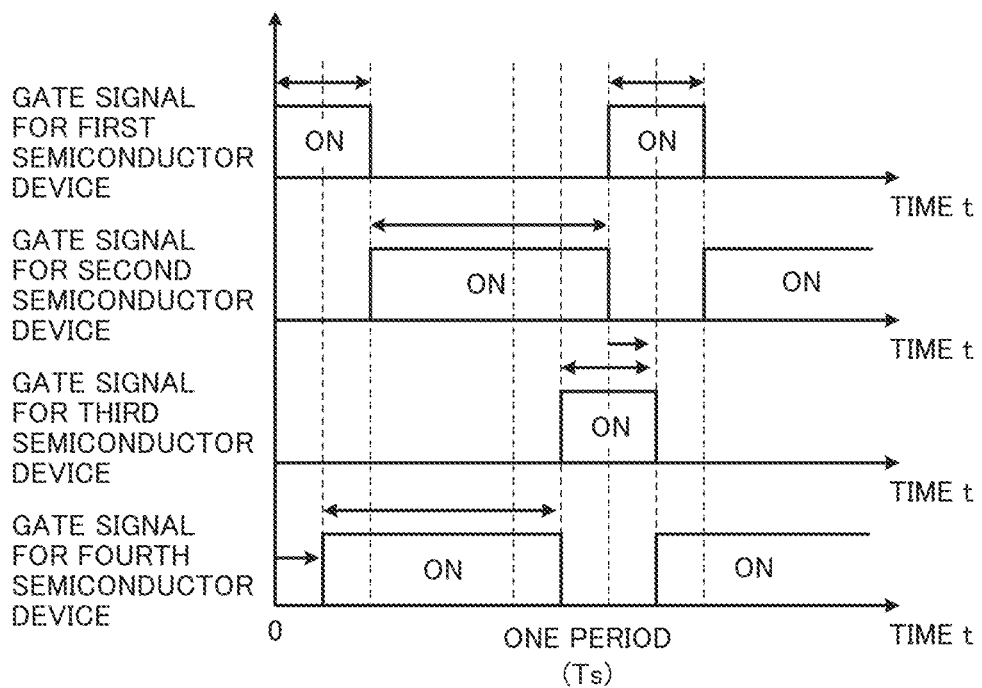
FIG. 10 is a diagram illustrating an example of gate pulses for first semiconductor device 501, second semiconductor device 502, third semiconductor device 601, and fourth semiconductor device 602 in a third control method.

FIG. 10 is a diagram illustrating an example of gate pulses for first semiconductor device 501, second semiconductor device 502, third semiconductor device 601, and fourth semiconductor device 602 in the third control method.

In the operation shown in FIG. 10, the initial state of phase shift control is defined as a state in which the timing when first semiconductor device 501 turns on and the timing when fourth semiconductor device 602 turns on are synchronized with each other, and the timing when second semiconductor device 502 turns off and the timing when third semiconductor device 601 turns off are synchronized with each other. Starting from this initial state, the pulse phase for third semiconductor device 601 and the pulse phase for fourth semiconductor device 602 are shifted. Further, the pulse width for first semiconductor device 501 and the pulse width for third semiconductor device 601 are equal, and the pulse width for second semiconductor device 502 and the pulse width for fourth semiconductor device 602 are equal. Control circuit 14 controls first semiconductor device 501, second semiconductor device 502, third semiconductor device 601, and fourth semiconductor device 602 such that those conditions are satisfied.

Figure 11:
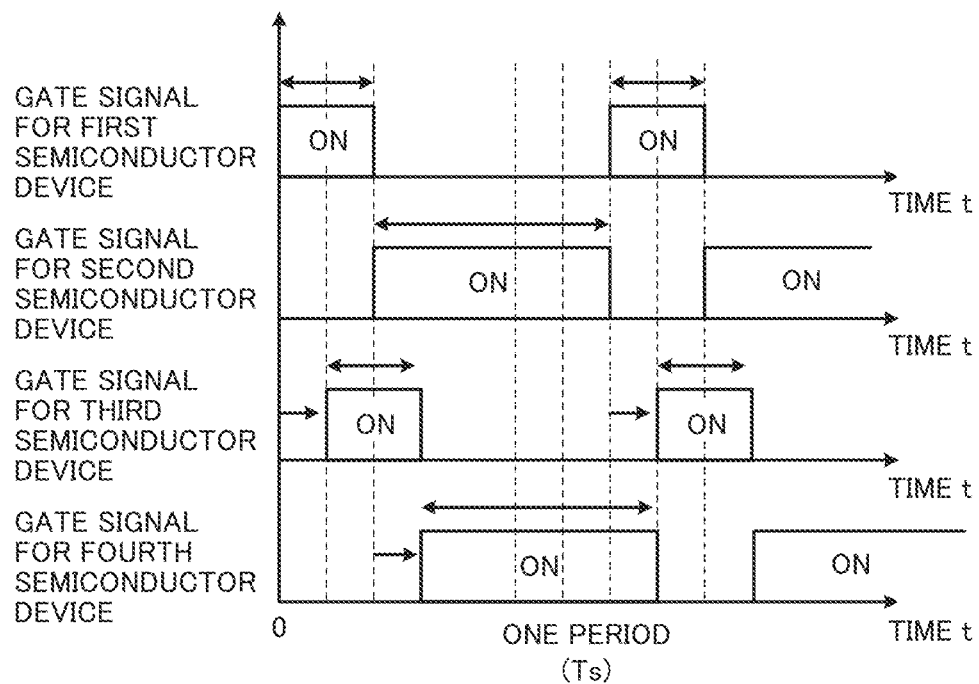
FIG. 11 is a diagram illustrating another example of gate pulses for first semiconductor device 501, second semiconductor device 502, third semiconductor device 601, and fourth semiconductor device 602 in the third control method.

FIG. 11 is a diagram illustrating another example of gate pulses for first semiconductor device 501, second semiconductor device 502, third semiconductor device 601, and fourth semiconductor device 602 in the third control method.

In the operation shown in FIG. 11, the initial state of phase shift control is defined as a state in which the timing when first semiconductor device 501 turns on and the timing when third semiconductor device 601 turns on are synchronized with each other, and the timing when second semiconductor device 502 turns on and the timing when fourth semiconductor device 602 turns on are synchronized with each other. Starting from this initial state, the pulse phase for third semiconductor device 601 and the pulse phase for fourth semiconductor device 602 are shifted. Further, the pulse width for first semiconductor device 501 and the pulse width for third semiconductor device 601 are equal, and the pulse width for second semiconductor device 502 and the pulse width for fourth semiconductor device 602 are equal. Control circuit 14 controls first semiconductor device 501, second semiconductor device 502, third semiconductor device 601, and fourth semiconductor device 602 such that those conditions are satisfied.

With the control as shown in FIG. 10 and FIG. 11, the duration in which the diagonally-positioned first semiconductor device 501 and fourth semiconductor device 602 turn on simultaneously can be identical to the duration in which the diagonally-positioned second semiconductor device 502 and third semiconductor device 601 turn on simultaneously, thereby enabling stable power supply.

(Second Control Method)

Figure 12:
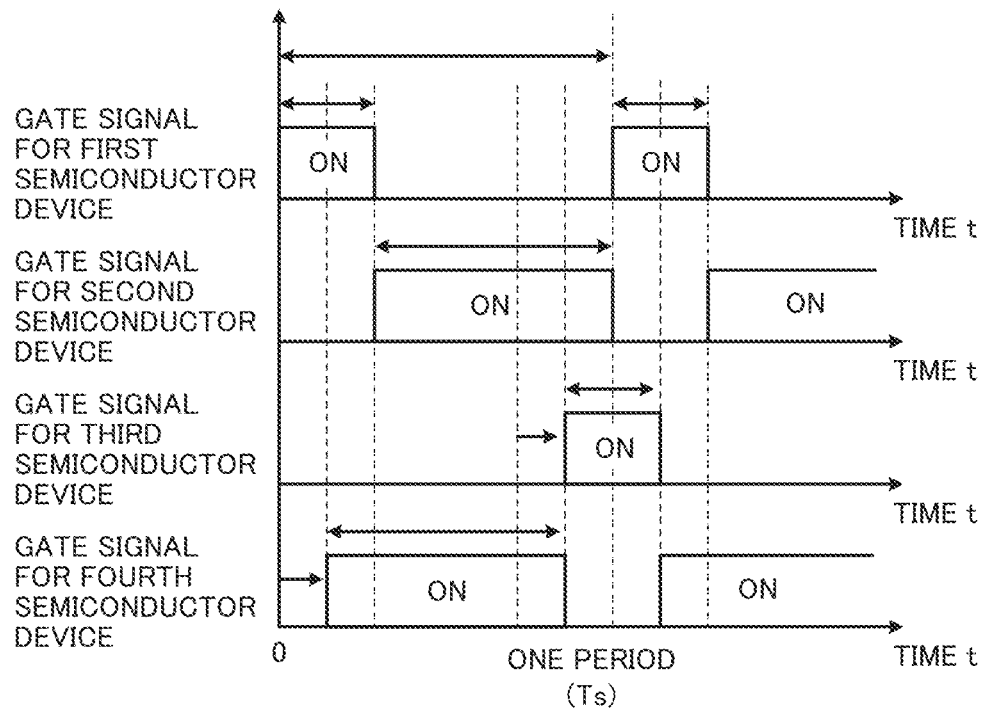
FIG. 12 is a diagram illustrating an example of gate pulses for first semiconductor device 501, second semiconductor device 502, third semiconductor device 601, and fourth semiconductor device 602 in a second control method.

FIG. 12 is a diagram illustrating an example of gate pulses for first semiconductor device 501, second semiconductor device 502, third semiconductor device 601, and fourth semiconductor device 602 in the second control method.

In the operation shown in FIG. 12, the initial state of phase shift control is defined as a state in which the timing when first semiconductor device 501 turns on and the timing when fourth semiconductor device 602 turns on are synchronized with each other, and the timing when second semiconductor device 502 turns off and the timing when third semiconductor device 601 turns off are synchronized with each other. Starting from this initial state, the pulse phase for third semiconductor device 601 and the pulse phase for fourth semiconductor device 602 are shifted. Further, the pulse width for first semiconductor device 501 and the pulse width for third semiconductor device 601 are equal, and the pulse width for second semiconductor device 502 and the pulse width for fourth semiconductor device 602 are equal. Control circuit 14 controls first semiconductor device 501, second semiconductor device 502, third semiconductor device 601, and fourth semiconductor device 602 such that switching frequency fs common to first semiconductor device 501, second semiconductor device 502, third semiconductor device 601, and fourth semiconductor device 602 changes while those conditions are satisfied.

Figure 13:
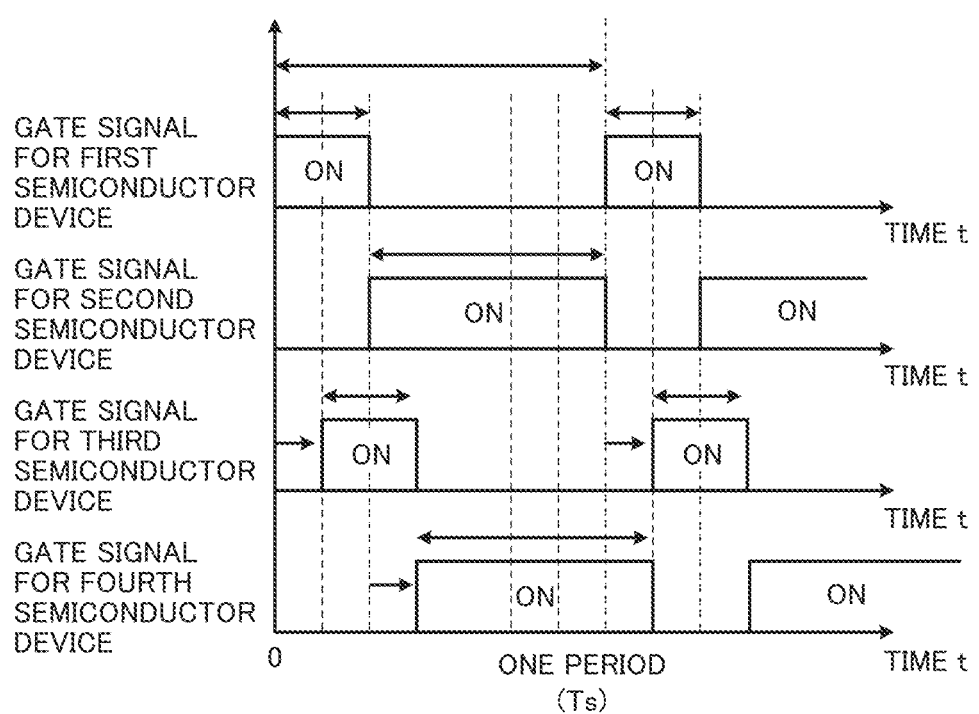
FIG. 13 is a diagram illustrating another example of gate pulses for first semiconductor device 501, second semiconductor device 502, third semiconductor device 601, and fourth semiconductor device 602 in the second control method.

FIG. 13 is a diagram illustrating another example of gate pulses for first semiconductor device 501, second semiconductor device 502, third semiconductor device 601, and fourth semiconductor device 602 in the second control method.

In the operation shown in FIG. 13, the initial state of phase shift control is defined as a state in which the timing when first semiconductor device 501 turns on and the timing when third semiconductor device 601 turns on are synchronized with each other, and the timing when second semiconductor device 502 turns on and the timing when fourth semiconductor device 602 turns on are synchronized with each other. Starting from this initial state, the pulse phase for third semiconductor device 601 and the pulse phase for fourth semiconductor device 602 are shifted. Further, the pulse width for first semiconductor device 501 and the pulse width for third semiconductor device 601 are equal, and the pulse width for second semiconductor device 502 and the pulse width for fourth semiconductor device 602 are equal. Control circuit 14 controls first semiconductor device 501, second semiconductor device 502, third semiconductor device 601, and fourth semiconductor device 602 such that switching frequency fs common to first semiconductor device 501, second semiconductor device 502, third semiconductor device 601, and fourth semiconductor device 602 changes while those conditions are satisfied.

With the control as shown in FIG. 12 and FIG. 13, the duration in which the diagonally-positioned first semiconductor device 501 and fourth semiconductor device 602 turn on simultaneously can be identical to the duration in which the diagonally-positioned second semiconductor device 502 and third semiconductor device 601 turn on simultaneously, thereby enabling stable power supply.

As explained above, control circuit 14 generates a gate signal based on at least one of frequency modulation control and phase shift control and performs output control, in addition to pulse width modulation control of third semiconductor device 601 and fourth semiconductor device 602. The semiconductor devices are not limited to insulated gate bipolar transistors (IGBTs) or metal oxide semiconductor field effect transistors (MOSFETs), and SiC (silicon carbide)-MOSFETs, GaN (gallium nitride)-FETs, and GaN-HEMTs (high electron mobility transistors) may be used.

(Control Circuit)

Control circuit 14 includes a plurality of control blocks. Power conversion apparatus 5000 has a constant power (CP) control mode in which input power pac (Iac×Vac×power factor) is constant and a constant current (CC) control mode in which output current iout is constant.

Figure 14:
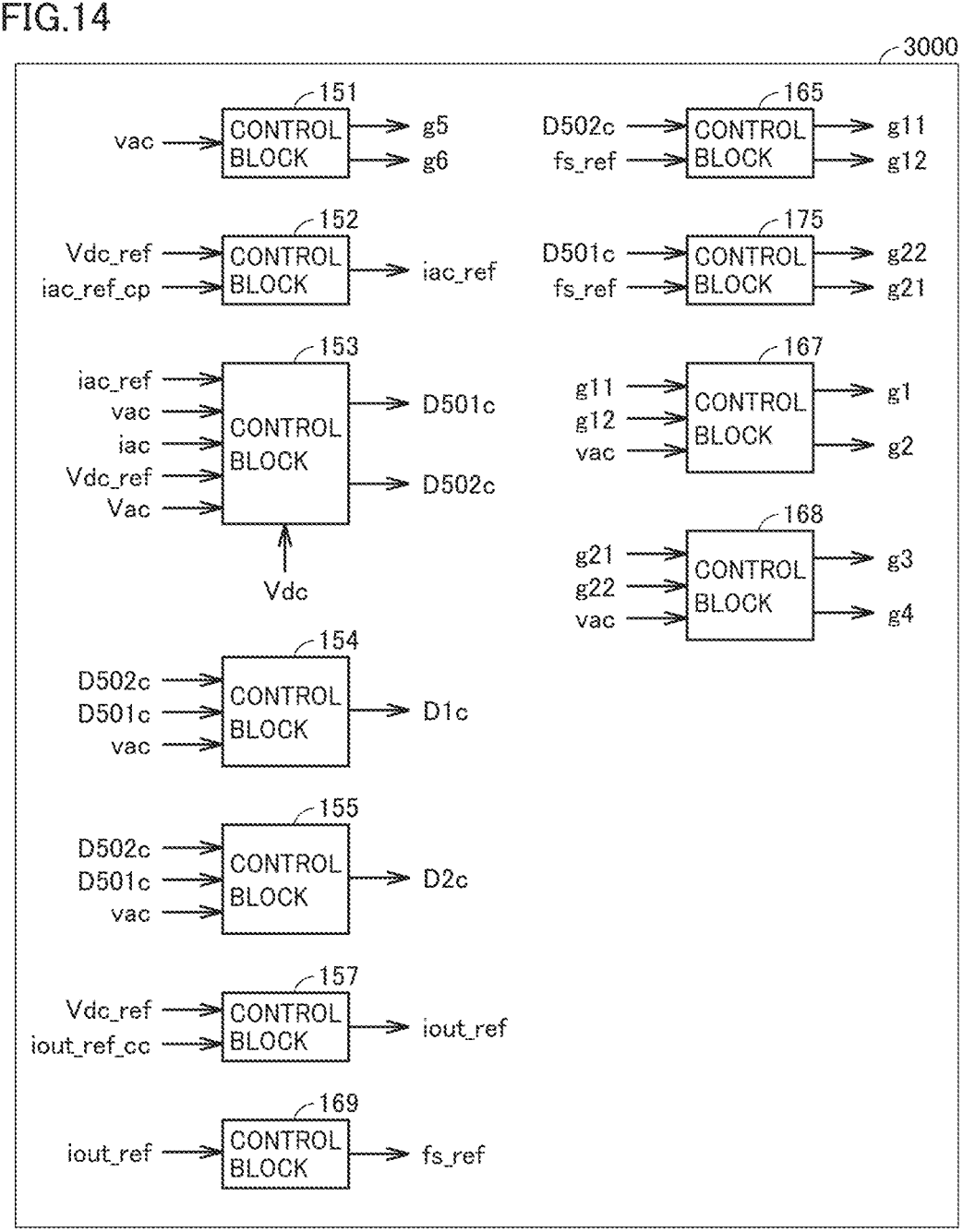
FIG. 14 is a diagram illustrating a plurality of control blocks serving to perform the first control method.

FIG. 14 is a diagram illustrating a plurality of control blocks serving to perform the first control method.

When voltage vac of AC power supply 1 has positive polarity, control block 151 brings gate signal g5 of fifth semiconductor device 301 to Low level to turn off fifth semiconductor device 301 and brings gate signal g6 of sixth semiconductor device 302 to High level to turn on sixth semiconductor device 302. When voltage vac of AC power supply 1 has negative polarity, control block 151 brings gate signal g5 of fifth semiconductor device 301 to High level to turn on fifth semiconductor device 301 and brings gate signal g6 of sixth semiconductor device 302 to Low level to turn off sixth semiconductor device 302.

In the CP control mode, control block 152 outputs the externally applied current command value iac_ref_cp of AC power supply 1 for CP control mode, as current command value iac_ref of AC power supply 1. In the CC control mode, control block 152 outputs current command value iac_ref_cp of AC power supply 1 for the CC control mode that is obtained by performing proportional integral control of the feedback amount obtained by subtracting DC voltage Vdc of DC capacitor 4 from voltage command value Vdc_ref of DC capacitor 4, as current command value iac_ref of AC power supply 1.

Control block 153 generates command value D501c of duty ratio D501 and command value D502c of duty ratio D502, based on voltage vac of AC power supply 1, effective voltage Vac of AC power supply 1, current iac of AC power supply 1, current command value iac_ref of AC power supply 1, DC voltage Vdc of DC capacitor 4, and DC voltage command value Vdc_ref of DC capacitor 4.

When voltage vac of AC power supply 1 has positive polarity, control block 154 outputs command value D501c of duty ratio D501 as command value D1c of the duty ratio of first semiconductor device 501. When voltage vac of AC power supply 1 has negative polarity, control block 154 outputs command value D502c of duty ratio D502 as command value D1c of the duty ratio of first semiconductor device 501.

When voltage vac of AC power supply 1 has positive polarity, control block 155 outputs command value D502c of duty ratio D502 as command value D2c of the duty ratio of second semiconductor device 502. When voltage vac of AC power supply 1 has negative polarity, control block 155 outputs command value D501c of duty ratio D501 as command value D2c of the duty ratio of second semiconductor device 502.

In the CC control mode, control block 157 outputs the externally applied current command value iout_ref cc of output current for the CC control mode, as current command value iout_ref of output current. In the CP control mode, control block 157 outputs current command value iout_ref cc of output current for the CP control mode that is obtained by performing proportional integral control of the feedback amount obtained by subtracting DC voltage Vdc of DC capacitor 4 from voltage command value Vdc_ref of DC capacitor 4, as current command value iout_ref of output current.

Control block 169 calculates differential current by subtracting output current iout from command value iout_ref of output current output from control block 157 and performs proportional control of the differential current to output command value fs_ref of switching frequency.

When command value D502c of duty ratio D502 output from control block 153 is smaller than a carrier wave having a frequency component of command value fs_ref of switching frequency output from control block 169, control block 165 brings first gate signal g11 for the first leg to High level and brings second gate signal g12 for the first leg to Low level. When command value D502c of duty ratio D502 output from control block 153 is equal to or larger than a carrier wave having a frequency component of command value fs_ref of switching frequency output from control block 169, control block 165 brings first gate signal g11 for the first leg to Low level and brings second gate signal g12 for the first leg to High level.

When command value D501c of duty ratio D501 output from control block 153 is smaller than a carrier wave having a frequency component of command value fs_ref of switching frequency output from control block 169, control block 175 brings first gate signal g21 for the second leg to High level and brings second gate signal g22 for the second leg to Low level. When command value D501c of duty ratio D501 output from control block 153 is equal to or larger than a carrier wave having a frequency component of command value fs_ref of switching frequency output from control block 169, control block 175 brings first gate signal g21 for the second leg to Low level and brings second gate signal g22 for the second leg to High level.

When voltage vac of AC power supply 1 has positive polarity, control block 167 outputs first gate signal g11 for the first leg as gate signal g1 of first semiconductor device 501 and outputs second gate signal g12 for the first leg as gate signal g2 of second semiconductor device 502. When voltage vac of AC power supply 1 has negative polarity, control block 167 outputs second gate signal g12 for the first leg as gate signal g1 of first semiconductor device 501 and outputs first gate signal g11 for the first leg as gate signal g2 of second semiconductor device 502.

When voltage vac of AC power supply 1 has positive polarity, control block 168 outputs first gate signal g21 for the second leg as gate signal g3 of third semiconductor device 601 and outputs second gate signal g22 for the second leg as gate signal g4 of fourth semiconductor device 602. When voltage vac of AC power supply 1 has negative polarity, control block 168 outputs second gate signal g22 for the second leg as gate signal g3 of third semiconductor device 601 and outputs first gate signal g21 for the second leg as gate signal g4 of fourth semiconductor device 602.

Figure 15:
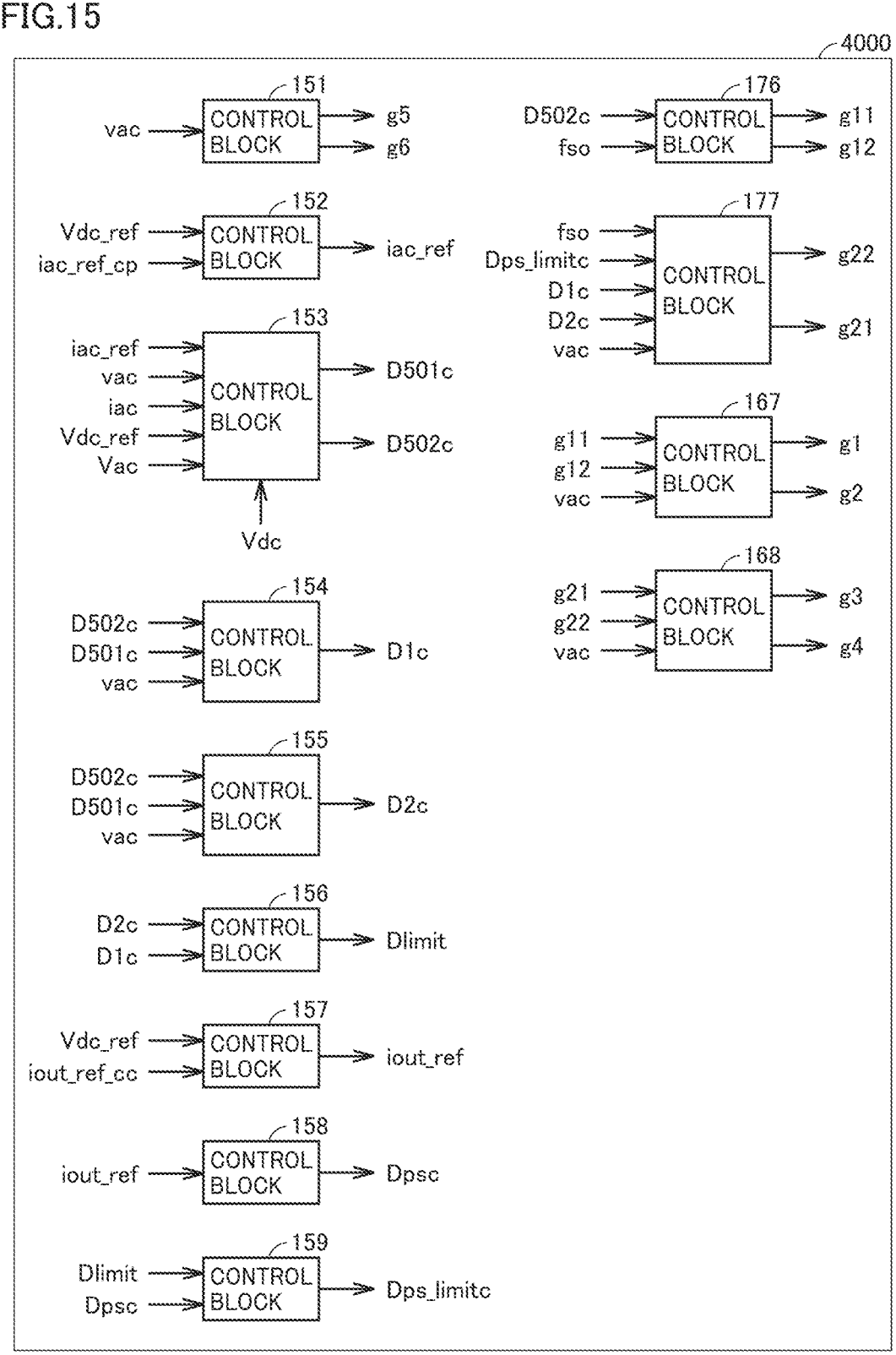
FIG. 15 is a diagram illustrating a plurality of control blocks serving to perform the third control method.

FIG. 15 is a diagram illustrating a plurality of control blocks serving to perform the third control method.

A plurality of control blocks in the third control method differ from a plurality of control blocks in the first control method in that a plurality of control blocks in the third control method include control blocks 156, 158, and 159 instead of control block 169 and includes control blocks 176 and 177 instead of control blocks 165 and 175.

When command value D1c of the duty ratio of first semiconductor device 501 is smaller than command value D2c of the duty ratio of second semiconductor device 502, control block 156 outputs command value D1c of the duty ratio of first semiconductor device 501 as low duty ratio Dlimit. When command value D1c of the duty ratio of first semiconductor device 501 is equal to or larger than command value D2c of the duty ratio of second semiconductor device 502, control block 156 outputs command value D2c of the duty ratio of second semiconductor device 502 as low duty ratio Dlimit.

Control block 158 outputs command value Dpsc of phase shift amount Dps that is obtained by performing proportional control of differential current as the feedback amount obtained by subtracting output current iout form command value iout_ref of output current.

When low duty ratio Dlimit is equal to or larger than command value Dpsc, control block 159 outputs command value Dpsc as command value Dps_limitc of control phase shift amount Dps_limit. When low duty ratio Dlimit is smaller than command value Dpsc, control block 159 outputs low duty ratio Dlimit as command value Dps_limitc of control phase shift amount Dps_limit.

When command value D502c of duty ratio D502 is smaller than a carrier wave having a frequency component of the fixed switching frequency fs0, control block 176 brings first gate signal g11 for the first leg to High level and brings second gate signal g12 for the first leg to Low level. When command value D502c of duty ratio D502 is equal to or larger than a carrier wave having a frequency component of the fixed switching frequency fs0, control block 176 brings first gate signal g11 for the first leg to Low level and brings second gate signal g12 for the first leg to High level.

Control block 177 obtains the sum W of command value D2c of the duty ratio of second semiconductor device 502 (when voltage vac of AC power supply 1 has positive polarity) or command value D1c of the duty ratio of first semiconductor device 501 (when voltage vac of AC power supply 1 has negative polarity) and command value Dps_limitc of control phase shift amount Dps_limit output from control block 159.

When a carrier wave having a frequency component of the fixed switching frequency fs0 is equal to or larger than command value Dps_limitc and the sum W is equal to or larger than a carrier wave having a frequency component of the fixed switching frequency fs0, control block 177 sets second gate signal g22 for the second leg to High level and sets first gate signal g11 for the first leg to Low level. When a carrier wave having a frequency component of the fixed switching frequency fs0 is equal to or larger than command value Dps_limitc and the sum W is smaller than a carrier wave having a frequency component of the fixed switching frequency fs0, control block 177 sets second gate signal g22 for the second leg to Low level and sets first gate signal g11 for the first leg to High level. When a carrier wave having a frequency component of the fixed switching frequency fs0 is smaller than command value Dps_limitc and the sum W is equal to or larger than a carrier wave having a frequency component of the fixed switching frequency fs0, control block 177 sets second gate signal g22 for the second leg to Low level and sets first gate signal g11 for the first leg to High level. When a carrier wave having a frequency component of the fixed switching frequency fs0 is smaller than command value Dps_limitc and the sum W is smaller than a carrier wave having a frequency component of the fixed switching frequency fs0, control block 177 sets second gate signal g22 for the second leg to Low level and sets first gate signal g11 for the first leg to High level.

Figure 16:
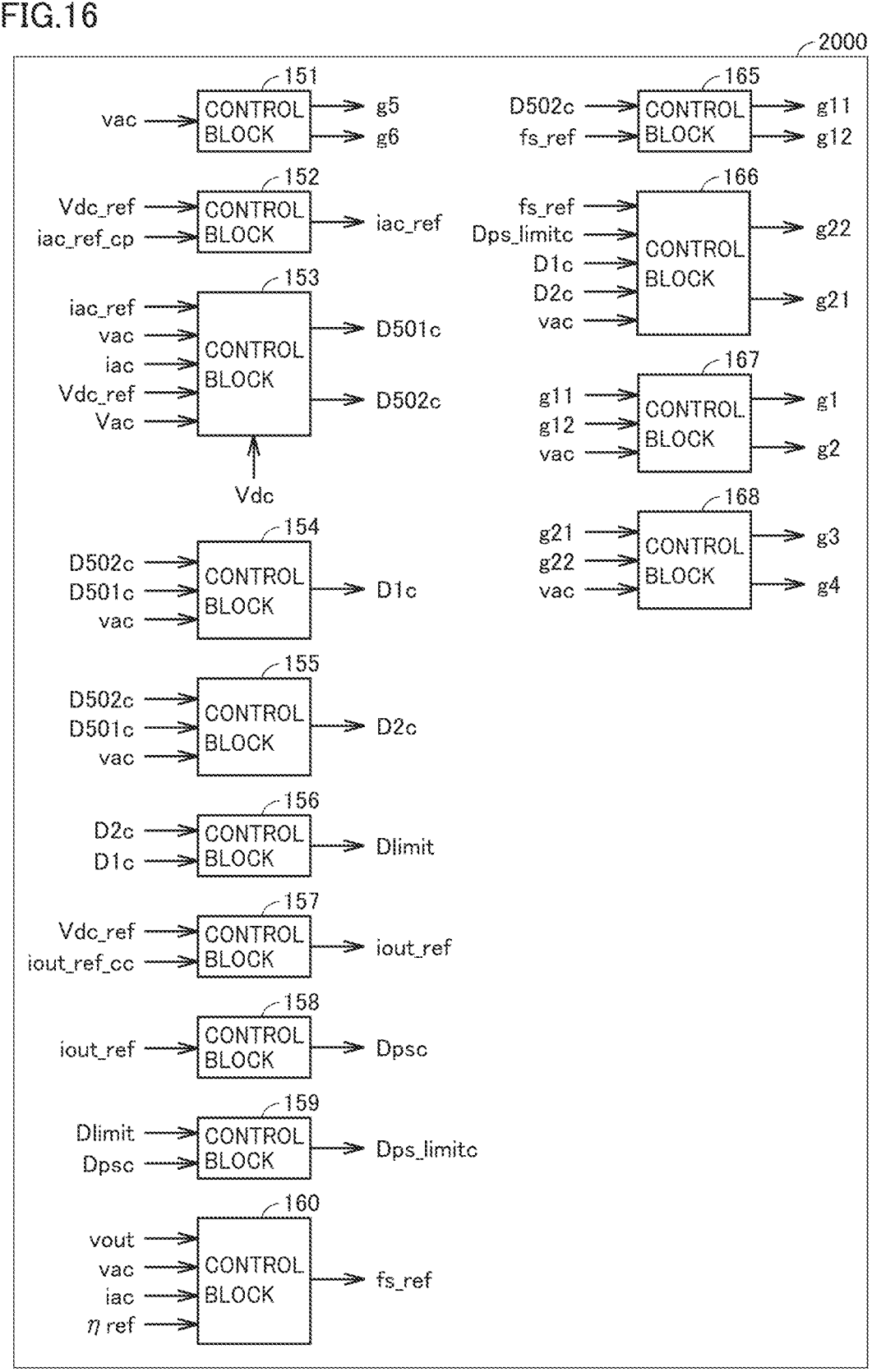
FIG. 16 is a diagram illustrating a plurality of control blocks serving to perform the second control method.

FIG. 16 is a diagram illustrating a plurality of control blocks serving to perform the second control method.

A plurality of control blocks in the second control method differ from a plurality of control blocks in the first control method in that a plurality of control blocks in the second control method include control blocks 156, 158, 159, and 160 instead of control block 169 and includes control block 166 instead of control block 175.

Control blocks 156, 158, and 159 are the same as those described in the third control method and will not be further elaborated.

Control block 160 divides output power PW1 obtained by multiplying output voltage Vout by output current iout by input power PW2 obtained by multiplying effective voltage Vac of AC power supply 1 by effective current Iac of AC power supply 1 to obtain conversion efficiency η. Control block 160 performs proportional integration of differential efficiency Sη as the feedback amount obtained by performing subtraction between a predetermined target efficiency ηra and conversion efficiency η and outputs command value fs_ref of switching frequency.

Control block 166 obtains the sum W of command value D2c of the duty ratio of second semiconductor device 502 (when voltage vac of AC power supply 1 has positive polarity) or command value D1c of the duty ratio of first semiconductor device 501 (when voltage vac of AC power supply 1 has negative polarity) and command value Dps_limitc of control phase shift amount Dps_limit output from control block 159.

When a carrier wave having a frequency component of command value fs_ref of switching frequency output from control block 160 is equal to or larger than command value Dps_limitc and the sum W is equal to or larger than a carrier wave having a frequency component of command value fs_ref of switching frequency output from control block 160, control block 166 sets second gate signal g22 for the second leg to High level and sets first gate signal g11 for the first leg to Low level. When a carrier wave having a frequency component of command value fs_ref of switching frequency output from control block 160 is equal to or larger than command value Dps_limitc and the sum W is smaller than a carrier wave having a frequency component of command value fs_ref of switching frequency output from control block 160, control block 166 sets second gate signal g22 for the second leg to Low level and sets first gate signal g11 for the first leg to High level. When a carrier wave having a frequency component of command value fs_ref of switching frequency output from control block 160 is smaller than command value Dps_limitc and the sum W is equal to or larger than a carrier wave having a frequency component of command value fs_ref of switching frequency output from control block 160, control block 166 sets second gate signal g22 for the second leg to Low level and sets first gate signal g11 for the first leg to High level. When a carrier wave having a frequency component of command value fs_ref of switching frequency output from control block 160 is smaller than command value Dps_limitc and the sum W is smaller than a carrier wave having a frequency component of command value fs_ref of switching frequency output from control block 160, control block 166 sets second gate signal g22 for the second leg to Low level and sets first gate signal g11 for the first leg to High level.

Figure 17:
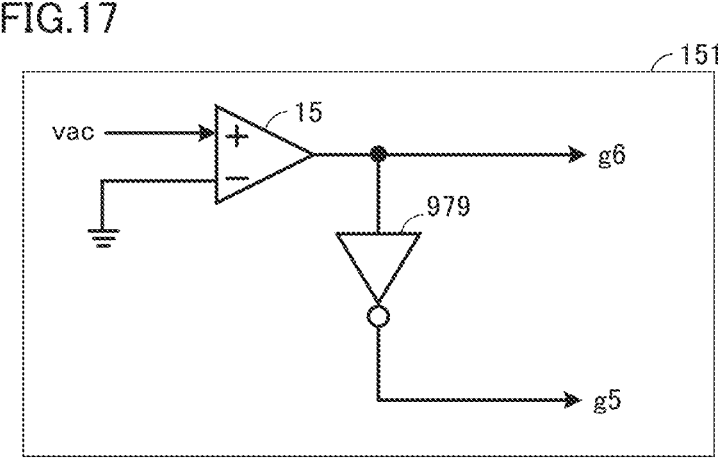
FIG. 17 is a diagram illustrating a control block 151 generating gate signal g5 of fifth semiconductor device 301 and gate signal g6 of sixth semiconductor device 302 in a third leg 300.

FIG. 17 is a diagram illustrating control block 151 generating gate signal g5 of fifth semiconductor device 301 and gate signal g6 of sixth semiconductor device 302 in third leg 300.

Control block 151 includes a comparator 15 and a logical NOT circuit 979. Comparator 15 compares voltage vac of AC power supply 1 detected by third voltage detector 677 with the ground voltage. Logical NOT circuit 979 receives the output of comparator 15. Gate signal g6 of sixth semiconductor device 302 is output from comparator 15. Gate signal g5 of fifth semiconductor device 301 is output from logical NOT circuit 979.

The operation of control block 151 is described.

When voltage vac obtained from third voltage detector 677 detecting voltage of AC power supply 1 has positive polarity, the output of comparator 15 is High level. As a result, gate signal g6 of sixth semiconductor device 302 goes to High level and sixth semiconductor device 302 turns on. Further, since the output of comparator 15 is input to logical NOT circuit 979, gate signal g5 of fifth semiconductor device 301 goes to Low level and fifth semiconductor device 301 turns off.

On the other hand, when the voltage obtained from third voltage detector 677 detecting voltage of AC power supply 1 has negative polarity, the output of comparator 15 is Low level. As a result, the gate signal of sixth semiconductor device 302 goes to Low level and sixth semiconductor device 302 turns off. Further, since the output of comparator 15 is input to logical NOT circuit 979, the gate signal of fifth semiconductor device 301 goes to High level and fifth semiconductor device 301 turns on.

Figure 18:
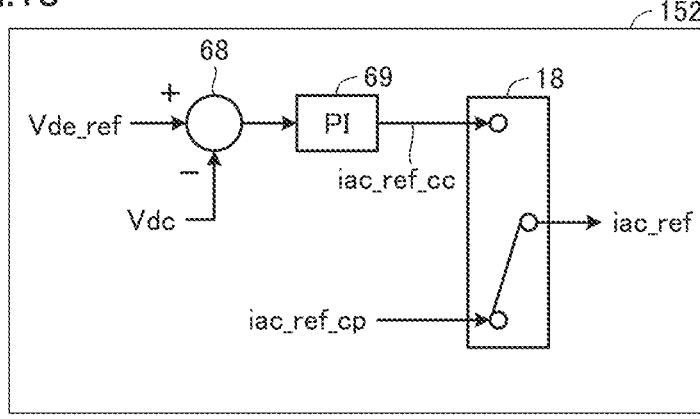
FIG. 18 is a diagram illustrating a control block 152 generating current command value iac_ref of AC power supply 1.

FIG. 18 is a diagram illustrating control block 152 generating current command value iac_ref of AC power supply 1.

Control block 152 includes a subtracter 68, a PI controller 69, and a selector 18.

Subtracter 68 subtracts DC voltage Vdc of DC capacitor 4 detected by first voltage detector 675 from voltage command value Vdc_ref of the DC capacitor to obtain the feedback amount.

PI controller 68 performs proportional integral control of the output of subtracter 68 to output current command value iac_ref cc of AC power supply 1 for the CC control mode.

Selector 18 receives current command value iac_ref cc of AC power supply 1 for the CC control mode output from PI controller 68 and current command value iac_ref_cp of AC power supply 1 for the CP control mode. Here, current command value iac_ref_cp is a predetermined target current effective value. A multiplexer may be used instead of selector 18.

The operation of control block 152 is described.

In the CP control mode, current command value iac_ref_cp of AC power supply 1 for the CP control mode is selected by selector 18 and output as current command value iac_ref of AC power supply 1.

In the CC control mode, current command value iac_ref cc obtained by subtracter 68 and PI controller 69 is selected by selector 18 and output as current command value iac_ref of AC power supply 1.

Figure 19:
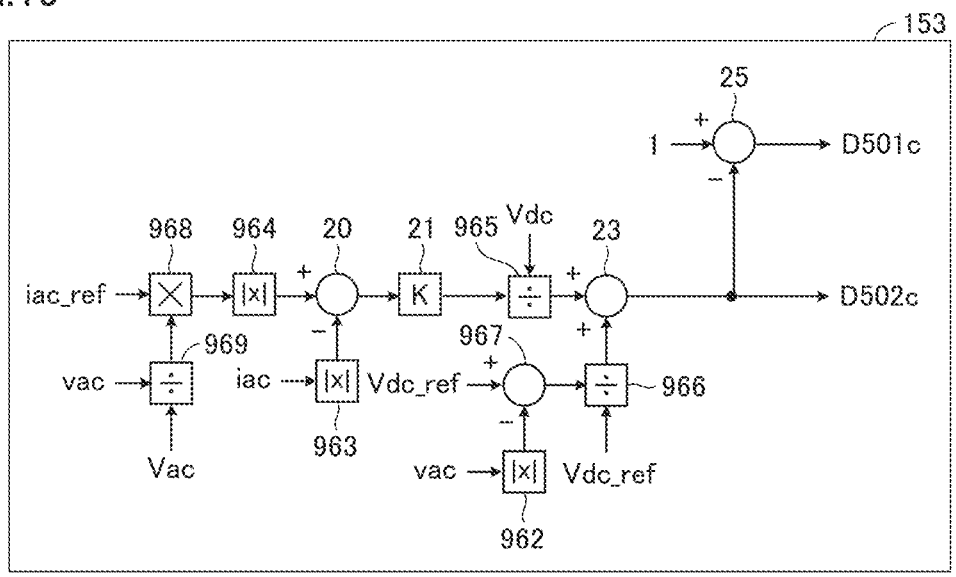
FIG. 19 is a diagram illustrating a control block 153 generating command value D501c of duty ratio D501 and command value D502c of duty ratio D502.

FIG. 19 is a diagram illustrating control block 153 generating command value D501c of duty ratio D501 and command value D502c of duty ratio D502.

Control block 153 includes a divider 969, a multiplier 968, an absolute value output unit 964, an absolute value output unit 963, a subtracter 20, a proportional controller 21, a divider 965, an absolute value output unit 962, a subtracter 967, a divider 966, an adder 23, and a subtracter 25.

Divider 969 outputs a value obtained by dividing voltage vac of AC power supply 1 obtained from third voltage detector 677 by effective voltage Vac of AC power supply 1.

Multiplier 968 multiplies current command value iac_ref of AC power supply 1 by the output of divider 969 to generate a target sinusoidal current waveform of AC power supply 1 in phase with sinusoidal voltage vac of AC power supply 1.

Absolute value output unit 964 outputs the absolute value of the target sinusoidal current waveform of AC power supply 1.

Absolute value output unit 963 outputs the absolute value of current iac of AC power supply 1 obtained from first current detector 678.

Subtracter 20 calculates the current difference between the absolute value of the target sinusoidal current waveform output from absolute value output unit 964 and the absolute value of current iac of AC power supply 1 output from absolute value output unit 963, as the feedback amount.

Proportional controller 21 performs proportional control of the feedback amount output from subtracter 20.

Divider 965 divides the output of proportional controller 21 by DC voltage Vdc of DC capacitor 4.

Absolute value output unit 962 outputs the absolute value of voltage vac of AC power supply 1 obtained from third voltage detector 677.

Subtracter 967 calculates the difference between target value Vdc_ref of voltage of DC capacitor 4 and the absolute value of voltage vac of AC power supply 1 output from absolute value output unit 962.

Divider 966 divides the output of subtracter 967 by target value Vdc_ref of voltage of DC capacitor 4 to calculate a feedforward term represented by Equation (14).

Adder 23 adds the feedforward term output from divider 966 to the value output from divider 965 to output command value D502c of duty ratio D502.

Subtracter 25 subtracts command value D502c of duty ratio D502 from a numerical value "1" to output command value D501c of duty ratio D501.

Figure 20:
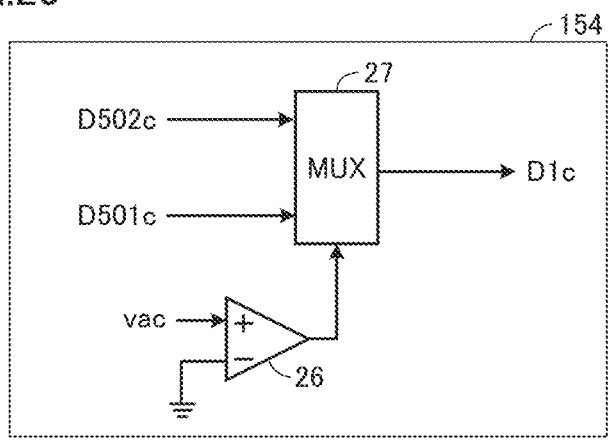
FIG. 20 is a diagram illustrating a control block 154 generating duty ratio command value D1c of first semiconductor device 501.

FIG. 20 is a diagram illustrating control block 154 generating duty ratio command value D1c of first semiconductor device 501.

Control block 154 includes a multiplexer (MUX) 27 and a comparator 26.

Comparator 26 compares voltage vac of AC power supply 1 detected by third voltage detector 677 with the ground voltage to output a signal indicating the comparison result.

Multiplexer (MUX) 27 receives command value D501c of duty ratio D501 and command value D502c of duty ratio D502. Multiplexer (MUX) 27 outputs one of the inputs command values as command value D1c of the duty ratio of first semiconductor device 501, in accordance with an output signal of comparator 26.

The operation of control block 154 is described.

When voltage vac obtained from third voltage detector 677 detecting voltage of AC power supply 1 has positive polarity, the output of comparator 26 is High level. Multiplexer (MUX) 27 outputs command value D501c of duty ratio D501 as command value D1c of the duty ratio of first semiconductor device 501.

On the other hand, when voltage vac obtained from third voltage detector 677 detecting voltage of AC power supply 1 has negative polarity, the output of comparator 26 is Low level. Multiplexer (MUX) 27 outputs command value D502c of duty ratio D502 as command value D1c of the duty ratio of first semiconductor device 501.

Figure 21:
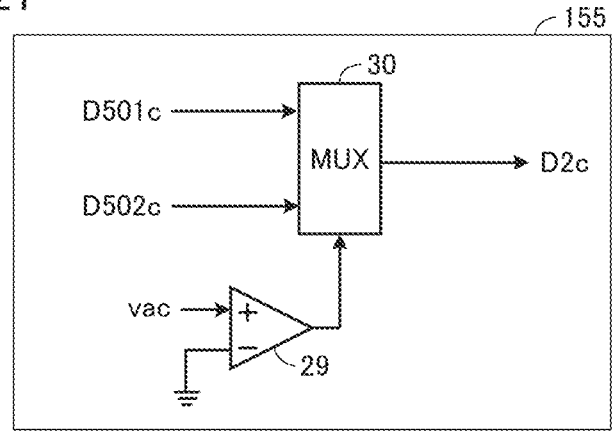
FIG. 21 is a diagram illustrating a control block 155 generating duty ratio command value D2c of second semiconductor device 502.

FIG. 21 is a diagram illustrating control block 155 generating duty ratio command value D2c of second semiconductor device 502.

Control block 155 includes a multiplexer (MUX) 30 and a comparator 29.

Comparator 29 compares voltage vac of AC power supply 1 detected by third voltage detector 677 with the ground voltage to output a signal indicating the comparison result.

Multiplexer (MUX) 30 receives command value D501c of duty ratio D501 and command value D502c of duty ratio D502. Multiplexer (MUX) 30 outputs one of the input command values as command value D2c of the duty ratio of second semiconductor device 502, in accordance with an output signal of comparator 29.

The operation of control block 155 is described.

When voltage vac obtained from third voltage detector 677 detecting voltage of AC power supply 1 has positive polarity, the output 29 of comparator 29 is High level. Multiplexer (MUX) 30 outputs command value D502c of duty ratio D502 as command value D2c of the duty ratio of second semiconductor device 502.

On the other hand, when voltage vac obtained from third voltage detector 677 detecting voltage of AC power supply 1 has negative polarity, the output of comparator 29 is Low level. Multiplexer (MUX) 30 outputs command value D501c of duty ratio D501 as command value D2c of the duty ratio of second semiconductor device 502.

Figure 22:
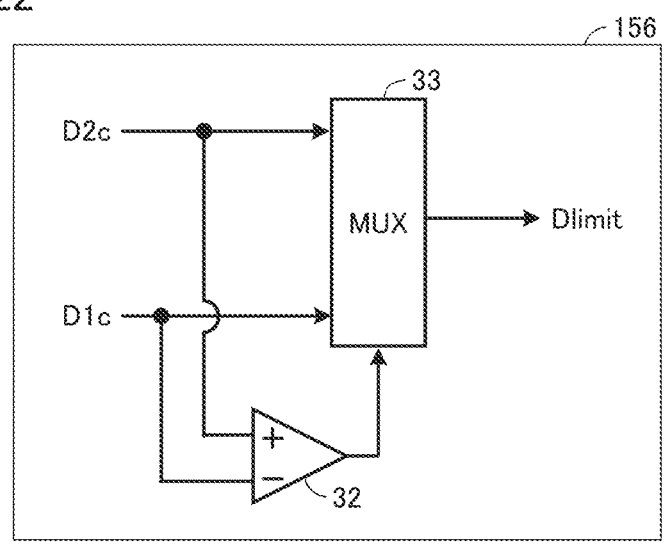
FIG. 22 is a diagram illustrating a control block 156 generating low duty ratio Dlimit.

FIG. 22 is a diagram illustrating control block 156 generating low duty ratio Dlimit.

Control block 156 includes a comparator 32 and a multiplexer (MUX) 33.

Comparator 32 compares command value D2c of the duty ratio of second semiconductor device 502 with command value D1c of the duty ratio of first semiconductor device 501 to output a signal indicating the comparison result.

Multiplexer (MUX) 33 receives command value D2c of the duty ratio of second semiconductor device 502 and command value D1c of the duty ratio of first semiconductor device 501. Multiplexer (MUX) 33 outputs one of the input command values as low duty ratio Dlimit, in accordance with an output signal of comparator 32.

The operation of control block 156 is described.

When command value D1c of the duty ratio of first semiconductor device 501 is smaller than command value D2c of the duty ratio of second semiconductor device 502, the output 32 of the comparator is High level. Multiplexer (MUX) 33 outputs command value D1c of the duty ratio of first semiconductor device 501 as low duty ratio Dlimit.

On the other hand, when command value D1c of the duty ratio of first semiconductor device 501 is equal to or larger than command value D2c of the duty ratio of second semiconductor device 502, the output 32 of the comparator is Low level. Multiplexer (MUX) 33 outputs command value D2c of the duty ratio of second semiconductor device 502 as low duty ratio Dlimit.

Figure 23:
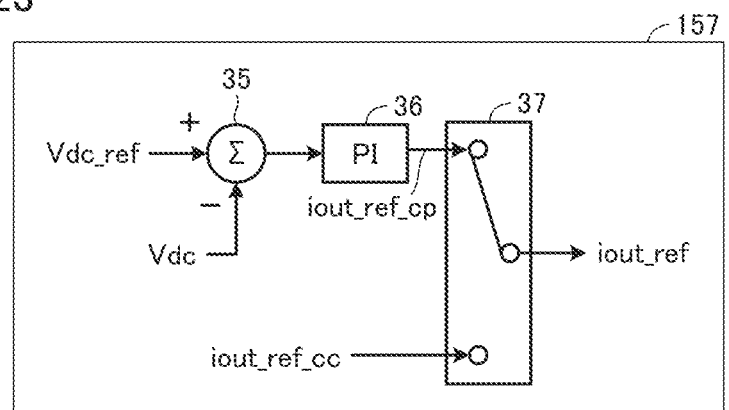
FIG. 23 is a diagram illustrating a control block 157 generating command value iout_ref of output current.

FIG. 23 is a diagram illustrating control block 157 generating command value iout_ref of output current.

Control block 157 includes a subtracter 35, a PI controller 36, and a selector 37.

Subtracter 35 subtracts DC voltage Vdc of DC capacitor 4 detected by first voltage detector 675 from voltage command value Vdc_ref of the DC capacitor to obtain the feedback amount.

PI controller 36 performs proportional integral control of the output of subtracter 35 to output current command value iout_ref_cp of output current for the CP control mode.

Selector 37 receives current command value iout_ref_cp of output current for the CP control mode output from PI controller 36 and current command value iout_ref cc of output current for the CC control mode. Here, current command value iout_ref cc is a predetermined target current effective value. A multiplexer may be used instead of selector 37.

The operation of control block 157 is described.

In the CC control mode, current command value iout_ref cc of output current for the CC control mode is selected by selector 37 and output as current command value iout_ref of output current.

In the CP control mode, current command value iout_ref_cp of output current for the CP control mode obtained by subtracter 35 and PI controller 36 is selected by selector 37 and output as current command value iout_ref of output current.

Figure 24:
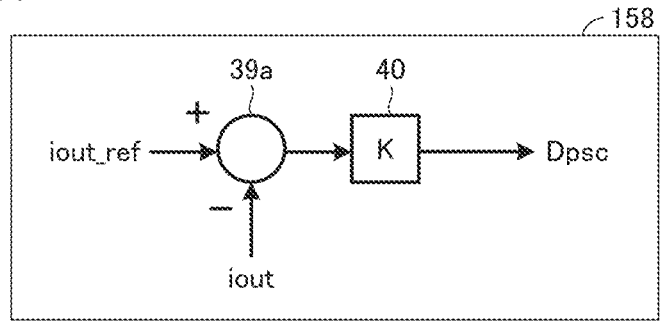
FIG. 24 is a diagram illustrating a control block 158 generating command value Dpsc of phase shift amount Dps.

FIG. 24 is a diagram illustrating control block 158 generating command value Dpsc of phase shift amount Dps.

Control block 158 includes a subtracter 39a and a proportional controller 40.

Subtracter 39a subtracts output current iout detected by second current detector 679 from command value iout_ref of output current output from control block 157 in FIG. 23 to calculate differential current as the feedback amount.

Proportional controller 40 performs proportional control of the differential current to output command value Dpsc of phase shift amount Dps.

Figure 25:
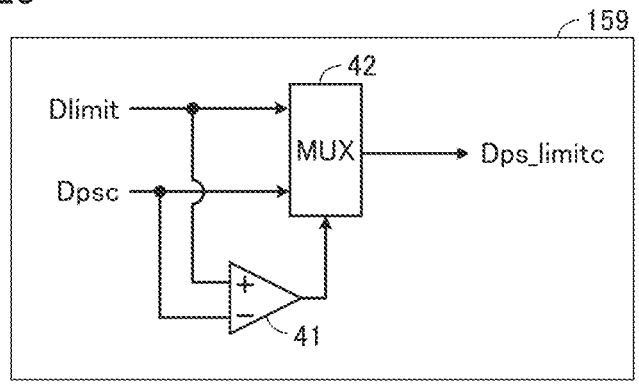
FIG. 25 is a diagram illustrating a control block 159 generating command value Dps_limitc of control phase shift amount Dps_limit.

FIG. 25 is a diagram illustrating control block 159 generating command value Dps_limitc of control phase shift amount Dps_limit.

Control block 159 includes a comparator 41 and a multiplexer (MUX) 42.

Comparator 41 compares low duty ratio Dlimit calculated by control block 156 in FIG. 22 with command value Dpsc of phase shift amount Dps calculated by control block 158 in FIG. 24 and outputs a signal indicating the comparison result.

Multiplexer (MUX) 42 receives the low duty ratio and command value Dpsc. Multiplexer (MUX) 42 outputs one of the inputs as command value Dps_limitc of control phase shift amount Dps_limit, in accordance with an output signal of comparator 41.

The operation of control block 159 is described.

When low duty ratio Dlimit is equal to or larger than command value Dpsc, the output of comparator 41 is High level. Multiplexer (MUX) 42 outputs command value Dpsc as command value Dps_limitc of control phase shift amount Dps_limit.

On the other hand, when low duty ratio Dlimit is smaller than command value Dpsc, the output of comparator 41 is Low level. Multiplexer (MUX) 42 outputs low duty ratio Dlimit as command value Dps_limitc of control phase shift amount Dps_limit.

Figure 26:
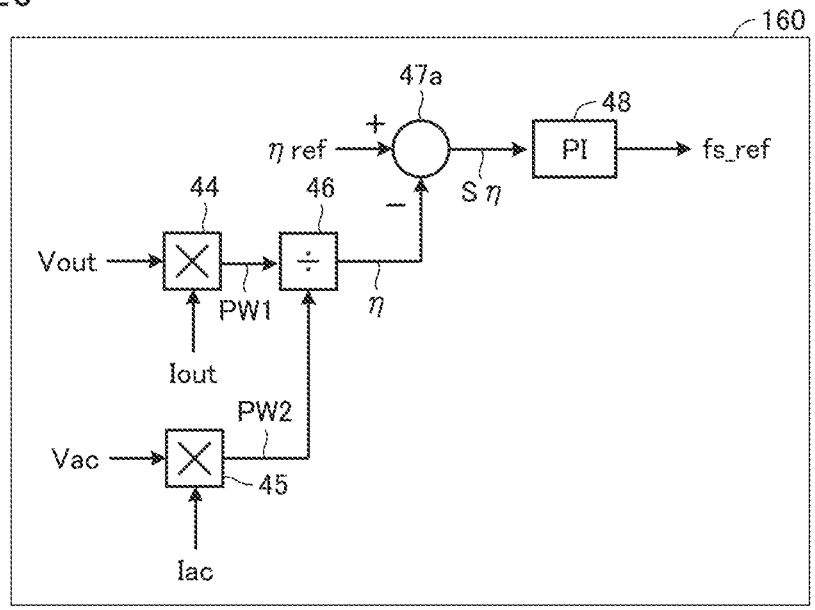
FIG. 26 is a diagram illustrating a control block 160 generating command value fs_ref of switching frequency.

FIG. 26 is a diagram illustrating control block 160 generating command value fs_ref of switching frequency.

Control block 160 includes a multiplier 44, a multiplier 45, a divider 46, a subtracter 47a, and a PI controller 48.

Multiplier 44 multiplies output voltage Vout obtained from second voltage detector 676 by output current iout obtained from second current detector 679 to output output power PW1.

Multiplier 45 multiplies effective voltage Vac of AC power supply 1 obtained from third voltage detector 677 by effective current Iac of AC power supply 1 obtained from first current detector 678 to output input power PW2.

Divider 46 divides output power PW1 by input power PW2 to output conversion efficiency η.

Subtracter 47a performs subtraction between a predetermined target efficiency lira and conversion efficiency output from divider 46 to calculate differential efficiency Sη as the feedback amount.

PI controller 48 performs proportional integral control of differential efficiency Sη to output command value fs_ref of switching frequency. It is noted that input power PW2 is active power that reflects the input power factor.

Figure 27:
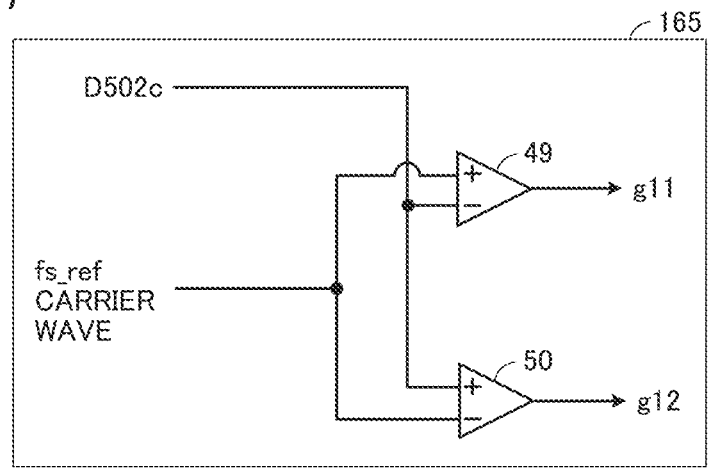
FIG. 27 is a diagram illustrating a control block 165 generating gate signals g11 and g12 for semiconductor devices that constitute a first leg 500.

FIG. 27 is a diagram illustrating control block 165 generating gate signals g11 and g12 for semiconductor devices that constitute first leg 500.

Control block 165 includes a comparator 49 and a comparator 50.

Comparator 49 compares a carrier wave having a frequency component of command value fs_ref of switching frequency with command value D502c of duty ratio D502 calculated by control block 153 in FIG. 19 to set the level of first gate signal g11 for the first leg based on the comparison result.

Comparator 50 compares command value D502c of duty ratio D502 calculated by control block 153 in FIG. 19 with a carrier wave having a frequency component of command value fs_ref of switching frequency to set the level of second gate signal g12 for the first leg based on the comparison result.

The operation of control block 165 is described.

When command value D502c of duty ratio D502 is smaller than a carrier wave having a frequency component of command value fs_ref of switching frequency, first gate signal g11 for the first leg output by comparator 49 goes to High level, and second gate signal g12 for the first leg output by comparator 50 goes to Low level.

On the other hand, when command value D502c of duty ratio D502 is equal to or larger than a carrier wave having a frequency component of command value fs_ref of switching frequency, first gate signal g11 for the first leg output by comparator 49 goes to Low level, and second gate signal g12 for the first leg output by comparator 50 goes to High level.

Figure 28:
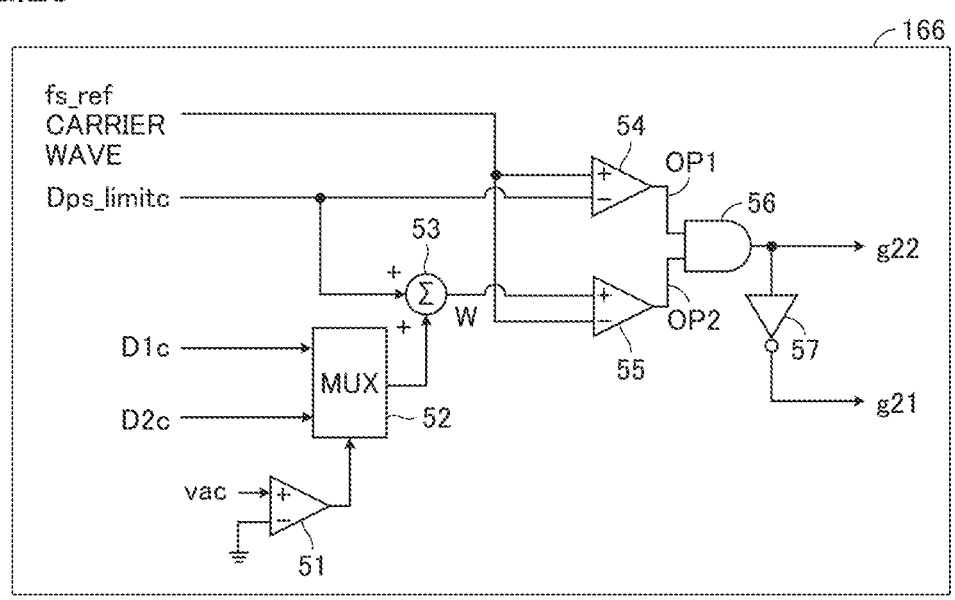
FIG. 28 is a diagram illustrating a control block 166 generating gate signals g21 and g22 for semiconductor devices that constitute a second leg 600.

FIG. 28 is a diagram illustrating control block 166 generating gate signals g21 and g22 for semiconductor devices that constitute second leg 600.

Control block 166 includes a comparator 51, a multiplexer (MUX) 52, an adder 53, a comparator 54, a comparator 55, a logical AND circuit 56, and a logical NOT circuit 57.

When voltage vac of AC power supply 1 obtained from third voltage detector 677 has positive polarity, the output of comparator 51 is High level. Multiplexer (MUX) 52 outputs command value D2c of the duty ratio of second semiconductor device 502.

On the other hand, when voltage vac of AC power supply 1 obtained from third voltage detector 677 has negative polarity, the output of comparator 51 is Low level. Multiplexer (MUX) 52 outputs command value D1c of the duty ratio of first semiconductor device 501.

Adder 53 adds command value Dps_limitc of control phase shift amount Dps_limit output from control block 159 to the output value of multiplexer (MUX) 52 to calculate an arithmetic operation value.

Comparator 54 compares a carrier wave having a frequency component of command value fs_ref of switching frequency calculated by control block 160 with command value Dps_limitc and outputs comparison result OP1.

Comparator 54 compares a carrier wave having a frequency component of command value fs_ref of switching frequency calculated by control block 160 with the output value of adder 53 and outputs comparison result OP2.

Logical AND circuit 56 performs logical AND operation of comparison result OP1 and comparison result OP2, so that second gate signal g22 for the second leg is output.

Logical NOT circuit 57 inverts the logical AND of comparison result OP1 and comparison result OP2 and outputs first gate signal g21 for the second leg.

Figure 29:
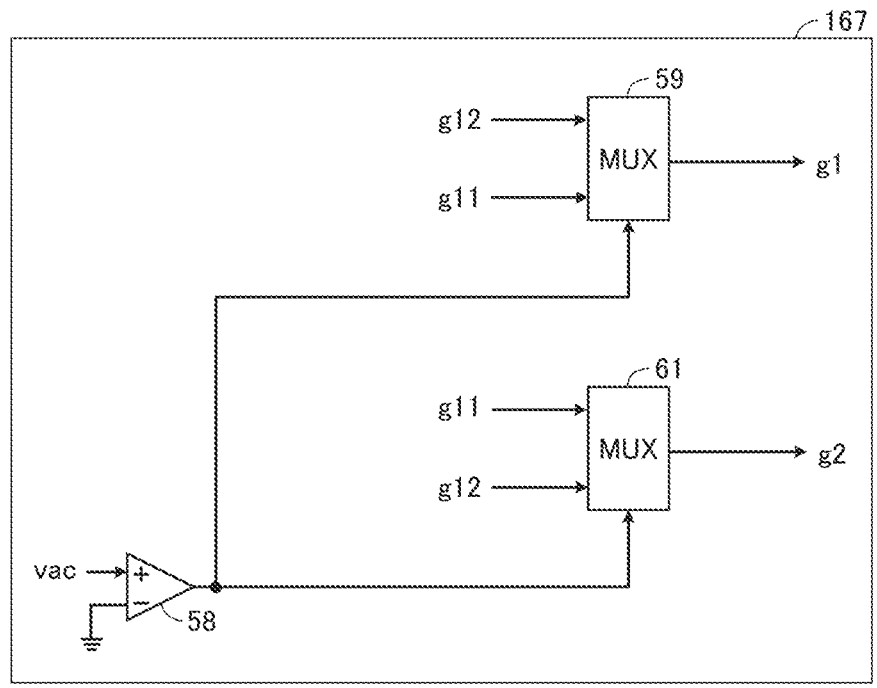
FIG. 29 is a diagram illustrating a control block 167 generating gate signal g1 of first semiconductor device 501 and gate signal g2 of second semiconductor device 502.

FIG. 29 is a diagram illustrating control block 167 generating gate signal g1 of first semiconductor device 501 and gate signal g2 of second semiconductor device 502.

Control block 167 includes a comparator 58, a multiplexer 59, and a multiplexer 61.

Comparator 58 compares voltage vac of AC power supply 1 detected by third voltage detector 677 with the ground voltage and outputs a signal representing the comparison result.

Multiplexer (MUX) 59 receives first gate signal g11 for the first leg and second gate signal g12 for the first leg. Multiplexer (MUX) 59 outputs one of the input gate signals as gate signal g1 of first semiconductor device 501, in accordance with an output signal of comparator 58.

Multiplexer (MUX) 61 receives first gate signal g11 for the first leg and second gate signal g12 for the first leg. Multiplexer (MUX) 61 outputs one of the input gate signals as gate signal g2 of second semiconductor device 502, in accordance with an output signal of comparator 58.

The operation of control block 167 is described.

When voltage vac of AC power supply 1 obtained from third voltage detector 677 detecting voltage of AC power supply 1 has positive polarity, the output of comparator 58 is High level. Multiplexer (MUX) 59 outputs first gate signal g11 for the first leg as gate signal g1 of first semiconductor device 501. Multiplexer (MUX) 61 outputs second gate signal g12 for the first leg as gate signal g2 of second semiconductor device 502.

On the other hand, when voltage vac of AC power supply 1 obtained from third voltage detector 677 detecting voltage of AC power supply 1 has negative polarity, the output of comparator 58 is Low level. Multiplexer (MUX) 59 outputs second gate signal g12 for the first leg as gate signal g1 of first semiconductor device 501. Multiplexer (MUX) 61 outputs first gate signal g11 for the first leg as gate signal g2 of second semiconductor device 502.

Figure 30:
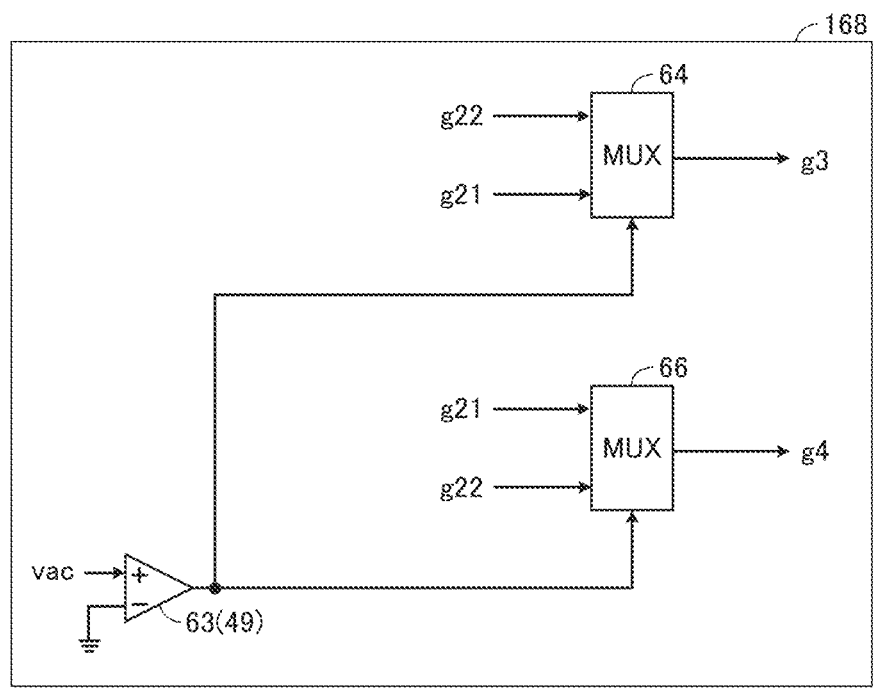
FIG. 30 is a diagram illustrating a control block 168 generating gate signal g3 of third semiconductor device 601 and gate signal g4 of fourth semiconductor device 602.

FIG. 30 is a diagram illustrating control block 168 generating gate signal g3 of third semiconductor device 601 and gate signal g4 of fourth semiconductor device 602.

Control block 168 includes a comparator 49, a multiplexer 64, and a multiplexer 65.

Comparator 49 compares voltage vac of AC power supply 1 detected by third voltage detector 677 with the ground voltage and outputs a signal representing the comparison result.

Multiplexer (MUX) 64 receives first gate signal g21 for the second leg and second gate signal g22 for the second leg. Multiplexer (MUX) 64 outputs one of the input gate signals as gate signal g3 of third semiconductor device 601, in accordance with an output signal of comparator 49.

Multiplexer (MUX) 66 receives first gate signal g21 for the second leg and second gate signal g22 for the second leg. Multiplexer (MUX) 66 outputs one of the input gate signals as gate signal g4 of fourth semiconductor device 602, in accordance with an output signal of comparator 49.

The operation of control block 168 is described.

When voltage vac of AC power supply 1 obtained from third voltage detector 677 detecting voltage of AC power supply 1 has positive polarity, the output of comparator 49 is High level. Multiplexer (MUX) 64 outputs first gate signal g21 for the second leg as gate signal g3 of third semiconductor device 601. Multiplexer (MUX) 66 outputs second gate signal g22 for the second leg as gate signal g4 of fourth semiconductor device 602.

On the other hand, when voltage vac of AC power supply 1 obtained from third voltage detector 677 detecting voltage of AC power supply 1 has negative polarity, the output of comparator 49 is Low level. Multiplexer (MUX) 64 outputs second gate signal g22 for the second leg as gate signal g3 of third semiconductor device 601. Multiplexer (MUX) 66 outputs first gate signal g21 for the second leg as gate signal g4 of fourth semiconductor device 602.

Figure 31:
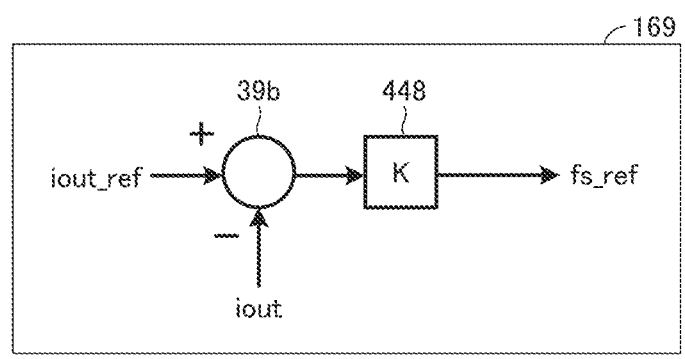
FIG. 31 is a diagram illustrating a control block 169 generating command value fs_ref of switching frequency.

FIG. 31 is a diagram illustrating control block 169 generating command value fs_ref of switching frequency.

Control block 169 includes a subtracter 39b and a proportional controller 448.

Subtracter 39b subtracts output current iout detected by second current detector 679 from command value iout_ref of output current output from control block 157 in FIG. 23 to calculate differential current as the feedback amount.

Proportional controller 448 performs proportional control of the differential current to output command value fs_ref of switching frequency.

Figure 32:
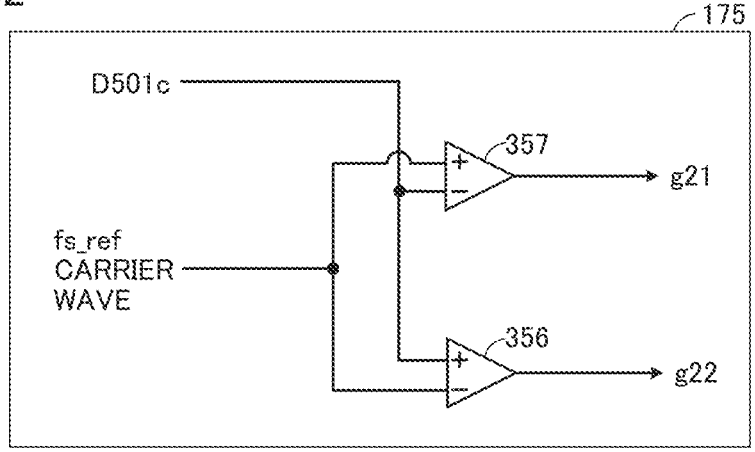
FIG. 32 is a diagram illustrating a control block 175 generating gate signals g21 and g22 for semiconductor devices that constitute second leg 600.

FIG. 32 is a diagram illustrating control block 175 generating gate signals g21 and g22 for semiconductor devices that constitute second leg 600.

Control block 175 includes a comparator 357 and a comparator 356.

Comparator 357 compares a carrier wave having a frequency component of command value fs_ref of switching frequency with command value D501c of duty ratio D501 calculated by control block 153 in FIG. 19 to set the level of first gate signal g21 for the second leg based on the comparison result.

Comparator 356 compares command value D501c of duty ratio D501 calculated by control block 153 in FIG. 19 with a carrier wave having a frequency component of command value fs_ref of switching frequency to set the level of second gate signal g22 for the second leg based on the comparison result.

The operation of control block 175 is described.

When command value D501c of duty ratio D501 is smaller than a carrier wave having a frequency component of command value fs_ref of switching frequency, first gate signal g21 for the second leg output by comparator 357 is High level, and second gate signal g22 for the second leg output by comparator 356 is Low level.

On the other hand, when command value D501c of duty ratio D501 is equal to or larger than a carrier wave having a frequency component of command value fs_ref of switching frequency, first gate signal g21 for the second leg output by comparator 357 is Low level, and second gate signal g22 for the second leg output by comparator 356 is High level.

Figure 33:
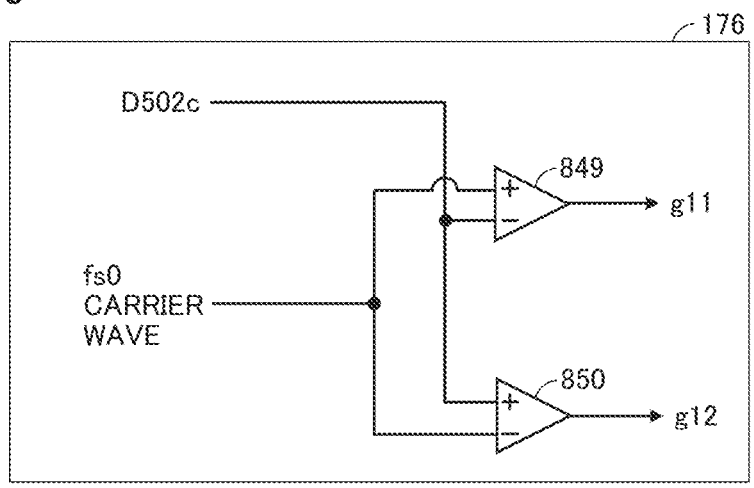
FIG. 33 is a diagram illustrating a control block 176 generating gate signals g11 and g12 for semiconductor devices that constitute first leg 500.

FIG. 33 is a diagram illustrating control block 176 generating gate signals g11 and g12 for semiconductor devices that constitute first leg 500.

Control block 176 includes a comparator 849 and a comparator 850.

Comparator 849 compares a carrier wave having a component of the fixed switching frequency with command value D502c of duty ratio D502 calculated by control block 153 in FIG. 19 to set the level of first gate signal g11 for the first leg based on the comparison result.

Comparator 850 compares command value D502c of duty ratio D502 calculated by control block 153 in FIG. 19 with a carrier wave having a component of the fixed switching frequency to set the level of second gate signal g12 for the first leg based on the comparison result.

The operation of control block 176 is described.

When command value D502c of duty ratio D502 is smaller than a carrier wave having a frequency component of the fixed switching frequency fs0, first gate signal g11 for the first leg output by comparator 849 is High level, and second gate signal g12 for the first leg output by comparator 850 is Low level.

On the other hand, when command value D502c of duty ratio D502 is equal to or larger than a carrier wave having a frequency component of the fixed switching frequency fs0, first gate signal g11 for the first leg output by comparator 849 is Low level, and second gate signal g12 for the first leg output by comparator 850 is High level.

Figure 34:
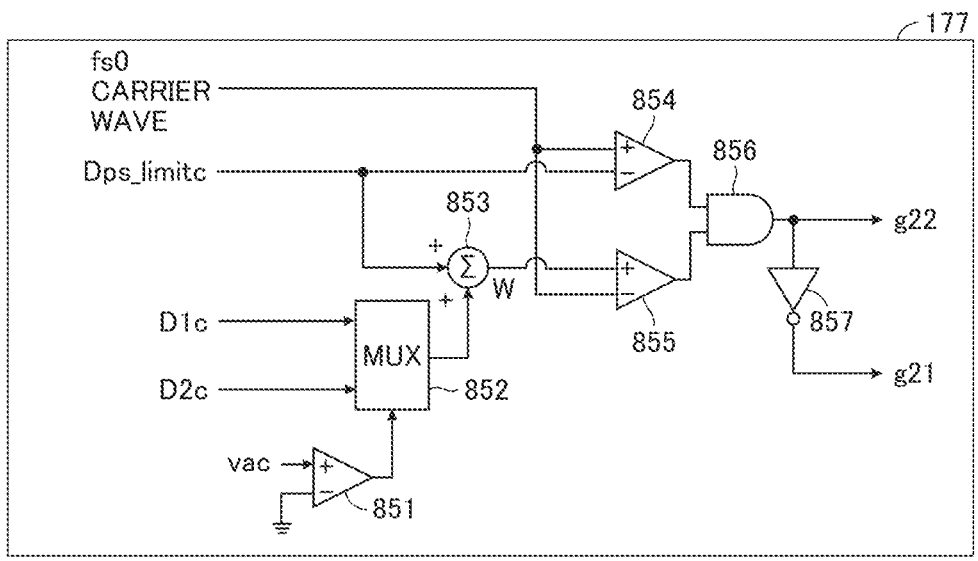
FIG. 34 is a diagram illustrating a control block 177 generating gate signals g21 and g22 for semiconductor devices that constitute second leg 600.

FIG. 34 is a diagram illustrating control block 177 generating gate signals g21 and g22 for semiconductor devices that constitute second leg 600.

Control block 177 includes a comparator 851, a multiplexer (MUX) 852, an adder 853, a comparator 854, a comparator 855, a logical AND circuit 856, and a logical NOT circuit 857.

When voltage vac of AC power supply 1 obtained from third voltage detector 677 has positive polarity, the output of comparator 851 is High level. Multiplexer (MUX) 852 outputs command value D2c of the duty ratio of second semiconductor device 502.

On the other hand, when voltage vac of AC power supply 1 obtained from third voltage detector 677 has negative polarity, the output of comparator 851 is Low level. Multiplexer (MUX) 852 outputs command value D1c of the duty ratio of first semiconductor device 501.

Adder 853 adds command value Dps_limitc of control phase shift amount Dps_limit output from control block 159 to the output value of multiplexer (MUX) 852 to calculate an arithmetic operation value.

Comparator 854 compares a carrier wave having a frequency component of the fixed switching frequency with command value Dps_limitc and outputs comparison result OP1.

Comparator 855 compares a carrier wave having a frequency component of command value fs_ref of the fixed switching frequency with the output value of adder 853 and outputs comparison result OP2.

Logical AND circuit 856 performs logical AND operation of comparison result OP1 and comparison result OP2 to output second gate signal g22 for the second leg.

Logical NOT circuit 857 inverts the logical AND of comparison result OP1 and comparison result OP2 and outputs first gate signal g21 for the second leg.

In the power conversion apparatus in the present embodiment, at least one of frequency modulation control and phase shift control is used at the same time in addition to pulse frequency modulation control, whereby high power factor control and output control are achieved at the same time with one full-bridge inverter circuit. This configuration enables output control in a wide range with a small frequency variation range, suppresses loss increase of the semiconductor devices and the magnetic components, and prevents destruction of the semiconductor devices and the magnetic components.

First Modification to First Embodiment

FIG. 35 is a diagram illustrating a control method in a first modification to the first embodiment.

Control circuit 14 controls first leg 500, second leg 600, and third leg 300 based on the third control method, in a region in which target value M* of voltage conversion ratio M is larger than threshold TH1. Control circuit 14 controls first leg 500 by pulse width modulation control. Control circuit 14 controls second leg 600 by pulse width modulation control and phase shift modulation control. Control circuit 14 allows third leg 300 to perform rectification control.

Control circuit 14 controls first leg 500, second leg 600, and third leg 300 based on the second control method, in a region in which target value M* of voltage conversion ratio M is equal to or smaller than threshold TH1 and is larger than threshold TH2. Control circuit 14 controls first leg 500 by pulse width modulation control and pulse frequency modulation control. Control circuit 14 controls second leg 600 by pulse width modulation control, pulse frequency modulation control, and phase shift modulation. Control circuit 14 allows third leg 300 to perform rectification control.

Control circuit 14 controls first leg 500, second leg 600, and third leg 300 based on the first control method, in a region in which target value M* of voltage conversion ratio M is equal to or smaller than threshold TH2. Control circuit 14 controls first leg 500 by pulse width modulation control and pulse frequency control. Control circuit 14 controls second leg 600 by pulse width modulation control and pulse frequency modulation control. Control circuit 14 allows third leg 300 to perform rectification control.

Second Modification to First Embodiment

FIG. 36 is a diagram illustrating a control method in a second modification to the first embodiment.

Control circuit 14 controls first leg 500, second leg 600, and third leg 300 based on the first control method, in a region in which target value M* of voltage conversion ratio M is larger than threshold TH. Control circuit 14 controls first leg 500 by pulse width modulation control and pulse frequency modulation control. Control circuit 14 controls second leg 600 by pulse width modulation control and pulse frequency modulation control. Control circuit 14 allows third leg 300 to perform rectification control.

Control circuit 14 controls first leg 500, second leg 600, and third leg 300 based on the second control method, in a region in which target value M* of voltage conversion ratio M is equal to or smaller than threshold TH. Control circuit 14 controls first leg 500 by pulse width modulation control and pulse frequency modulation control. Control circuit 14 controls second leg 600 by pulse width modulation control, pulse frequency modulation control, and phase shift modulation. Control circuit 14 allows third leg 300 to perform rectification control.

Third Modification to First Embodiment

FIG. 37 is a diagram illustrating a control method in a third modification to the first embodiment.

Control circuit 14 controls first leg 500, second leg 600, and third leg 300 based on the second control method, in a region in which target value M* of voltage conversion ratio M is larger than threshold TH. Control circuit 14 controls first leg 500 by pulse width modulation control and pulse frequency modulation control. Control circuit 14 controls second leg 600 by pulse width modulation control, pulse frequency modulation control, and phase shift modulation. Control circuit 14 allows third leg 300 to perform rectification control.

Control circuit 14 controls first leg 500, second leg 600, and third leg 300 based on the third control method, in a region in which target value M* of voltage conversion ratio M is equal to or smaller than threshold TH. Control circuit 14 controls first leg 500 by pulse width modulation control. Control circuit 14 controls second leg 600 by pulse width modulation control and phase shift modulation. Control circuit 14 allows third leg 300 to perform rectification control.

Second Embodiment

The circuit configuration of the power conversion apparatus in the present embodiment is generally similar to the case shown in the first embodiment, and a detailed description of the configuration will not be repeated.

In a second embodiment, first semiconductor device 501 and second semiconductor device 502 that constitute first leg 500 and fifth semiconductor device 301 and sixth semiconductor device 302 that constitute third leg 300 are subjected to high power factor control, and third semiconductor device 601 and the fourth semiconductor device that constitute second leg 600 are subjected to output control.

FIG. 38 is a diagram illustrating a control method in the second embodiment.

Control circuit 14 controls first leg 500, second leg 600, and third leg 300 based on a fourth control method, in a region in which target value M* of voltage conversion ratio M is larger than threshold TH1. Control circuit 14 controls first leg 500 by pulse width modulation control and pulse frequency modulation control. Control circuit 14 controls second leg 600 by pulse width modulation control and pulse frequency modulation control. Control circuit 14 controls third leg 300 by pulse width modulation control and pulse frequency modulation control.

Control circuit 14 controls first leg 500, second leg 600, and third leg 300 based on a fifth control method, in a region in which target value M* of voltage conversion ratio M is equal to or smaller than threshold TH1 and is larger than threshold TH2. Control circuit 14 controls first leg 500 by pulse width modulation control and pulse frequency modulation control. Control circuit 14 controls second leg 600 by pulse width modulation control, pulse frequency modulation control, and phase shift modulation. Control circuit 14 controls third leg 300 by pulse width modulation control and pulse frequency modulation control.

Control circuit 14 controls first leg 500, second leg 600, and third leg 300 based on a sixth control method, in a region in which target value M* of voltage conversion ratio M is equal to or smaller than threshold TH2. Control circuit 14 controls first leg 500 by pulse width modulation control. Control circuit 14 controls second leg 600 by pulse width modulation control and phase shift modulation control. Control circuit 14 controls third leg 300 by pulse width modulation control.

(Fourth Control Method)

FIG. 39 is a diagram illustrating an example of gate pulses for first semiconductor device 501, second semiconductor device 502, third semiconductor device 601, fourth semiconductor device 602, fifth semiconductor device 301, and sixth semiconductor device 302 in the fourth control method.

In the operation shown in FIG. 39, the pulse of first semiconductor device 501 and the pulse of sixth semiconductor device 302 are synchronized with each other, and the pulse of second semiconductor device 502 and the pulse of fifth semiconductor device 301 are synchronized with each other. Further, the timing when first semiconductor device 501 turns on, the timing when sixth semiconductor device 302 turns on, and the timing when fourth semiconductor device 602 turns on are synchronized with each other, and the timing when second semiconductor device 502 turns off, the timing when fifth semiconductor device 301 turns off, and the timing when third semiconductor device 601 turns off are synchronized with each other. Further, the pulse width for first semiconductor device 501, the pulse width for third semiconductor device 601, and the pulse width for sixth semiconductor device 302 are equal, and the pulse width for second semiconductor device 502, the pulse width for fourth semiconductor device 602, and the pulse width for fifth semiconductor device 301 are equal. Control circuit 14 controls first semiconductor device 501, second semiconductor device 502, third semiconductor device 601, fourth semiconductor device 602, fifth semiconductor device 301, and sixth semiconductor device 302 such that switching frequency fs common to first semiconductor device 501, second semiconductor device 502, third semiconductor device 601, fourth semiconductor device 602, fifth semiconductor device 301, and sixth semiconductor device 302 changes while those conditions are satisfied.

Figure 40:
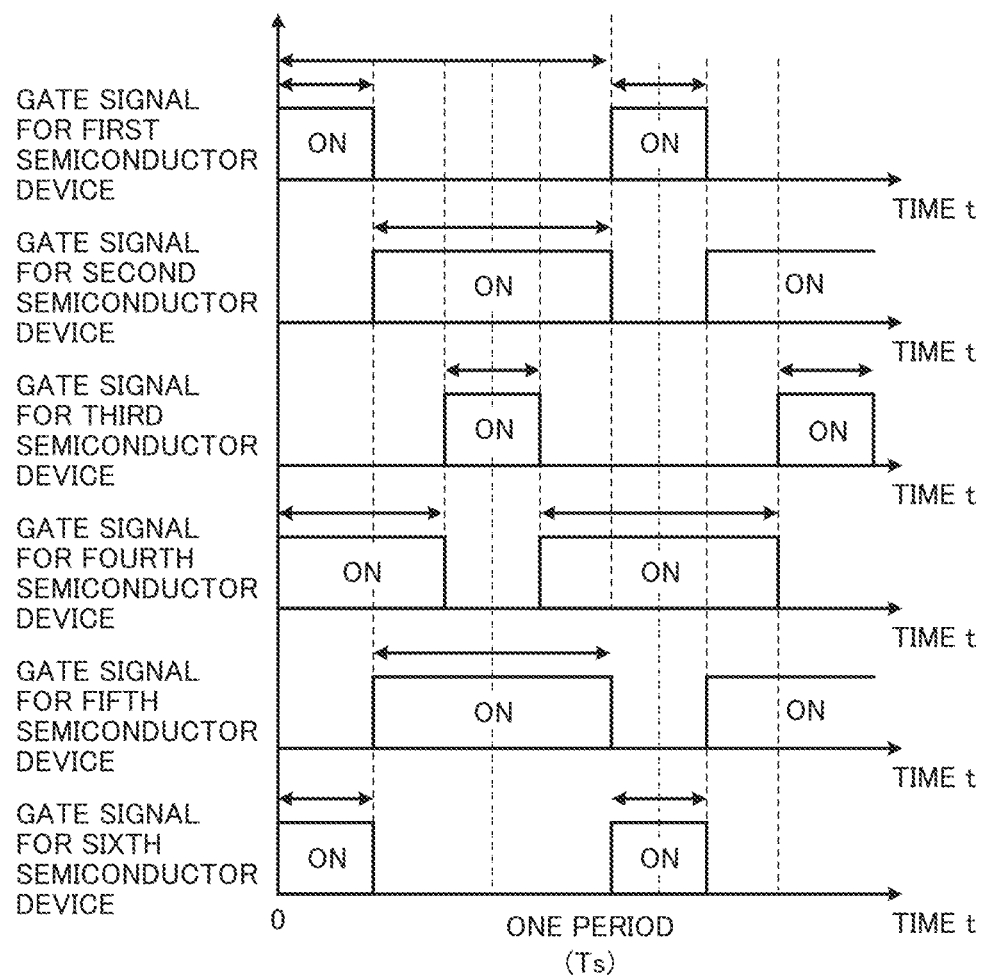
FIG. 40 is a diagram illustrating another example of gate pulses for first semiconductor device 501, second semiconductor device 502, third semiconductor device 601, fourth semiconductor device 602, fifth semiconductor device 301, and sixth semiconductor device 302 in the fourth control method.

FIG. 40 is a diagram illustrating another example of gate pulses for first semiconductor device 501, second semiconductor device 502, third semiconductor device 601, fourth semiconductor device 602, fifth semiconductor device 301, and sixth semiconductor device 302 in the fourth control method.

In the operation shown in FIG. 40, the pulse of first semiconductor device 501 and the pulse of sixth semiconductor device 302 are synchronized with each other, and the pulse of second semiconductor device 502 and the pulse of fifth semiconductor device 301 are synchronized with each other. Further, the center phase of the gate pulse for first semiconductor device 501, the center phase of the gate pulse for fourth semiconductor device 602, and the center phase of the gate pulse for sixth semiconductor device 302 are synchronized with each other, and the center phase of the gate pulse for second semiconductor device 502, the center phase of the gate pulse for third semiconductor device 601, and the center phase of the gate pulse for fifth semiconductor device 301 are synchronized with each other. Further, the pulse width for first semiconductor device 501, the pulse width for third semiconductor device 601, and the pulse width for sixth semiconductor device 302 are equal, and the pulse width for second semiconductor device 502, the pulse width for fourth semiconductor device 602, and the pulse width for fifth semiconductor device 301 are equal. Control circuit 14 controls first semiconductor device 501, second semiconductor device 502, third semiconductor device 601, fourth semiconductor device 602, fifth semiconductor device 301, and sixth semiconductor device 302 such that switching frequency fs common to first semiconductor device 501, second semiconductor device 502, third semiconductor device 601, fourth semiconductor device 602, fifth semiconductor device 301, and sixth semiconductor device 302 changes while those conditions are satisfied.

With the control as shown in FIG. 39 and FIG. 40, the duration in which the diagonally-positioned first semiconductor device 501 and fourth semiconductor device 602 turn on simultaneously can be identical to the duration in which the diagonally-positioned second semiconductor device 502 and third semiconductor device 601 turn on simultaneously, thereby enabling stable power supply.

(Sixth Control Method)

Figure 41:
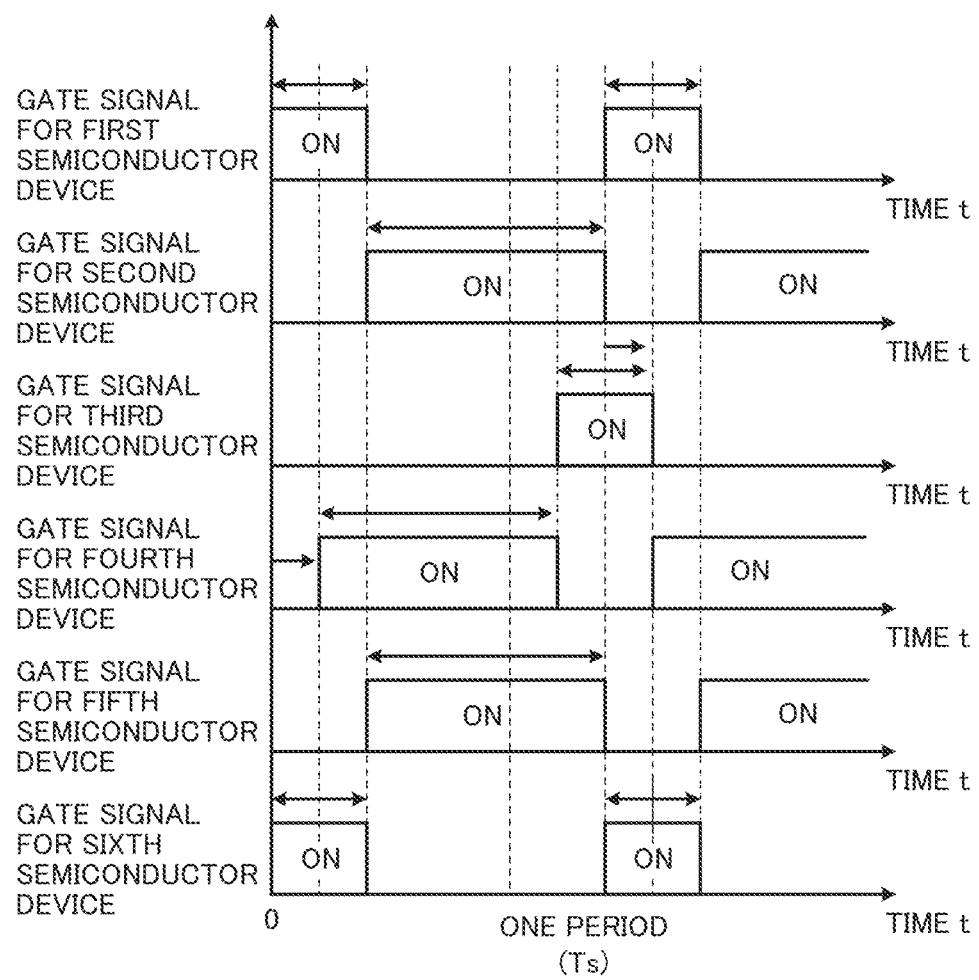
FIG. 41 is a diagram illustrating another example of gate pulses for first semiconductor device 501, second semiconductor device 502, third semiconductor device 601, fourth semiconductor device 602, fifth semiconductor device 301, and sixth semiconductor device 302 in a sixth control method.

FIG. 41 is a diagram illustrating another example of gate pulses for first semiconductor device 501, second semiconductor device 502, third semiconductor device 601, fourth semiconductor device 602, fifth semiconductor device 301, and sixth semiconductor device 302 in the sixth control method.

In the operation shown in FIG. 41, the pulse of first semiconductor device 501 and the pulse of sixth semiconductor device 302 are synchronized with each other, and the pulse of second semiconductor device 502 and the pulse of fifth semiconductor device 301 are synchronized with each other. Further, the initial state of phase shift control is defined as a state in which the timing when first semiconductor device 501 turns on, the timing when fourth semiconductor device 602 turns on, and the timing when sixth semiconductor device 302 turns on are synchronized with each other, and the timing when second semiconductor device 502 turns off, the timing when third semiconductor device 601 turns off, and the timing when fifth semiconductor device 301 turns on are synchronized with each other.

Starting from this initial state, the pulse phase for third semiconductor device 601 and the pulse phase for fourth semiconductor device 602 are shifted.

Further, the pulse width for first semiconductor device 501, the pulse width for third semiconductor device 601, and the pulse width for sixth semiconductor device 302 are equal, and the pulse width for second semiconductor device 502, the pulse width for fourth semiconductor device 602, and the pulse width for fifth semiconductor device 301 are equal.

Control circuit 14 controls first semiconductor device 501, second semiconductor device 502, third semiconductor device 601, fourth semiconductor device 602, fifth semiconductor device 301, and sixth semiconductor device 302 such that those conditions are satisfied.

Figure 42:
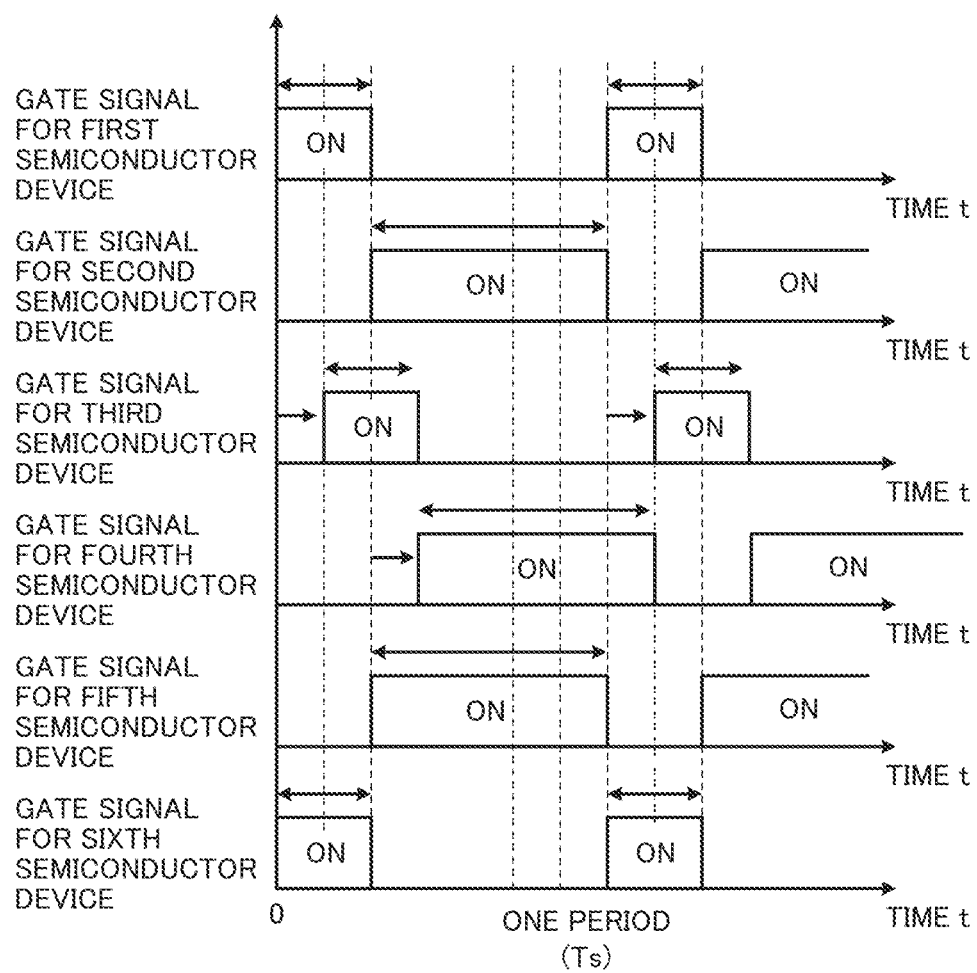
FIG. 42 is a diagram illustrating another example of gate pulses for first semiconductor device 501, second semiconductor device 502, third semiconductor device 601, fourth semiconductor device 602, fifth semiconductor device 301, and sixth semiconductor device 302 in the sixth control method.

FIG. 42 is a diagram illustrating another example of gate pulses for first semiconductor device 501, second semiconductor device 502, third semiconductor device 601, fourth semiconductor device 602, fifth semiconductor device 301, and sixth semiconductor device 302 in the sixth control method.

In the operation shown in FIG. 42, the pulse of first semiconductor device 501 and the pulse of sixth semiconductor device 302 are synchronized with each other, and the pulse of second semiconductor device 502 and the pulse of fifth semiconductor device 301 are synchronized with each other.

Further, the initial state of phase shift control is defined as a state in which the timing when first semiconductor device 501 turns on, the timing when third semiconductor device 601 turns on, and the timing when sixth semiconductor device 302 turns on are synchronized with each other, and the timing when second semiconductor device 502 turns on, the timing when fourth semiconductor device 602 turns on, and the timing when fifth semiconductor device 301 turns on are synchronized with each other. Starting from this initial state, the pulse phase for third semiconductor device 601 and the pulse phase for fourth semiconductor device 602 are shifted.

Further, the pulse width for first semiconductor device 501, the pulse width for third semiconductor device 601, and the pulse width for sixth semiconductor device 302 are equal, and the pulse width for second semiconductor device 502, the pulse width for fourth semiconductor device 602, and the pulse width for fifth semiconductor device 301 are equal.

Control circuit 14 controls first semiconductor device 501, second semiconductor device 502, third semiconductor device 601, fourth semiconductor device 602, fifth semiconductor device 301, and sixth semiconductor device 302 such that those conditions are satisfied.

With the control as shown in FIG. 41 and FIG. 42, the duration in which the diagonally-positioned first semiconductor device 501 and fourth semiconductor device 602 turn on simultaneously can be identical to the duration in which the diagonally-positioned second semiconductor device 502 and third semiconductor device 601 turn on simultaneously, thereby enabling stable power supply.

(Fifth Control Method)

Figure 43:
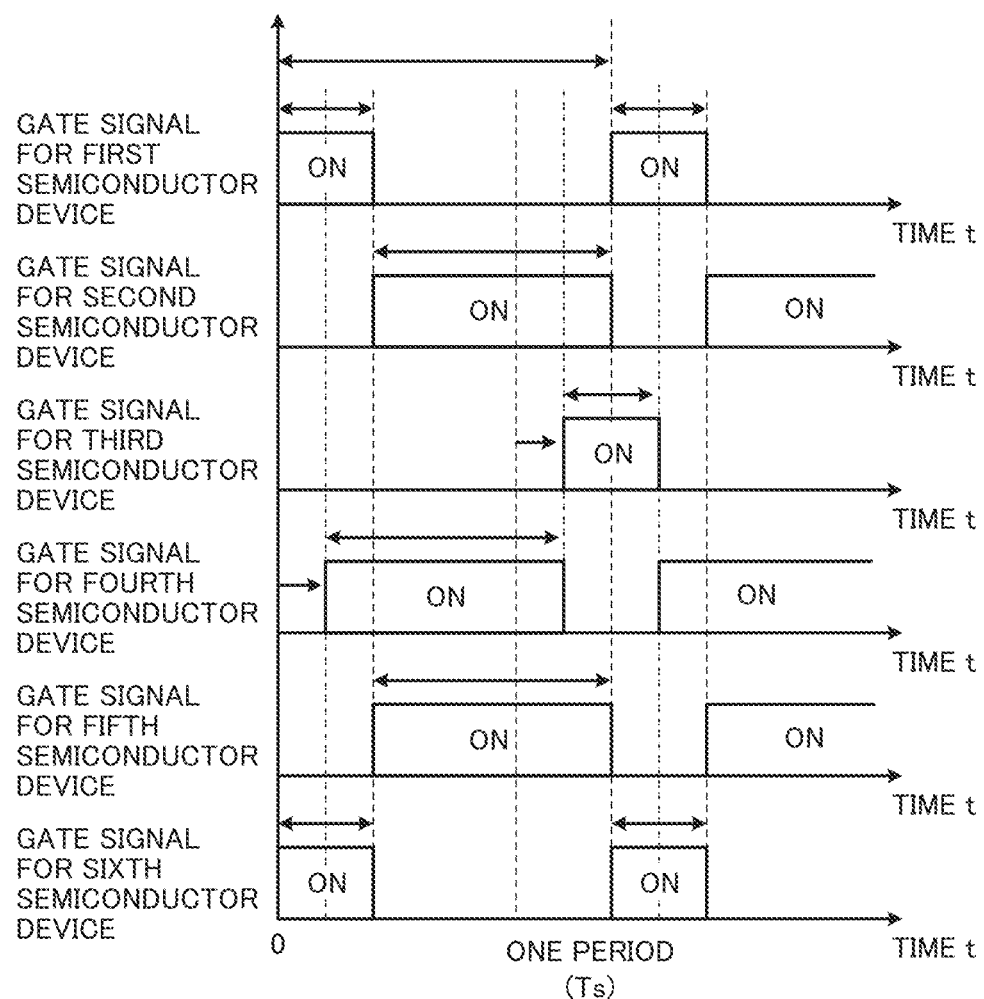
FIG. 43 is a diagram illustrating an example of gate pulses for first semiconductor device 501, second semiconductor device 502, third semiconductor device 601, fourth semiconductor device 602, fifth semiconductor device 301, and sixth semiconductor device 302 in a fifth control method.

FIG. 43 is a diagram illustrating an example of gate pulses for first semiconductor device 501, second semiconductor device 502, third semiconductor device 601, fourth semiconductor device 602, fifth semiconductor device 301, and sixth semiconductor device 302 in the fifth control method.

In the operation shown in FIG. 43, the pulse of first semiconductor device 501 and the pulse of sixth semiconductor device 302 are synchronized with each other, and the pulse of second semiconductor device 502 and the pulse of fifth semiconductor device 301 are synchronized with each other.

Further, the initial state of phase shift control is defined as a state in which the timing when first semiconductor device 501 turns on, the timing when fourth semiconductor device 602 turns on, and the timing when sixth semiconductor device 302 turns on are synchronized with each other, and the timing when second semiconductor device 502 turns off, the timing when third semiconductor device 601 turns off, and the timing when fifth semiconductor device 301 turns on are synchronized with each other. Starting from this initial state, the pulse phase for third semiconductor device 601 and the pulse phase for fourth semiconductor device 602 are shifted.

Further, the pulse width for first semiconductor device 501, the pulse width for third semiconductor device 601, and the pulse width for sixth semiconductor device 302 are equal, and the pulse width for second semiconductor device 502, the pulse width for fourth semiconductor device 602, and the pulse width for fifth semiconductor device 301 are equal.

Control circuit 14 controls first semiconductor device 501, second semiconductor device 502, third semiconductor device 601, fourth semiconductor device 602, fifth semiconductor device 301, and sixth semiconductor device 302 such that switching frequency fs common to first semiconductor device 501, second semiconductor device 502, third semiconductor device 601, fourth semiconductor device 602, fifth semiconductor device 301, and sixth semiconductor device 302 changes while those conditions are satisfied.

Figure 44:
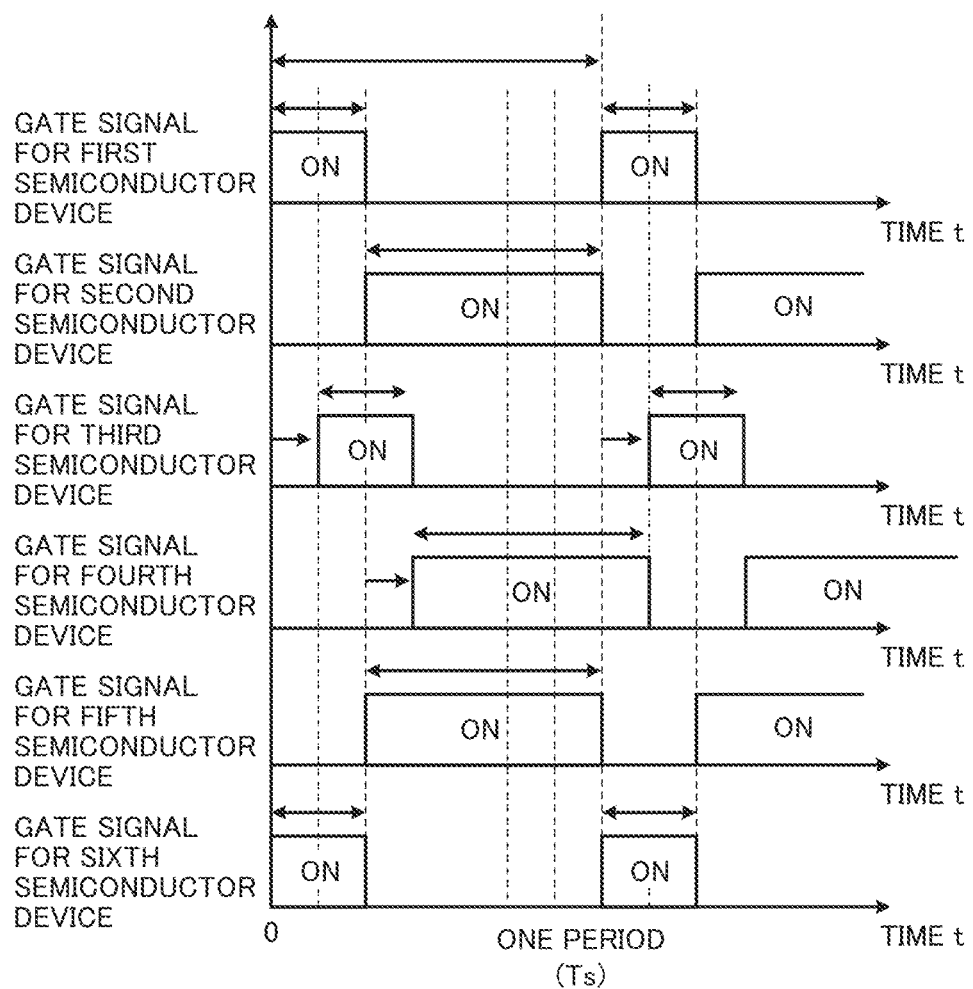
FIG. 44 is a diagram illustrating another example of gate pulses for first semiconductor device 501, second semiconductor device 502, third semiconductor device 601, fourth semiconductor device 602, fifth semiconductor device 301, and sixth semiconductor device 302 in the fifth control method.

FIG. 44 is a diagram illustrating another example of gate pulses for first semiconductor device 501, second semiconductor device 502, third semiconductor device 601, fourth semiconductor device 602, fifth semiconductor device 301, and sixth semiconductor device 302 in the fifth control method.

In the operation shown in FIG. 44, the pulse of first semiconductor device 501 and the pulse of sixth semiconductor device 302 are synchronized with each other, and the pulse of second semiconductor device 502 and the pulse of fifth semiconductor device 301 are synchronized with each other.

Further, the initial state of phase shift control is defined as a state in which the timing when first semiconductor device 501 turns on, the timing when third semiconductor device 601 turns on, and the timing when sixth semiconductor device 302 turns on are synchronized with each other, and the timing when second semiconductor device 502 turns on, the timing when fourth semiconductor device 602 turns on, and the timing when fifth semiconductor device 301 turns on are synchronized with each other. Starting from this initial state, the pulse phase for third semiconductor device 601 and the pulse phase for fourth semiconductor device 602 are shifted.

Further, the pulse width for first semiconductor device 501, the pulse width for third semiconductor device 601, and the pulse width for sixth semiconductor device 302 are equal, and the pulse width for second semiconductor device 502, the pulse width for fourth semiconductor device 602, and the pulse width for fifth semiconductor device 301 are equal.

Control circuit 14 controls first semiconductor device 501, second semiconductor device 502, third semiconductor device 601, fourth semiconductor device 602, fifth semiconductor device 301, and sixth semiconductor device 302 such that switching frequency fs common to first semiconductor device 501, second semiconductor device 502, third semiconductor device 601, fourth semiconductor device 602, fifth semiconductor device 301, and sixth semiconductor device 302 changes while those conditions are satisfied.

With the control as shown in FIG. 43 and FIG. 44, the duration in which the diagonally-positioned first semiconductor device 501 and fourth semiconductor device 602 turn on simultaneously can be identical to the duration in which the diagonally-positioned second semiconductor device 502 and third semiconductor device 601 turn on simultaneously, thereby enabling stable power supply.

Figure 45:
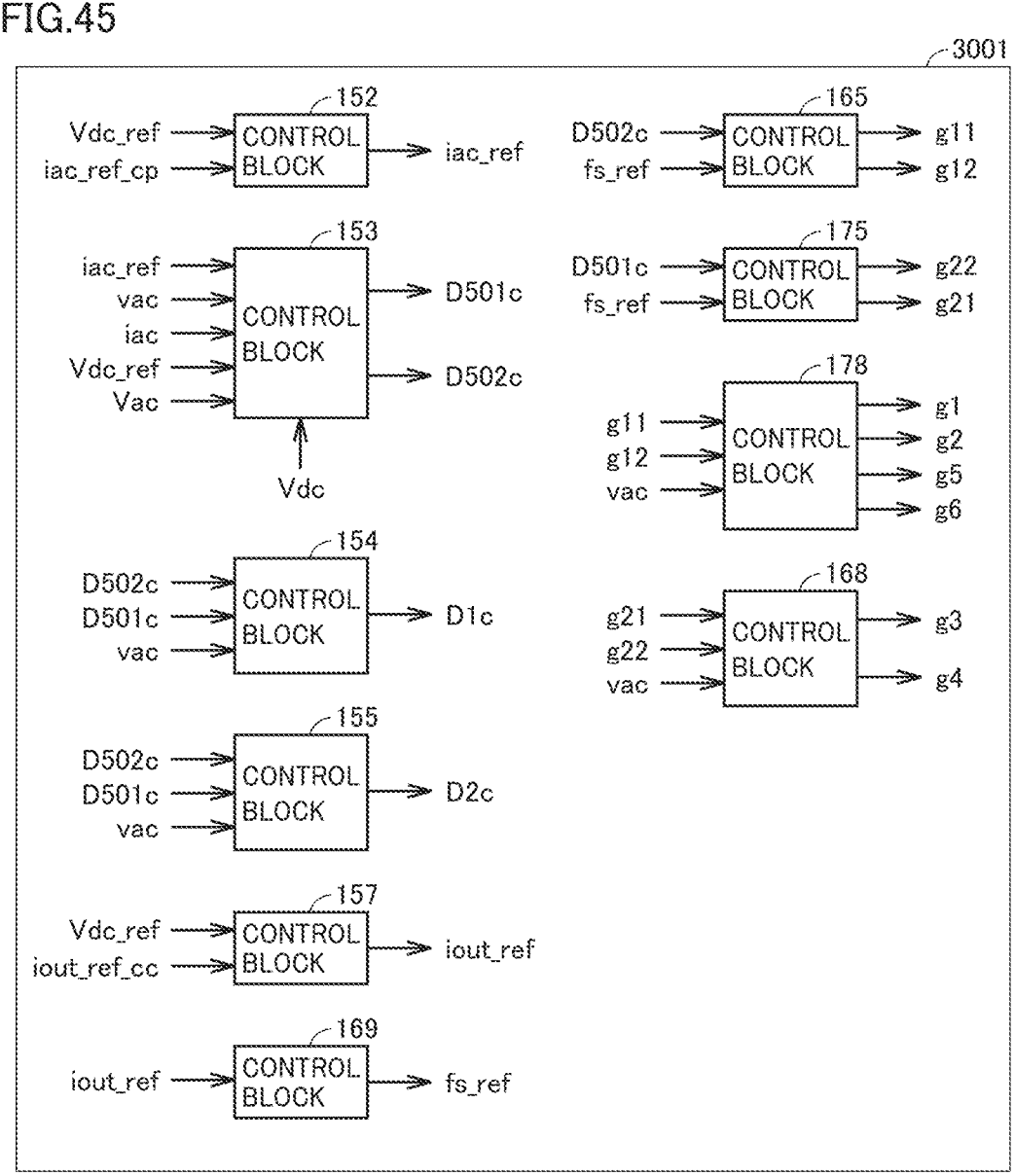
FIG. 45 is a diagram illustrating a plurality of control blocks serving to perform the fourth control method.

FIG. 45 is a diagram illustrating a plurality of control blocks serving to perform the fourth control method.

A plurality of control blocks in the fourth control method differ from a plurality of control blocks serving to perform the first control method in the first embodiment in that a plurality of control blocks in the fourth control method include control block 178 instead of control block 167.

When voltage vac of AC power supply 1 has positive polarity, control block 178 outputs first gate signal g11 for the first leg as gate signal g1 of first semiconductor device 501 and gate signal g6 of sixth semiconductor device 302 and outputs second gate signal g12 for the first leg as gate signal g2 of second semiconductor device 502 and gate signal g5 of fifth semiconductor device 301. When voltage vac of AC power supply 1 has negative polarity, control block 167 outputs second gate signal g12 for the first leg as gate signal g1 of first semiconductor device 501 and gate signal g6 of sixth semiconductor device 302 and outputs first gate signal g11 for the first leg as gate signal g2 of second semiconductor device 502 and gate signal g5 of fifth semiconductor device 301.

Figure 46:
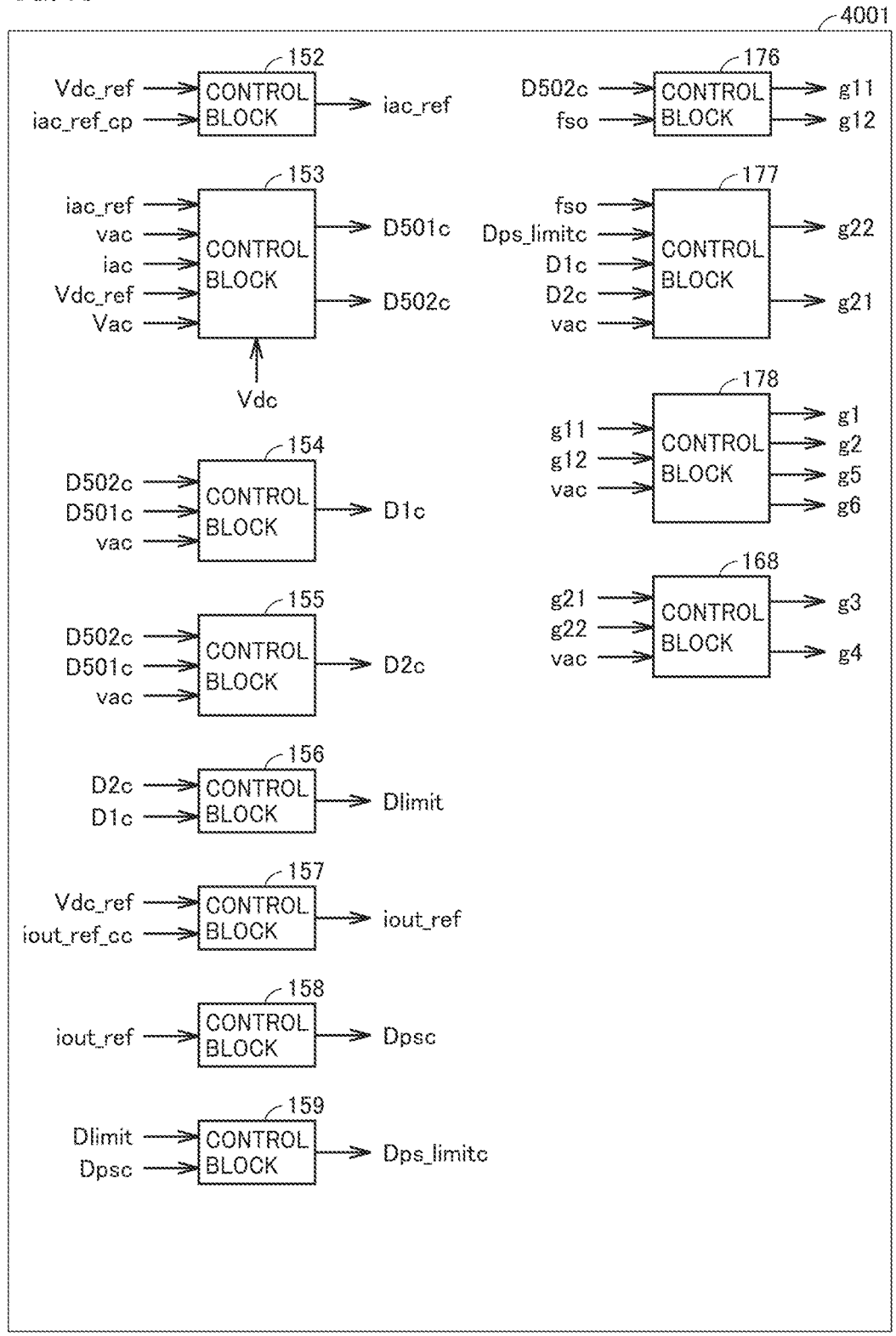
FIG. 46 is a diagram illustrating a plurality of control blocks serving to perform the sixth control method.

FIG. 46 is a diagram illustrating a plurality of control blocks serving to perform the sixth control method.

A plurality of control blocks in the sixth control method differ from a plurality of control blocks serving to perform the third control method in the first embodiment in that a plurality of control blocks in the sixth control method include control block 178 instead of control block 167.

Control block 178 is similar to control block 178 in the fourth control method and will not be further elaborated.

Figure 47:
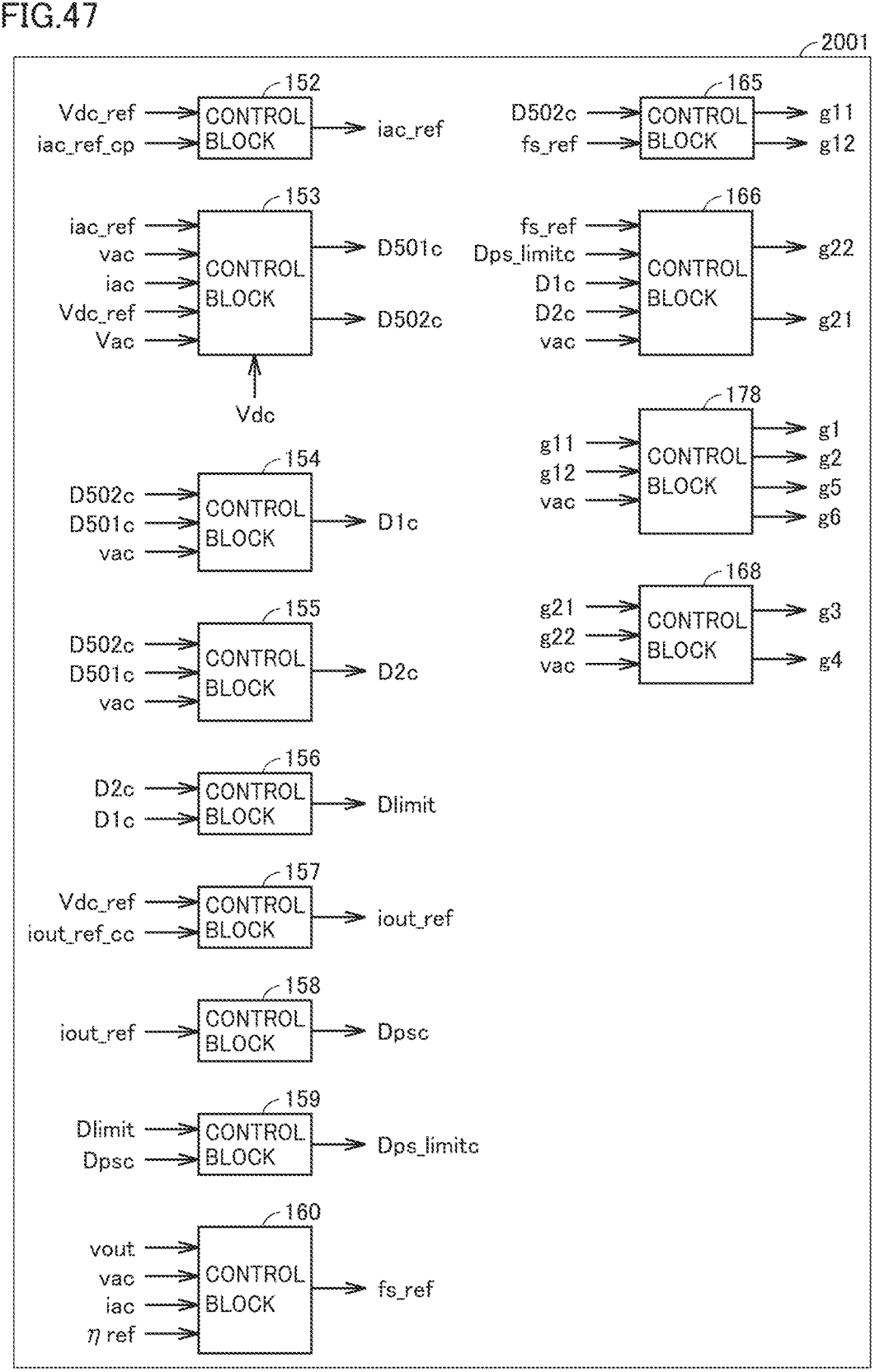
FIG. 47 is a diagram illustrating a plurality of control blocks serving to perform the fifth control method.

FIG. 47 is a diagram illustrating a plurality of control blocks serving to perform the fifth control method.

A plurality of control blocks in the fifth control method differ from a plurality of control blocks serving to perform the second control method in the first embodiment in that a plurality of control blocks in the fifth control method include control block 178 instead of control block 167.

Control block 178 is similar to control block 178 in the fourth control method and will not be further elaborated.

Figure 48:
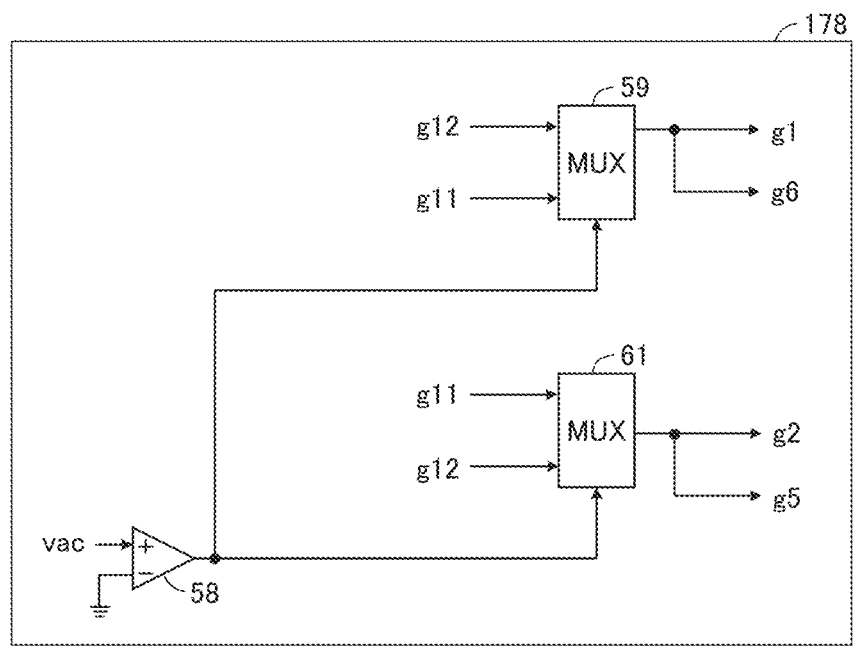
FIG. 48 is a diagram illustrating a control block 178 generating gate signal g1 of first semiconductor device 501, gate signal g2 of second semiconductor device 502, gate signal g5 of fifth semiconductor device 301, and gate signal g6 of sixth semiconductor device 302.

FIG. 48 is a diagram illustrating control block 178 generating gate signal g1 of first semiconductor device 501, gate signal g2 of second semiconductor device 502, gate signal g5 of fifth semiconductor device 301, and gate signal g6 of sixth semiconductor device 302.

Control block 178 includes a comparator 58, a multiplexer 59, and a multiplexer 61.

Comparator 58 compares voltage vac of AC power supply 1 detected by third voltage detector 677 with the ground voltage and outputs a signal representing the comparison result.

Multiplexer (MUX) 59 receives first gate signal g11 for the first leg and second gate signal g12 for the first leg. Multiplexer (MUX) 59 outputs one of the input gate signals as gate signal g1 of first semiconductor device 501 and gate signal g6 of sixth semiconductor device 302, in accordance with an output signal of comparator 58.

Multiplexer (MUX) 61 receives first gate signal g11 for the first leg and second gate signal g12 for the first leg. Multiplexer (MUX) 61 outputs one of the input gate signals as gate signal g2 of second semiconductor device 502 and gate signal g5 of fifth semiconductor device 301, in accordance with an output signal of comparator 58.

The operation of control block 178 is described.

When voltage vac of AC power supply 1 obtained from third voltage detector 677 detecting voltage of AC power supply 1 has positive polarity, the output of comparator 58 is High level. Multiplexer (MUX) 59 outputs first gate signal g11 for the first leg as gate signal g1 of first semiconductor device 501 and gate signal g6 of sixth semiconductor device 302. Multiplexer (MUX) 61 outputs second gate signal g12 for the first leg as gate signal g2 of second semiconductor device 502 and gate signal g5 of fifth semiconductor device 301.

On the other hand, when voltage vac of AC power supply 1 obtained from third voltage detector 677 detecting voltage of AC power supply 1 has negative polarity, the output of comparator 58 is Low level. Multiplexer (MUX) 59 outputs second gate signal g12 for the first leg as gate signal g1 of first semiconductor device 501 and gate signal g6 of sixth semiconductor device 302. Multiplexer (MUX) 61 outputs first gate signal g11 for the first leg as gate signal g2 of second semiconductor device 502 and gate signal g5 of fifth semiconductor device 301.

According to the present embodiment, power loss is shared among first semiconductor device 501, second semiconductor device 502, fifth semiconductor device 301, and sixth semiconductor device 302 whereby operation is performed such that power loss does not locally occur. In the present embodiment, because of the circuit configuration and the control methods as described above, high power factor control and output control in a wide range can be performed at the same time with a one-stage full-bridge inverter circuit, in the same manner as in the power conversion apparatus illustrated in the first embodiment.

First Modification to Second Embodiment

FIG. 49 is a diagram illustrating a control method in a first modification to the second embodiment.

Control circuit 14 controls first leg 500, second leg 600, and third leg 300 based on the sixth control method, in a region in which target value M* of voltage conversion ratio M is larger than threshold TH1. Control circuit 14 controls first leg 500 by pulse width modulation control. Control circuit 14 controls second leg 600 by pulse width modulation control and phase shift modulation control. Control circuit 14 controls third leg 300 by pulse width modulation control.

Control circuit 14 controls first leg 500, second leg 600, and third leg 300 based on the fifth control method, in a region in which target value M* of voltage conversion ratio M is equal to or smaller than threshold TH1 and is larger than threshold TH2. Control circuit 14 controls first leg 500 by pulse width modulation control and pulse frequency modulation control. Control circuit 14 controls second leg 600 by pulse width modulation control, pulse frequency modulation control, and phase shift modulation. Control circuit 14 controls third leg 300 by pulse width modulation control and pulse frequency modulation control.

Control circuit 14 controls first leg 500, second leg 600, and third leg 300 based on the fourth control method, in a region in which target value M* of voltage conversion ratio M is equal to or smaller than threshold TH2. Control circuit 14 controls first leg 500 by pulse width modulation control and pulse frequency control. Control circuit 14 controls second leg 600 by pulse width modulation control and pulse frequency modulation control. Control circuit 14 controls third leg 300 by pulse width modulation control and pulse frequency control.

Second Modification to Second Embodiment

FIG. 50 is a diagram illustrating a control method in a second modification to the second embodiment.

Control circuit 14 controls first leg 500, second leg 600, and third leg 300 based on the fourth control method, in a region in which target value M* of voltage conversion ratio M is larger than threshold TH. Control circuit 14 controls first leg 500 by pulse width modulation control and pulse frequency modulation control. Control circuit 14 controls second leg 600 by pulse width modulation control and pulse frequency modulation control. Control circuit 14 controls third leg 300 by pulse width modulation control and pulse frequency modulation control.

Control circuit 14 controls first leg 500, second leg 600, and third leg 300 based on the fifth control method, in a region in which target value M* of voltage conversion ratio M is equal to or smaller than threshold TH. Control circuit 14 controls first leg 500 by pulse width modulation control and pulse frequency modulation control. Control circuit 14 controls second leg 600 by pulse width modulation control, pulse frequency modulation control, and phase shift modulation. Control circuit 14 controls third leg 300 by pulse width modulation control and pulse frequency modulation control.

Third Modification to Second Embodiment

FIG. 51 is a diagram illustrating a control method in a third modification to the second embodiment.

Control circuit 14 controls first leg 500, second leg 600, and third leg 300 based on the fifth control method, in a region in which target value M* of voltage conversion ratio M is larger than threshold TH. Control circuit 14 controls first leg 500 by pulse width modulation control and pulse frequency modulation control. Control circuit 14 controls second leg 600 by pulse width modulation control, pulse frequency modulation control, and phase shift modulation. Control circuit 14 controls third leg 300 by pulse width modulation control and pulse frequency modulation control.

Control circuit 14 controls first leg 500, second leg 600, and third leg 300 based on the sixth control method, in a region in which target value M* of voltage conversion ratio M is equal to or smaller than threshold TH. Control circuit 14 controls first leg 500 by pulse width modulation control. Control circuit 14 controls second leg 600 by pulse width modulation control and phase shift modulation control. Control circuit 14 controls third leg 300 by pulse width modulation control.

(Modifications)

The present invention is not limited to the foregoing embodiments and, for example, includes modifications as follow.

(1) Modification of Power Conversion Apparatus

Figure 52:
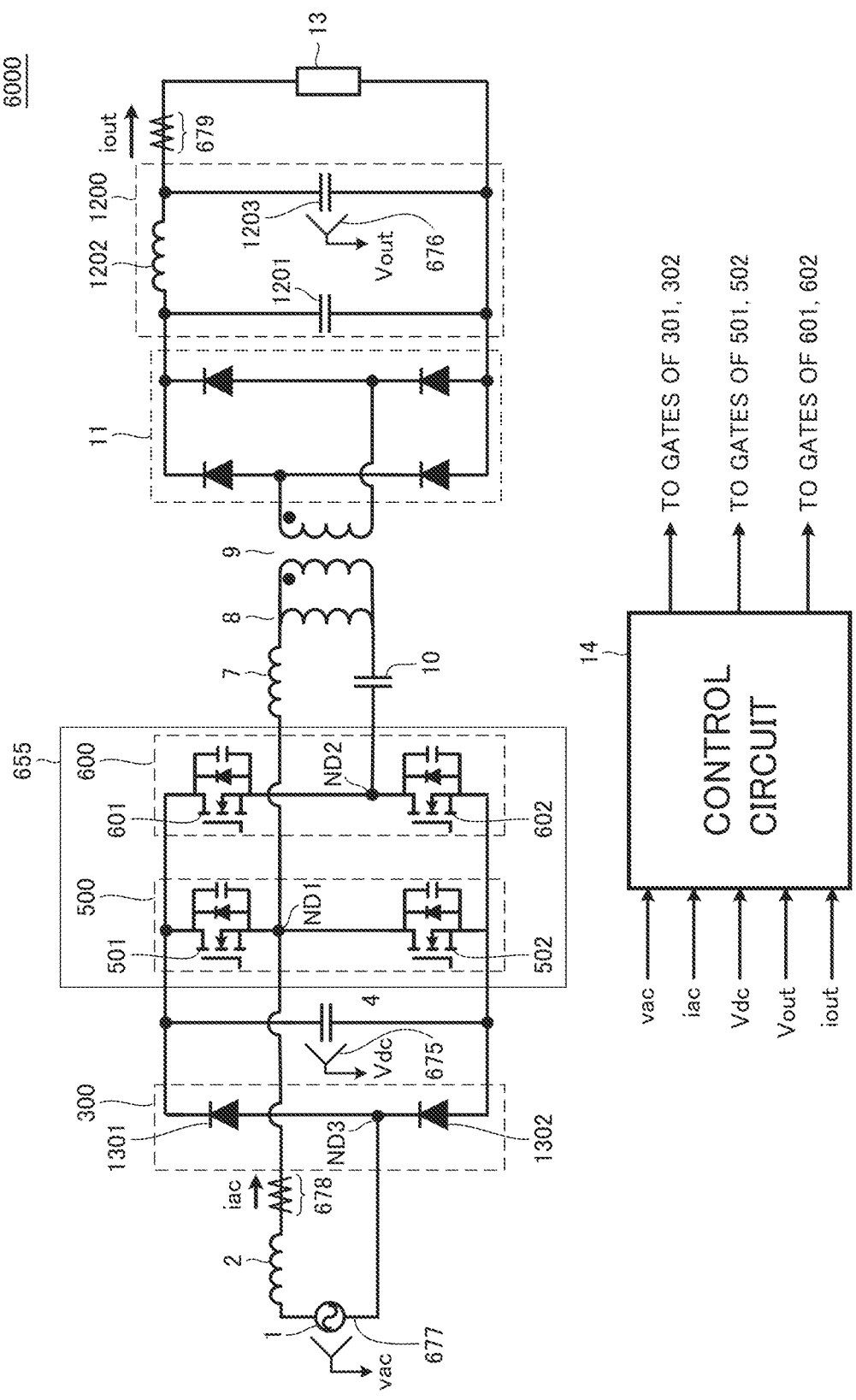
FIG. 52 is a diagram illustrating a configuration of a power conversion apparatus 6000 according to a modification.

FIG. 52 is a diagram illustrating a configuration of a power conversion apparatus 6000 according to a modification.

In FIG. 52, fifth semiconductor device 301 and sixth semiconductor device 302 are configured with diodes which are passive semiconductor.

One end of AC power supply 1 is connected to first AC end ND1 at which first semiconductor device 501 and second semiconductor device 502 are connected, through power factor-improving reactor 2. First AC end ND1 is connected to series resonance reactor 7. With such a configuration, all power pulsation having a frequency component twice the frequency of AC power produced in AC power supply 1 is transmitted to DC load 13, and in DC capacitor 4, voltage ripple is produced only by charging/discharging caused by switching period T. It is therefore unnecessary to smooth power pulsation having a frequency twice the period of AC power with DC capacitor 4. Therefore, unlike a common system in which two power converters are provided and a capacitor is connected to a link section of two power converters, DC capacitor 4 only has to smooth charging/discharging ripple caused by switching period Ts. Consequently, compared with a common system, it is possible to significantly reduce the capacity of DC capacitor 4 and achieve size reduction of DC capacitor 4.

(2) Modification of Control Logic Generating Command Value fs_ref of Switching Frequency The control logic that generates command value fs_ref of switching frequency is not limited to control block 160 in FIG. 26, and any other control logic may be used.

Figure 53:
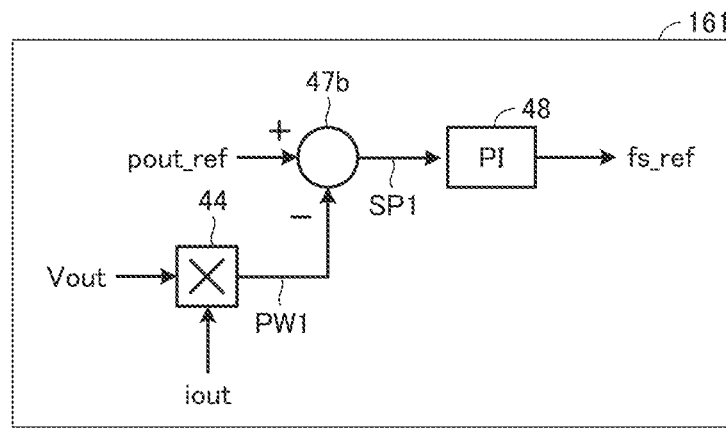
FIG. 53 is a diagram illustrating a control block 161 generating command value fs_ref of switching frequency.

FIG. 53 is a diagram illustrating control block 161 generating command value fs_ref of switching frequency.

Multiplier 44 multiplies output voltage Vout obtained from second voltage detector 676 by output current iout obtained from second current detector 679 to output output power PW1.

Subtracter 47b calculates differential power SP1 between a predetermined output power target value Pout_ref and output power PW1. The calculated differential power SP1 is input as the feedback amount to PI controller 48. PI controller 48 performs proportional integral control of differential power SP1 and outputs command value fs_ref of switching frequency.

Figure 54:
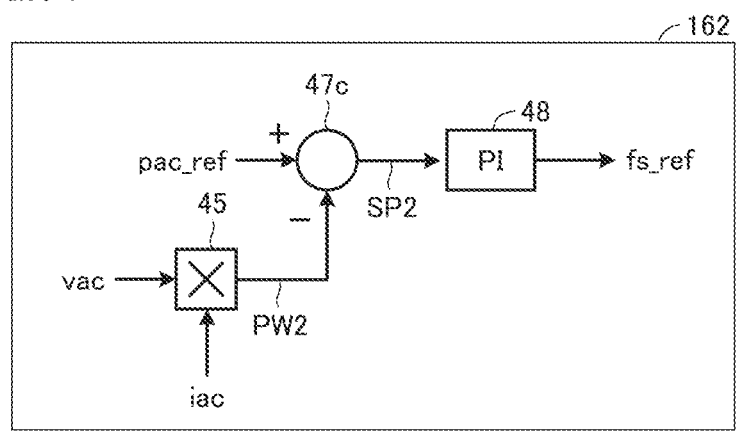
FIG. 54 is a diagram illustrating a control block 162 generating command value fs_ref of switching frequency.

FIG. 54 is a diagram illustrating control block 162 generating command value fs_ref of switching frequency.

Multiplier 44 multiplies effective voltage Vac of AC power supply 1 obtained from third voltage detector 677 by effective current Iac of AC power supply 1 obtained from first current detector 678 to calculate power of AC power supply 1, that is, input power PW2.

Subtracter 47c calculates differential power SP2 between a predetermined input power target value Pac_ref and input power PW2. The calculated differential power SP2 is input as the feedback amount to PI controller 48. PI controller 48 performs proportional integral control of differential power SP2 and outputs command value fs_ref of switching frequency. It is noted that input power PW2 is active power that reflects the input power factor.

Figure 55:
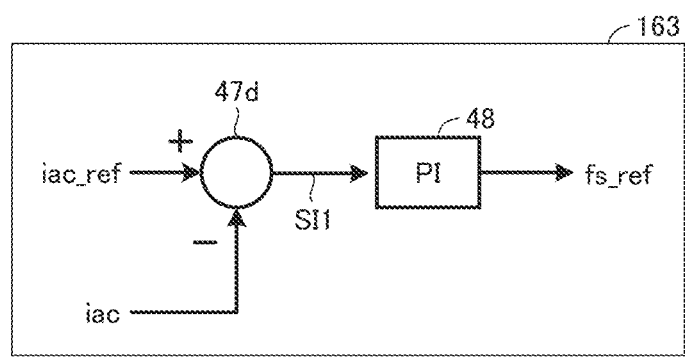
FIG. 55 is a diagram illustrating a control block 163 generating command value fs_ref of switching frequency.

FIG. 55 is a diagram illustrating control block 163 generating command value fs_ref of switching frequency.

Subtracter 47d calculates differential current SI1 between a predetermined target current effective value Iac_ref of AC power supply 1 and effective current Iac of AC power supply 1 obtained from first current detector 678. The calculated differential current SI1 is input as the feedback amount to PI controller 48. PI controller 48 performs proportional integral control of differential current SI1 and outputs command value fs_ref of switching frequency. Effective current of AC power supply 1 indicates input current.

Figure 56:
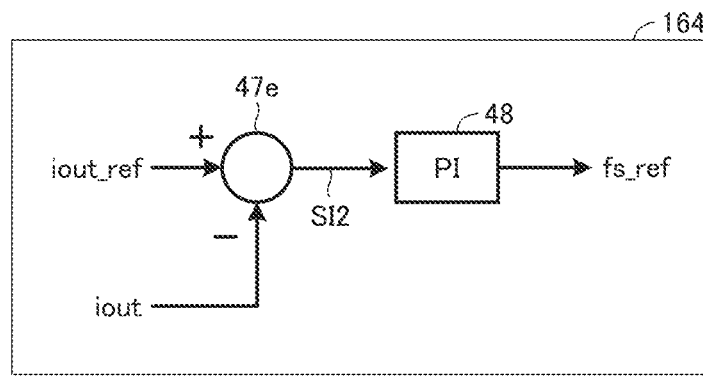
FIG. 56 is a diagram illustrating a control block 164 generating command value fs_ref of switching frequency.

FIG. 56 is a diagram illustrating control block 164 generating command value fs_ref of switching frequency.

Subtracter 47e calculates differential current SI2 between a predetermined output current target value iout_ref and output current iout obtained from second current detector 679. The calculated differential current SI2 is input as the feedback amount to PI controller 48. PI controller 48 performs proportional integral control of differential current SI2 and outputs command value fs_ref of switching frequency.

(3) Control Block Generating Command Value Dpsc of Phase Shift Amount Dps

The control logic that generates command value Dpsc of phase shift amount Dps is not limited to control block 158 in FIG. 24, and any other control logic may be used.

Figure 57:
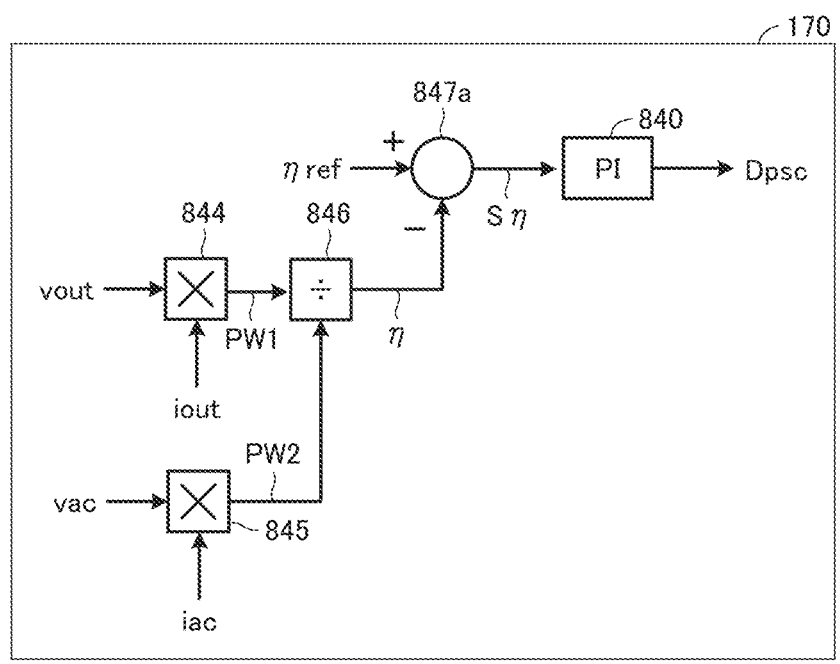
FIG. 57 is a diagram illustrating a control block 170 generating command value Dpsc of phase shift amount Dps.

FIG. 57 is a diagram illustrating control block 170 generating command value Dpsc of phase shift amount Dps.

Control block 170 includes a multiplier 844, a multiplier 845, a divider 846, a subtracter 847a, and a PI controller 848.

Multiplier 844 multiplies output voltage Vout obtained from second voltage detector 676 by output current iout obtained from second current detector 679 to output output power PW1.

Multiplier 845 multiplies effective voltage Vac of AC power supply 1 obtained from third voltage detector 677 by effective current Iac of AC power supply 1 obtained from first current detector 678 to output input power PW2.

Divider 846 divides output power PW1 by input power PW2 to output conversion efficiency η.

Subtracter 847a performs subtraction between a predetermined target efficiency ηref and conversion efficiency η output from divider 46 to calculate differential efficiency Sη as the feedback amount.

PI controller 848 performs proportional integral control of differential efficiency Sη and outputs command value Dpsc of phase shift amount Dps. It is noted that input power PW2 is active power that reflects the input power factor.

Figure 58:
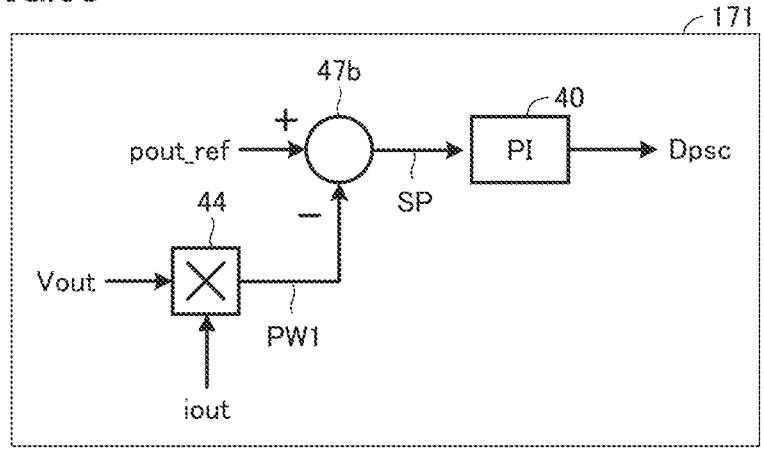
FIG. 58 is a diagram illustrating a control block 171 generating command value Dpsc of phase shift amount Dps.

FIG. 58 is a diagram illustrating control block 171 generating command value Dpsc of phase shift amount Dps.

Control block 171 includes a multiplier 44, a subtracter 47b, and a PI controller 40.

Multiplier 44 multiplies output voltage Vout obtained from second voltage detector 676 by output current iout obtained from second current detector 679 to output output power PW1.

Subtracter 47b performs subtraction between a predetermined target output power pout_ref and output power PW1 output from multiplier 44 to calculate differential power SPwp as the feedback amount.

PI controller 40 performs proportional integral control of differential power SP and outputs command value Dpsc of phase shift amount Dps.

Figure 59:
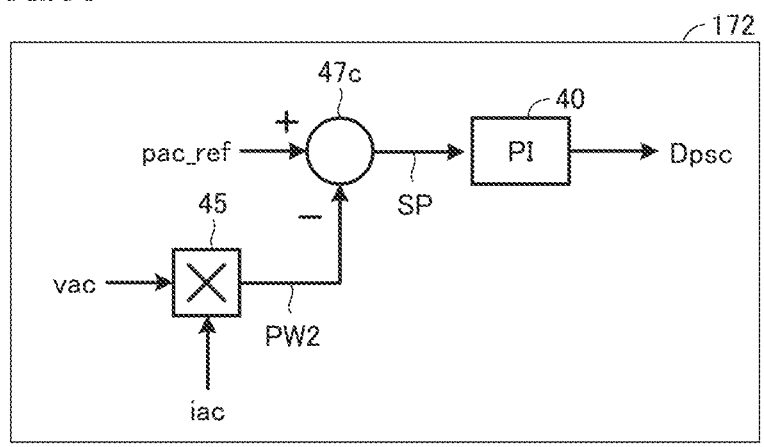
FIG. 59 is a diagram illustrating a control block 172 generating command value Dpsc of phase shift amount Dps.

FIG. 59 is a diagram illustrating control block 172 generating command value Dpsc of phase shift amount Dps.

Control block 172 includes a multiplier 45, a subtracter 47c, and a PI controller 40.

Multiplier 45 multiplies voltage vac of AC power supply 1 obtained from third voltage detector 677 by current iac of AC power supply 1 obtained from first current detector 678 to output AC power PW2. It is noted that input power PW2 is active power that reflects the input power factor.

Subtracter 47c performs subtraction between a predetermined target AC power pac_ref and AC power PW2 output from multiplier 45 to calculate differential power SP as the feedback amount.

PI controller 40 performs proportional integral control of differential power SP and outputs command value Dpsc of phase shift amount Dps.

Figure 60:
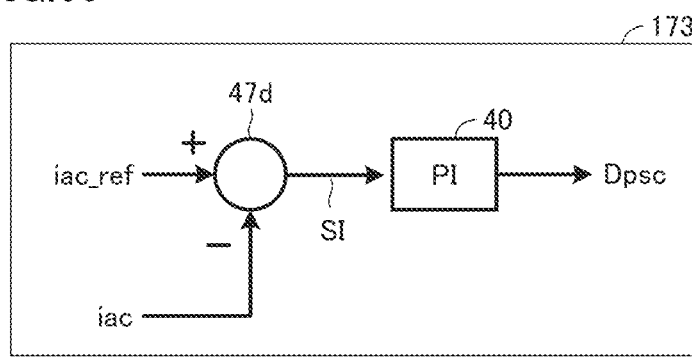
FIG. 60 is a diagram illustrating a control block 173 generating command value Dpsc of phase shift amount Dps.

FIG. 60 is a diagram illustrating control block 173 generating command value Dpsc of phase shift amount Dps.

Control block 173 includes a subtracter 47d and a PI controller 40.

Subtracter 47d performs subtraction between a predetermined AC current iac_ref and current iac of AC power supply 1 obtained from first current detector 678 to calculate differential current SI as the feedback amount.

PI controller 40 performs proportional integral control of differential current SI and outputs command value Dpsc of phase shift amount Dps.

Figure 61:
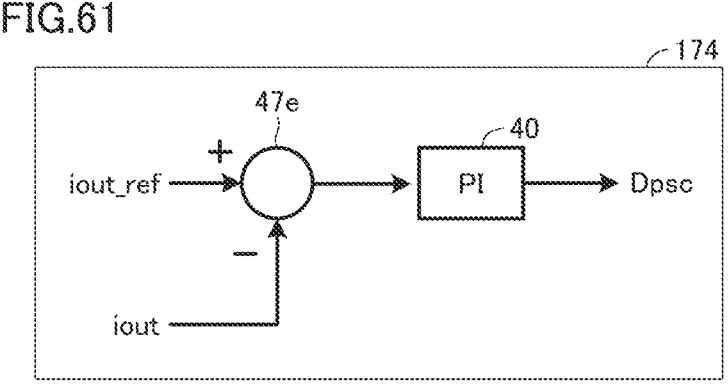
FIG. 61 is a diagram illustrating a control block 174 generating command value Dpsc of phase shift amount Dps.

FIG. 61 is a diagram illustrating control block 174 generating command value Dpsc of phase shift amount Dps.

Control block 174 includes a subtracter 47e and a PI controller 40.

Subtracter 47e performs subtraction between a predetermined output current iout_ref and output current iout obtained from second current detector 679 to calculate differential current SI as the feedback amount.

PI controller 40 performs proportional integral control of differential current SI and outputs command value Dpsc of phase shift amount Dps.

(4) Control Based on Efficiency

Control block 160 generates command value fs_ref of switching frequency such that the efficiency computed from the detected voltage and current follows target efficiency, and control block 170 generates command value Dpsc of phase shift amount Dps such that the efficiency computed from the detected voltage and current follows target efficiency. However, the control method based on the efficiency is not limited thereto.

Figure 62:
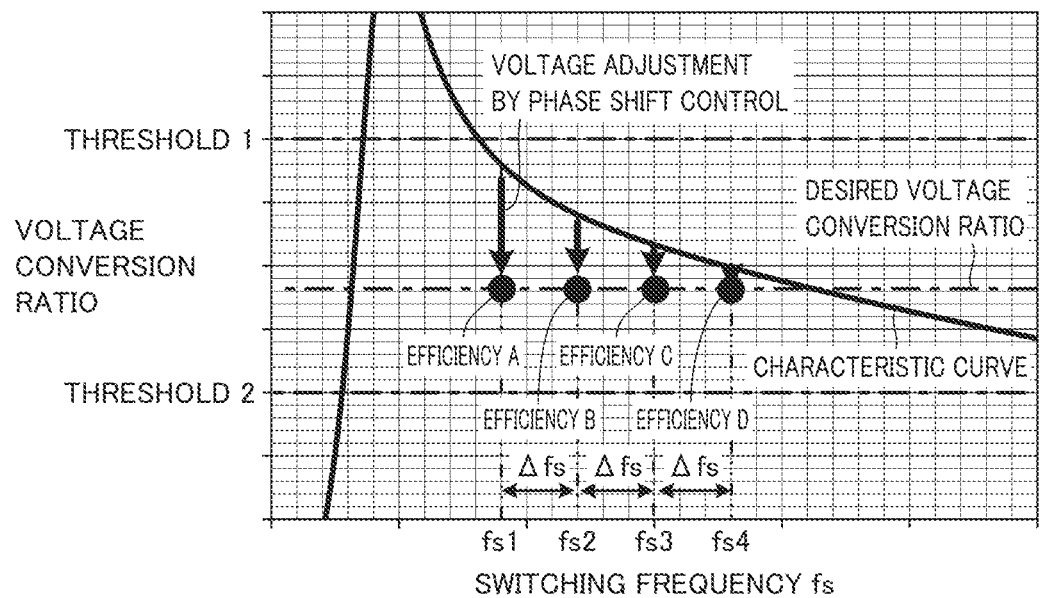
FIG. 62 is a diagram for explaining a method of selecting switching frequency fs and phase shift amount Dps.

FIG. 62 is a diagram for explaining a method of selecting switching frequency fs and phase shift amount Dps.

As shown in FIG. 62, a plurality of patterns of combination of switching frequency fs and phase shift amount Dps that provides a desired voltage conversion ratio are stored, and the operation conditions may be converged to those of the combination that provides the largest conversion efficiency among them. In doing so, the combinations of switching frequency and phase shift amount Dps may be successively stored, or as shown in FIG. 62, the combination may be stored for each variation range Ms of switching frequency. The combination that provides the largest output power, rather than the conversion efficiency, may be stored, or the combination that provides the largest input power may be stored, or the combination that provides the largest input current may be stored, or the combination that provides the largest output current may be stored.

(5) Secondary-Side Rectifying Circuit 11

Secondary-side rectifying circuit 11 is not limited to the configuration shown in FIG. 1.

Figure 63:
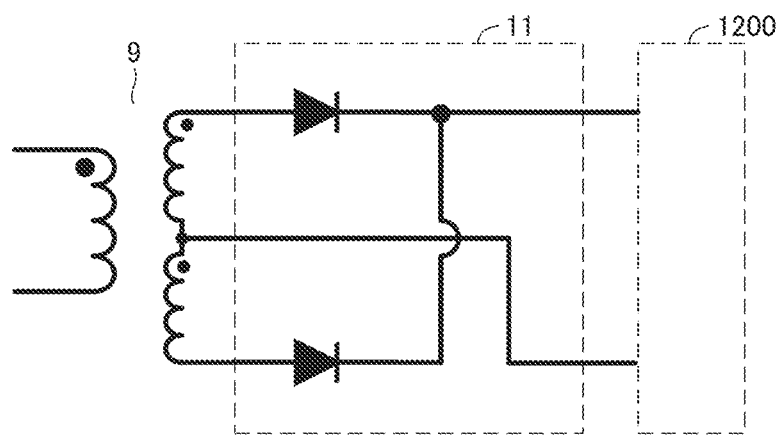
FIG. 63 is a diagram illustrating a modification of a secondary-side rectifying circuit 11.

FIG. 63 is a diagram illustrating a modification of secondary-side rectifying circuit 11. As shown in FIG. 63, a center-tap diode rectification system may be employed in which transformer 9 is of a center-tap type and a diode is used as a semiconductor device.

Figure 64:
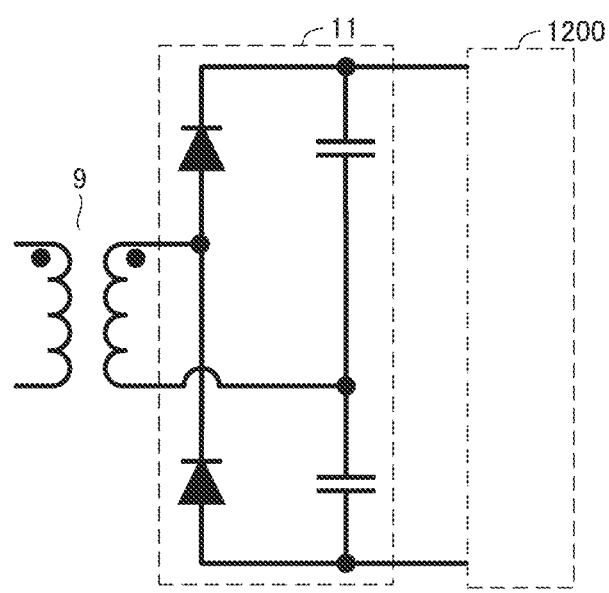
FIG. 64 is a diagram illustrating another modification of secondary-side rectifying circuit 11.

FIG. 64 is a diagram illustrating another modification of secondary-side rectifying circuit 11. As shown in FIG. 64, a voltage doubler diode rectification system may be employed in which one of two legs is configured with two diodes and the other is configured with two capacitors.

Figure 65:
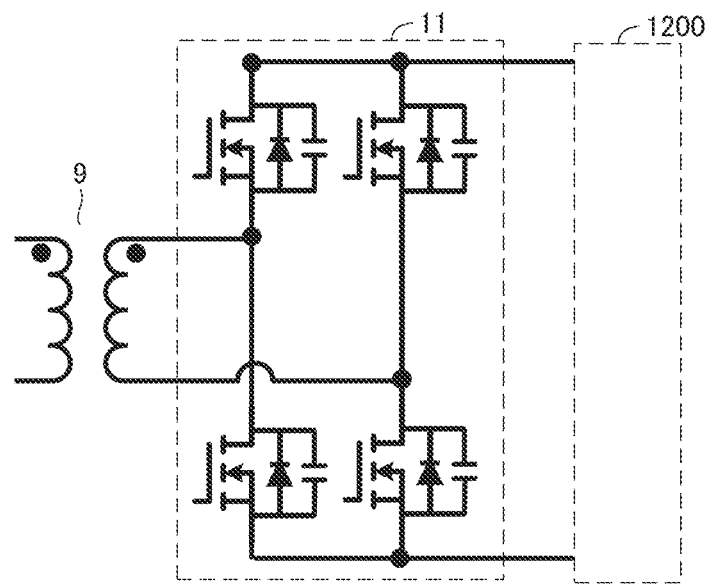
FIG. 65 is a diagram illustrating another modification of secondary-side rectifying circuit 11.

FIG. 65 is a diagram illustrating another modification of secondary-side rectifying circuit 11. As shown in FIG. 65, a full-bridge synchronous rectification system may be employed in which four active semiconductors constitute a full bridge.

Figure 66:
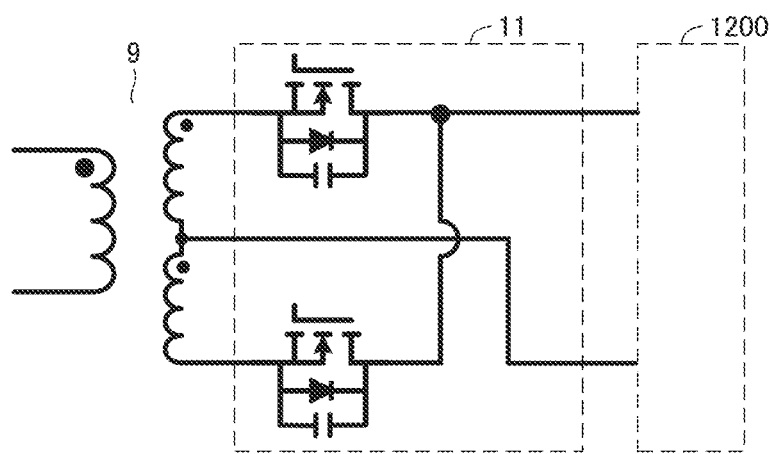
FIG. 66 is a diagram illustrating another modification of secondary-side rectifying circuit 11.

FIG. 66 is a diagram illustrating another modification of secondary-side rectifying circuit 11. As shown in FIG. 66, a center-tap synchronous rectification system may be employed in which transformer 9 is of a center-tap type and an active semiconductor is used as a semiconductor device.

Figure 67:
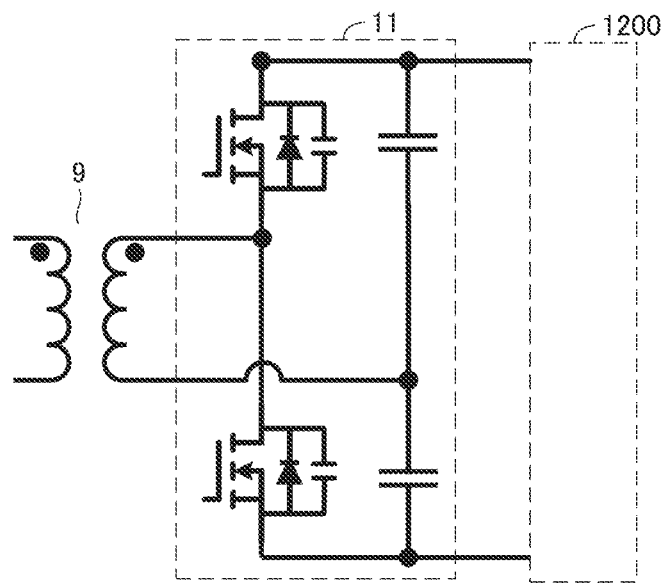
FIG. 67 is a diagram illustrating another modification of secondary-side rectifying circuit 11.

FIG. 67 is a diagram illustrating another modification of secondary-side rectifying circuit 11. As shown in FIG. 67, a voltage doubler synchronous rectification system may be employed in which one of two legs is configured with two active semiconductors and the other is configured with two capacitors.

(6) Output Smoothing Circuit 1200

Figure 68:
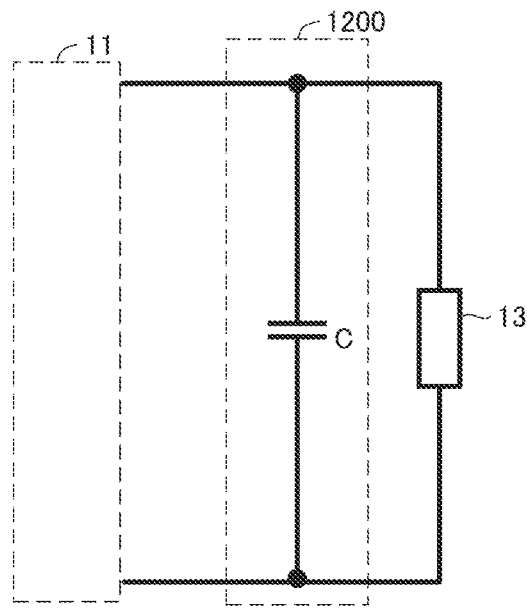
FIG. 68 is a diagram illustrating a modification of an output smoothing circuit 1200.

FIG. 68 is a diagram illustrating a modification of output smoothing circuit 1200. As shown in FIG. 68, a capacitor input system may be employed in which output smoothing circuit 1200 is configured to smooth only using a capacitor C.

Figure 69:
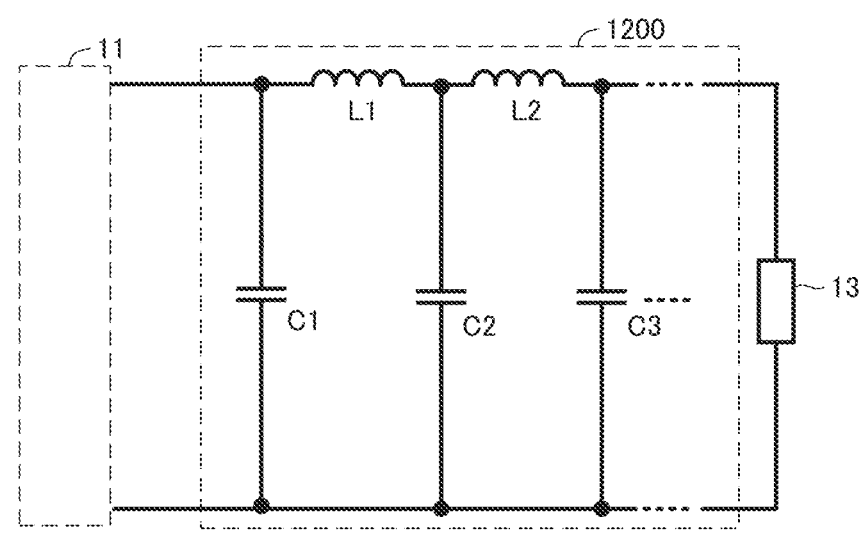
FIG. 69 is a diagram illustrating another modification of output smoothing circuit 1200.

FIG. 69 is a diagram illustrating another modification of output smoothing circuit 1200. As shown in FIG. 69, a smoothing system may be employed in which output smoothing circuit 1200 is configured such that a plurality of capacitors C1, C2, C3 and a plurality of inductors L1, L2 are alternately connected. The number of capacitors and inductors is not limited thereto.

(7) Second Voltage Detector 676

The second voltage detector detecting output voltage Vout is not limited to the method illustrated in FIG. 1 that detects the voltage of second output smoothing capacitor 1203, and may detect the voltage of first output smoothing capacitor 1201 or may detect the voltage of DC load 13. When output smoothing circuit 1200 has the configuration shown in FIG. 68 or FIG. 69, one of a method of detecting any one capacitor voltage or a method of detecting the voltage of DC load 13 may be selected.

(8) Second Current Detector 679

The second current detector detecting output current iout may be arranged at a section connected in series with output smoothing reactor 1202, rather than the section connected in series with DC load 13 as illustrated in FIG. 1, and may detect current of output smoothing reactor 1202.

(9) Control Block

Figure 70:
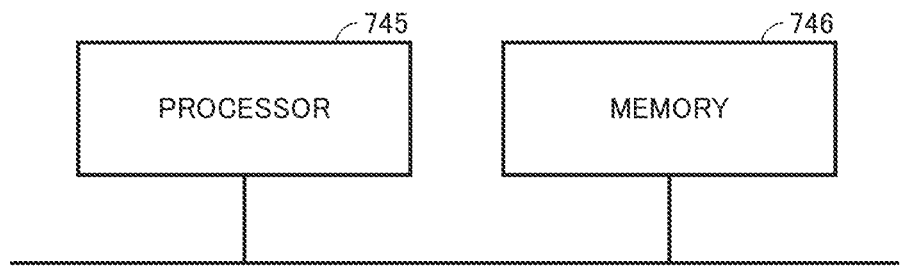
FIG. 70 is a diagram illustrating a modification of a control circuit 14.

The control blocks included in the control circuit may be configured with hardware using arithmetic circuitry. FIG. 70 is a diagram illustrating a modification of control circuit 14. As shown in FIG. 70, control circuit 14 may be configured with software using a memory 746 storing a program and a processor 745 processing the program.

(10) Resonance Circuit

Series resonance reactor 7 may be substituted with leakage inductance of transformer 9, and parallel resonance reactor 8 may be substituted with magnetizing inductance of transformer 9. In FIG. 1, series resonance reactor 7, parallel resonance reactor 8, and series resonance capacitor 10 are disposed on the primary side of transformer 9. However, they may be disposed on the secondary side of transformer 9 or may be disposed so as to be distributed on the primary side and the secondary side of transformer 9. In FIG. 1, series resonance reactor 7 and series resonance capacitor 10 are connected to one of the primary-side terminals of transformer 9. However, they may be disposed so as to be distributed between both terminals or may be disposed so as to be distributed between both terminals on the secondary side of transformer 9.

(11) Second Control Method and Fifth Control Method

Control block 169 may be used instead of control block 160.

(12) Command Value of Phase Shift Amount and Command Value of Switching Frequency A fixed phase shift amount set for each operation condition may be uniquely output, rather than obtaining command value Dpsc of phase shift amount Dps by arithmetic operation. In this case, output control may be performed using the switching frequency as the feedback amount. A fixed switching frequency set for each operation condition may be uniquely output, rather than obtaining command value fs_ref of switching frequency by arithmetic operation. In this case, output control may be performed using the phase shift amount as the feedback amount.

(13) In the First to Sixth Control Methods, the Following May be Performed.

In the first control method, the control may be as follow in the CP control mode. First leg 500 performs high power factor control by adjusting the ON period and the switching frequency so as to follow the target sinusoidal current in phase with the sinusoidal voltage obtained from third voltage detector 677, based on the value obtained from first current detector 678. Second leg 600 performs output control by adjusting the ON period and the switching frequency so as to follow the target DC voltage, based on the value obtained from first voltage detector 675. In the CC control mode, the control may be as follow. First leg 500 performs high power factor control by adjusting the ON period and the switching frequency such that DC voltage of DC capacitor 4 follows the target DC voltage, based on the values obtained from first voltage detector 675, third voltage detector 677, and first current detector 678. Second leg 600 performs output control by adjusting the ON period and the frequency so as to follow the target DC current, based on the value obtained from second current detector 679.

In the fourth control method, the control may be as follow in the CP control mode. First leg 500 and the third leg perform high power factor control by adjusting the ON period and the switching frequency so as to follow the target sinusoidal current in phase with the sinusoidal voltage obtained from third voltage detector 677, based on the value obtained from first current detector 678. Second leg 600 performs output control by adjusting the ON period and the switching frequency so as to follow the target DC voltage, based on the value obtained from first voltage detector 675. In the CC control mode, the control may be as follow. First leg 500 and the third leg perform high power factor control by adjusting the ON period and the switching frequency such that DC voltage of DC capacitor 4 follows the target DC voltage, based on the values obtained from first voltage detector 675, third voltage detector 677, and first current detector 678. Second leg 600 performs output control by adjusting the ON period and the frequency so as to follow the target DC current, based on the value obtained from second current detector 679.

In the second control method, the control may be as follow in the CP control mode. First leg 500 performs high power factor control by adjusting the ON period and the switching frequency so as to follow the target sinusoidal current in phase with the sinusoidal voltage obtained from third voltage detector 677, based on the value obtained from first current detector 678. Second leg 600 performs output control by adjusting the ON period, the phase shift amount, and the switching frequency so as to follow the target DC voltage, based on the value obtained from first voltage detector 675. In the CC control mode, the control may be as follow. First leg 500 performs high power factor control by adjusting the ON period and the switching frequency such that DC voltage of DC capacitor 4 follows the target DC voltage, based on the values obtained from first voltage detector 675, third voltage detector 677, and first current detector 678. Second leg 600 performs output control by adjusting the ON period, the frequency, and the phase shift amount so as to follow the target DC current, based on the value obtained from second current detector 679.

In the fourth control method, the control may be as follow in the CP control mode. First leg 500 and the third leg perform high power factor control by adjusting the ON period and the switching frequency so as to follow the target sinusoidal current in phase with the sinusoidal voltage obtained from third voltage detector 677, based on the value obtained from first current detector 678. Second leg 600 performs output control by adjusting the ON period, the phase shift amount, and the switching frequency so as to follow the target DC voltage, based on the value obtained from first voltage detector 675. In the CC control mode, the control may be as follow. First leg 500 and the third leg perform high power factor control by adjusting the ON period and the switching frequency such that DC voltage of DC capacitor 4 follows the target DC voltage, based on the values obtained from first voltage detector 675, third voltage detector 677, and first current detector 678. Second leg 600 performs output control by adjusting the ON period, the frequency, and the phase shift amount so as to follow the target DC current, based on the value obtained from second current detector 679.

In the third control method, in the CP control mode, first leg 500 performs high power factor control by adjusting the ON period so as to follow the target sinusoidal current in phase with sinusoidal voltage obtained from third voltage detector 677, based on the value obtained from first current detector 678. Second leg 600 performs output control by adjusting the ON period and the phase shift amount so as to follow the target DC voltage, based on the value obtained from first voltage detector 675. In the CC control mode, first leg 500 performs high power factor control by adjusting the ON period such that DC voltage of DC capacitor 4 follows the target DC voltage, based on the values obtained from first voltage detector 675, third voltage detector 677, and first current detector 678. Second leg 600 performs output control by adjusting the ON period and the phase shift amount so as to follow the target DC current, based on the value obtained from second current detector 679.

In the sixth control method, in the CP control mode, first leg 500 and the third leg perform high power factor control by adjusting the ON period so as to follow the target sinusoidal current in phase with the sinusoidal voltage obtained from third voltage detector 677, based on the value obtained from first current detector 678. Second leg 600 performs output control by adjusting the ON period and the phase shift amount so as to follow the target DC voltage, based on the value obtained from first voltage detector 675. In the CC control mode, first leg 500 and the third leg perform high power factor control by adjusting the ON period such that DC voltage of DC capacitor 4 follows the target DC voltage, based on the values obtained from first voltage detector 675, third voltage detector 677, and first current detector 678. Second leg 600 performs output control by adjusting the ON period and the phase shift amount so as to follow the target DC current, based on the value obtained from second current detector 679.

The embodiments disclosed here should be understood as being illustrative in all respects and should not be construed as being limitative. The scope of the present invention is shown not in the foregoing description but in the claims, and it is intended that all modifications that come within the meaning and range of equivalence to the claims are embraced here.

REFERENCE SIGNS LIST

1 AC power supply, 2 power factor-improving reactor, 4 DC capacitor, 7 series resonance reactor, 8 parallel resonance reactor, 9 transformer, 10 series resonance capacitor, 11 secondary-side rectifying circuit, 13 DC load, 14 control circuit, 151 to 172, 175 to 178 control block, 15, 26, 29, 32, 41, 49, 50, 51, 54, 55, 356, 357, 58, 63, 849, 850, 851, 854, 855 comparator, 19, 37 selector, 21, 40, 448 proportional controller, 27, 30, 33, 42, 52, 59, 61, 64, 66, 852 multiplexer, 20, 25, 35, 39*a*, 47*a*, 47*b*, 47*c*, 47*d*, 47*e*, 68, 847*a*, 967 subtracter, 23, 53, 853 adder, 36, 69, 48, 840 PI controller, 962, 964 absolute value output unit, 44, 45, 844, 845, 968 multiplier, 39*b*, 46, 846, 965, 966, 969 divider, 56, 856 logical AND circuit, 300 third leg, 301 fifth semiconductor device, 302 sixth semiconductor device, 500 first leg, 501 first semiconductor device, 502 second semiconductor device, 600 second leg, 601 third semiconductor device, 602 fourth semiconductor device, 655 inverter circuit, 675 first voltage detector, 676 second voltage detector, 677 third voltage detector, 678 first current detector, 679 second current detector, 57, 857, 979 logical NOT circuit, 745 processor, 746 memory, 1200 output smoothing circuit, 1201 first output smoothing capacitor, 1202 output smoothing reactor, 1203 second output smoothing capacitor, 5000, 6000 power conversion apparatus, C, C1, C2, C3 capacitor, L1, L2 inductor.

The invention claimed is:

1. A power conversion apparatus to perform power conversion between an AC power supply and a load,
the power conversion apparatus comprising:
an inverter circuit including a first leg, a second leg, a third leg, and a DC capacitor connected in parallel,
the first leg having a first semiconductor device and a second semiconductor device connected in series, in which a first AC end that is a connection point between the first semiconductor device and the second semiconductor device is connected to one end of the AC power supply,
the second leg having a third semiconductor device and a fourth semiconductor device connected in series,
the third leg having a fifth semiconductor device and a sixth semiconductor device connected in series, in which a connection point between the fifth semiconductor device and the sixth semiconductor device is connected to another end of the AC power supply,
the first semiconductor device, the third semiconductor device, and the fifth semiconductor device being connected, and the second semiconductor device, the fourth semiconductor device, and the sixth semiconductor device being connected;
the power conversion apparatus further comprising:
a transformer having a primary-side winding and a secondary-side winding, the primary-side winding having one end connected to the first AC end and another end connected to a second AC end that is a connection point between the third semiconductor device and the fourth semiconductor device, the secondary-side winding being magnetically coupled to the primary-side winding;
a parallel resonance reactor connected in parallel with the primary-side winding of the transformer;
a secondary-side rectifying circuit to rectify AC output from the secondary-side winding of the transformer;
an output smoothing circuit disposed between the secondary-side rectifying circuit and the load and including at least one smoothing capacitor; and
a control circuit to control the inverter circuit, wherein
the control circuit performs at least pulse width modulation control on the first leg and selects to perform pulse width modulation control and pulse frequency modulation control, to perform pulse width modulation control and phase shift modulation control, or to perform pulse width modulation control, pulse frequency modulation control, and phase shift modulation control on the second leg, based on comparison of a voltage conversion ratio between DC voltage of the DC capacitor and output voltage to the load with at least one threshold.

2. The power conversion apparatus according to claim 1, further comprising a series resonance circuit including a series resonance capacitor and a series resonance reactor disposed at at least one of: between the primary-side winding of the transformer and the first AC end; between the primary-side winding of the transformer and the second AC end; or between the secondary-side winding of the transformer and the secondary-side rectifying circuit.

3. The power conversion apparatus according to claim 1, wherein
the control circuit controls the voltage conversion ratio by controlling operation of the inverter circuit,
when a target value of the voltage conversion ratio is larger than a first threshold, the control circuit selects a first control method, when a target value of the voltage conversion ratio is equal to or smaller than the first threshold and is larger than a second threshold smaller than the first threshold, the control circuit selects a second control method, and when a target value of the voltage conversion ratio is equal to or smaller than the second threshold, the control circuit selects a third control method,
in the first control method, the second control method, and the third control method, the control circuit allows the third leg to perform rectification control by inverting timing when the fifth semiconductor device and the sixth semiconductor device are conducting, in accordance with voltage polarity of the AC power supply,
in the first control method, the control circuit performs pulse width modulation control and pulse frequency modulation control on the first leg and performs pulse width modulation control and pulse frequency modulation control on the second leg,
in the second control method, the control circuit performs pulse width modulation control and pulse frequency modulation control on the first leg and performs pulse width modulation control, pulse frequency modulation control, and phase shift modulation control on the second leg, and
in the third control method, the control circuit performs pulse width modulation control on the first leg and performs pulse width modulation control and phase shift modulation control on the second leg.

4. The power conversion apparatus according to claim 1, wherein
the control circuit controls the voltage conversion ratio by controlling operation of the inverter circuit,
when a target value of the voltage conversion ratio is larger than a first threshold, the control circuit selects a third control method, when a target value of the voltage conversion ratio is equal to or smaller than the first threshold and is larger than a second threshold smaller than the first threshold, the control circuit selects a second control method, and when a target value of the voltage conversion ratio is equal to or smaller than the second threshold, the control circuit selects a first control method,
in the first control method, the second control method, and the third control method, the control circuit allows the third leg to perform rectification control by inverting timing when the fifth semiconductor device and the sixth semiconductor device are conducting, in accordance with voltage polarity of the AC power supply,
in the first control method, the control circuit performs pulse width modulation control and pulse frequency modulation control on the first leg and performs pulse width modulation control and pulse frequency modulation control on the second leg,
in the second control method, the control circuit performs pulse width modulation control and pulse frequency modulation control on the first leg and performs pulse width modulation control, pulse frequency modulation control, and phase shift modulation control on the second leg, and
in the third control method, the control circuit performs pulse width modulation control on the first leg and performs pulse width modulation control and phase shift modulation control on the second leg.

5. The power conversion apparatus according to claim 1, wherein
the control circuit controls the voltage conversion ratio by controlling operation of the inverter circuit,
when a target value of the voltage conversion ratio is larger than the threshold, the control circuit selects a first control method, and when a target value of the voltage conversion ratio is equal to or smaller than the threshold, the control circuit selects a second control method,
in the first control method and the second control method, the control circuit allows the third leg to perform rectification control by inverting timing when the fifth semiconductor device and the sixth semiconductor device are conducting, in accordance with voltage polarity of the AC power supply,
in the first control method, the control circuit performs pulse width modulation control and pulse frequency modulation control on the first leg and performs pulse width modulation control and pulse frequency modulation control on the second leg, and
in the second control method, the control circuit performs pulse width modulation control and pulse frequency modulation control on the first leg and performs pulse width modulation control, pulse frequency modulation control, and phase shift modulation control on the second leg.

6. The power conversion apparatus according to claim 1, wherein
the control circuit controls the voltage conversion ratio by controlling operation of the inverter circuit,
when a target value of the voltage conversion ratio is larger than the threshold, the control circuit selects a second control method, and when a target value of the voltage conversion ratio is equal to or smaller than the threshold, the control circuit selects a third control method,
in the second control method and the third control method, the control circuit allows the third leg to perform rectification control by inverting timing when the fifth semiconductor device and the sixth semiconductor device are conducting, in accordance with voltage polarity of the AC power supply,
in the second control method, the control circuit performs pulse width modulation control and pulse frequency modulation control on the first leg and performs pulse width modulation control, pulse frequency modulation control, and phase shift modulation control on the second leg, and
in the third control method, the control circuit performs pulse width modulation control on the first leg and performs pulse width modulation control and phase shift modulation control on the second leg.

7. The power conversion apparatus according to claim 1, wherein
the control circuit controls the voltage conversion ratio by controlling operation of the inverter circuit,
when a target value of the voltage conversion ratio is larger than a first threshold, the control circuit selects a fourth control method, when a target value of the voltage conversion ratio is equal to or smaller than the first threshold and is larger than a second threshold smaller than the first threshold, the control circuit selects a fifth control method, and when a target value of the voltage conversion ratio is equal to or smaller than the second threshold, the control circuit selects a sixth control method,
in the fourth control method, the control circuit performs pulse width modulation control and pulse frequency modulation control on the first leg, performs pulse width modulation control and pulse frequency modulation control on the second leg, and performs pulse width modulation control and pulse frequency modulation control on the third leg,
in the fifth control method, the control circuit performs pulse width modulation control and pulse frequency modulation control on the first leg, performs pulse width modulation control, pulse frequency modulation control, and phase shift modulation control on the second leg, and performs pulse width modulation control and pulse frequency modulation control on the third leg, and
in the sixth control method, the control circuit performs pulse width modulation control on the first leg, performs pulse width modulation control and phase shift modulation control on the second leg, and performs pulse width modulation control on the third leg.

8. The power conversion apparatus according to claim 1, wherein
the control circuit controls the voltage conversion ratio by controlling operation of the inverter circuit,
when a target value of the voltage conversion ratio is larger than a first threshold, the control circuit selects a sixth control method, when a target value of the voltage conversion ratio is equal to or smaller than the first threshold and is larger than a second threshold smaller than the first threshold, the control circuit selects a fifth control method, and when a target value of the voltage conversion ratio is equal to or smaller than the second threshold, the control circuit selects a fourth control method,
in the fourth control method, the control circuit performs pulse width modulation control and pulse frequency modulation control on the first leg, performs pulse width modulation control and pulse frequency modulation control on the second leg, and performs pulse width modulation control and pulse frequency modulation control on the third leg,
in the fifth control method, the control circuit performs pulse width modulation control and pulse frequency modulation control on the first leg, performs pulse width modulation control, pulse frequency modulation control, and phase shift modulation control on the second leg, and performs pulse width modulation control and pulse frequency modulation control on the third leg, and in the sixth control method, the control circuit performs pulse width modulation control on the first leg, performs pulse width modulation control and phase shift modulation control on the second leg, and performs pulse width modulation control on the third leg.

9. The power conversion apparatus according to claim 1, wherein the control circuit controls the voltage conversion ratio by controlling operation of the inverter circuit, when a target value of the voltage conversion ratio is larger than the threshold, the control circuit selects a fourth control method, and when a target value of the voltage conversion ratio is equal to or smaller than the threshold, the control circuit selects a fifth control method, in the fourth control method, the control circuit performs pulse width modulation control and pulse frequency modulation control on the first leg, performs pulse width modulation control and pulse frequency modulation control on the second leg, and performs pulse width modulation control and pulse frequency modulation control on the third leg, and in the fifth control method, the control circuit performs pulse width modulation control and pulse frequency modulation control on the first leg, performs pulse width modulation control, pulse frequency modulation control, and phase shift modulation control on the second leg, and performs pulse width modulation control and pulse frequency modulation control on the third leg.

10. The power conversion apparatus according to claim 1, wherein the control circuit controls the voltage conversion ratio by controlling operation of the inverter circuit, when a target value of the voltage conversion ratio is larger than the threshold, the control circuit selects a fifth control method, and when a target value of the voltage conversion ratio is equal to or smaller than the threshold, the control circuit selects a sixth control method, in the fifth control method, the control circuit performs pulse width modulation control and pulse frequency modulation control on the first leg, performs pulse width modulation control, pulse frequency modulation control, and phase shift modulation control on the second leg, and performs pulse width modulation control and pulse frequency modulation control on the third leg, and in the sixth control method, the control circuit performs pulse width modulation control on the first leg, performs pulse width modulation control and phase shift modulation control on the second leg, and performs pulse width modulation control on the third leg.

* * * * *